(12) United States Patent
Skalski et al.

(10) Patent No.: US 8,475,854 B2
(45) Date of Patent: *Jul. 2, 2013

(54) LIQUID FLOW CONTROL AND BEVERAGE PREPARATION APPARATUSES, METHODS AND SYSTEMS

(75) Inventors: Lukasz D. Skalski, Benton Harbor, MI (US); Tiemen T. Van Dillen, Varese (IT)

(73) Assignee: Whirlpool Corporation, Benton Harbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/530,461

(22) Filed: Jun. 22, 2012

(65) Prior Publication Data

US 2012/0263831 A1  Oct. 18, 2012

Related U.S. Application Data

(63) Continuation of application No. 12/337,837, filed on Dec. 18, 2008, now Pat. No. 8,227,000.

(51) Int. Cl.
  *B65B 29/06* (2006.01)
(52) U.S. Cl.
  USPC ............. 426/77; 426/115; 426/394; 426/519; 426/590; 99/284; 99/295; 99/300

(58) Field of Classification Search
  USPC 426/77–84, 115, 394, 519, 590–599; 99/284, 99/295, 300
  See application file for complete search history.

(56) References Cited

U.S. PATENT DOCUMENTS

| | | | |
|---|---|---|---|
| 6,672,097 B1* | 1/2004 | Ashley | 62/340 |
| 6,701,826 B2* | 3/2004 | Wu | 99/305 |
| 8,297,180 B2* | 10/2012 | Skalski et al. | 99/279 |
| 2005/0133427 A1* | 6/2005 | Rinker et al. | 210/209 |
| 2007/0209522 A1* | 9/2007 | Bigge et al. | 99/279 |
| 2008/0250937 A1* | 10/2008 | Fraij et al. | 99/295 |
| 2008/0295699 A1* | 12/2008 | Duineveld et al. | 99/302 R |

* cited by examiner

*Primary Examiner* — Drew E Becker
(74) *Attorney, Agent, or Firm* — Kirk W. Goodwin; McKee, Voorhees & Sease PLC

(57) ABSTRACT

Apparatuses, methods and systems for liquid flow control and beverage preparation are disclosed. The apparatuses, methods and systems of the present invention include liquid flow control and beverage preparation capsules, pods, cartridges, pouches, systems, and modules for controlling and directing flow streams of liquid through a beverage preparation process. The apparatuses, methods and systems of the present invention may be used in combination with or included as an integral assembly of any apparatus, method or system for liquid dispension.

20 Claims, 38 Drawing Sheets

LIQUID FLOW CONTROL AND BEVERAGE PREPARATION APPARATUSES, METHODS AND SYSTEMS

CROSS-REFERENCE TO RELATED APPLICATIONS

This application is a Continuation Application of Ser. No. 12/337,837 filed Dec. 18, 2008, now U.S. Pat. No. 8,227,000 issued Jul. 24, 2012, herein incorporated by reference in its entirety.

FIELD OF THE INVENTION

The present invention relates to liquid flow control and beverage preparation apparatuses, methods and systems, and more particularly to apparatuses, methods and systems having at least two-types of dispensing configurations for providing a beverage from a refrigerator or other liquid dispenser, wherein liquid streams, conditioned or otherwise, are guided through a process using a beverage preparation module, pod, capsule, pouch, cartridge, housing, architecture, or similar structure for controlling and directing liquid flow streams through parallel, flow-through or hybrid flow scenarios, which may include one or more flow scenarios for preparing and dispensing a beverage.

BACKGROUND

Liquid dispensing apparatuses, methods and systems are well known and ubiquitous throughout homes, businesses, public and private establishments. Liquid dispensers, to name just a few, may include refrigerator water and/or ice dispensers, faucets, countertop/tabletop water dispensers, water dispensing cabinets, or water bubblers. In short, liquid dispensing apparatuses, methods and systems provide liquid from a source to a receiving point by transporting the liquid from the source through a liquid flow path to an outlet at or near the receiving point. Some liquid dispensing apparatuses, methods and systems are even designed to allow flow-through of liquid from the source through a flavoring, such as a concentrated syrup or powder, and to be dispensed as a beverage to the receiving point. Even though some liquid dispensing apparatuses, methods and systems are designed to pass liquid through a liquid flow path from a liquid source to a receiving point, and even dispense a beverage created from dispensing liquid from the liquid flow path, it is not known in the art to provide a liquid dispenser wherein the liquid flow path for communicating liquid from the liquid source to the receiving point is configurable between flow-through and parallel liquid flow modes to facilitate different beverage preparation processes.

Therefore, a need has been identified in the art to provide a liquid flow control system for liquid dispensing apparatuses, methods and systems that is configurable to either a flow-through mode or parallel liquid flow mode to enable varying beverage preparation processes.

Flow control systems for most liquid dispensing apparatuses, methods and systems are designed to support one liquid flow configuration or mode, such as the flow of liquid through a liquid flow path from the liquid source to a receiving point. For example, some appliances, such as a refrigerator, have a liquid flow path in communication with a liquid source for dispensing liquid at the refrigerator, and even dispense a beverage created from dispensing liquid from the liquid flow path. However, the liquid flow path in appliances and even refrigerators is not configured or configurable to flow-through and/or parallel liquid flow configurations for enabling a broad variety of beverage preparation processes.

Therefore, a need has been identified in the art to provide a flow control system for liquid dispensing appliances, such as a refrigerator, that is configured or reconfigurable to varying liquid dispensing modes, such as a flow-through and/or a parallel liquid flow mode for enabling the appliance or refrigerator to dispense a broad variety of beverages.

Currently, flow control systems for enabling liquid dispensing apparatuses, methods and/or systems with beverage preparation abilities are limited to fixed or set liquid flow modes or scenarios depending on the hardware, architecture and componentry installed during manufacturing.

Therefore, a need has been identified in the art for a flow control system that enables liquid dispensing apparatuses, methods and systems with beverage preparation abilities by providing varying liquid flow scenarios housed within an architecture that is integral to, removably insertable or removably attachable to the liquid dispensing apparatus, method and/or system.

Some liquid dispensing apparatuses, methods and systems may include the ability to prepare a beverage; however, because these same systems are not capable of providing various flow scenarios, they are also limited in the number of beverage preparation processes they can support.

Therefore, a need has been identified in the art to provide an architecture that is integral to, removably insertable or removably attachable to the liquid dispensing apparatus, method or system that includes a liquid flow control and beverage preparation system that is configurable between different flow control modes for supporting one or more beverage preparation processes.

BRIEF SUMMARY

Apparatuses, methods and systems for controlling and directing liquid flow streams for enabling liquid dispensing apparatuses, method and systems with a beverage preparation process for providing a beverage are disclosed. The apparatuses, methods and systems of the present invention may be integral to the liquid dispensing apparatus, method or system, adapted for removable receipt at the liquid dispensing apparatus, method or system or removably attachable at the liquid dispensing apparatus, method or system.

According to one aspect of the present invention, an apparatus for guiding liquid through an enhanced beverage preparation process using a flow control system is disclosed. The apparatus includes a liquid flow path having an inlet adapted for fluid communication with a source of liquid and an outlet adapted for fluid communication with a receiving point, such that the flow control system is positionable between the inlet and outlet of the liquid flow path and configurable between a flow-through mode adapted to produce the enhanced beverage by passing liquid through the liquid flow path and a parallel flow mode adapted to produce the enhanced beverage by passing liquid through the liquid flow path and an enhancement flow path and combining at a mixing point.

According to another aspect of the present invention, a refrigerator having a flow control system for guiding liquid through an enhanced beverage preparation process is disclosed. The refrigerator includes a liquid flow path having an inlet adapted for fluid communication with a source of liquid and an outlet adapted for fluid communication with a receiving point such that the flow control system is configurable between the inlet and outlet of the liquid flow path at the refrigerator and configurable between a flow-through mode adapted to produce the enhanced beverage by passing liquid through the liquid flow path and a parallel flow mode adapted to produce the enhanced beverage by passing liquid through the liquid flow path and an enhancement flow path and combining at a mixing point.

According to another aspect of the present invention, a system for guiding liquid through an enhanced beverage preparation process is disclosed. The method includes means for supplying a flow of liquid and means in the flow of liquid and configurable to either a flow-through mode to prepare the enhanced beverage or a parallel flow mode to prepare the enhanced beverage.

According to still another aspect of the present invention a method for guiding liquid through an enhanced beverage preparation process at a refrigerator is disclosed. The method includes the steps of providing a liquid flow path having an inlet adapted for fluid communication with a source of liquid and an outlet adapted for fluid communication with a receiving point and configuring the liquid flow path between a flow-through mode adapted to produce the enhanced beverage by passing liquid through the liquid flow path and a parallel flow mode adapted to produce the enhanced beverage by passing liquid through the liquid flow path and an enhancement flow path and combining at a mixing point.

According to still another aspect of the present invention an apparatus for enhancing a liquid to provide a beverage is disclosed. The apparatus includes a liquid flow path having an inlet adapted for fluid communication with a source of liquid and an outlet adapted for fluid communication with a beverage receiving point, a chamber adapted for holding or receipt of an enhancement component, an enhancement flow path having an inlet in fluid communication with the chamber and an outlet in fluid communication with a mixing point at or before the receiving point providing the confluence of the outlet of the enhancement flow path, and so that a beverage can be provided at the receiving point by passing the liquid through the liquid flow path and combining the liquid at the mixing point with the enhancement component from the enhancement flow path.

According to still another aspect of the present invention a method for enhancing a liquid with an enhancement component to provide a beverage is disclosed. The method includes the steps of directing a liquid from a liquid source through a liquid flow path, directing an enhancement component from an enhancement component source through an enhancement flow path that is separate from the liquid flow path, moving the enhancement component with the liquid from the liquid flow path to a mixing point to create a mixture with the enhancement component and the liquid, and dispensing the mixture as a beverage at a beverage receiving point.

According to still another aspect of the present invention a capsule for enhancing a liquid to provide a beverage is disclosed. The capsule includes a liquid flow path having an inlet adapted for fluid communication with a source of liquid and an outlet adapted for fluid communication with a beverage receiving point, a chamber adapted for receipt of an enhancement component, an enhancement flow path having an inlet in fluid communication with the chamber, and an outlet in fluid communication with the liquid flow path so that a beverage can be provided at the receiving point by passing the liquid through the liquid flow path and combining the liquid with the enhancement component from the enhancement flow path.

According to still another aspect of the present invention a method for enhancing a liquid with a capsule having an enhancement component to provide a beverage is disclosed. The method includes the steps of directing a liquid from a liquid source through a liquid flow path of the capsule to a beverage receiving point, moving an enhancement component from an enhancement component source through an enhancement flow path, and combining or affecting the liquid from the liquid flow path with the enhancement component at a mixing point so that a beverage can be provided at the beverage receiving point.

According to still another aspect of the present invention a pouch for enhancing liquid with an enhancement component for providing an enhanced beverage is disclosed. The pouch includes a liquid flow path having an inlet adapted for fluid communication with a source of liquid and an outlet adapted for fluid communication with a beverage receiving point, a chamber adapted for receipt of an enhancement component, an enhancement flow path having an inlet in fluid communication with the chamber and an outlet in fluid communication with the liquid flow path so that a beverage can be provided at the receiving point by passing the liquid through the liquid flow path and combining with the enhancement component.

According to still another aspect of the present invention a method for enhancing a liquid with a pouch having an enhancement component to provide a beverage is disclosed. The method includes the steps of directing a liquid from a liquid source through a liquid flow path of the pouch, moving an enhancement component from an enhancement component source through an enhancement flow path by passing the liquid through the liquid flow path, combining or affecting the liquid in the liquid flow path with the enhancement component at a mixing point to create a beverage, and dispensing the beverage from the pouch to a beverage receiving point.

According to still another aspect of the present invention an apparatus for liquid dispension is disclosed. The apparatus includes a first liquid flow path having an inlet adapted for fluid communication with a source of liquid and an outlet adapted for fluid communication with a receiving point, and a second liquid flow path having an inlet adapted for fluid communication with the source of liquid and an outlet adapted for fluid communication with the receiving point.

According to still another aspect of the present invention an apparatus for guiding liquid through an enhanced beverage preparation process is disclosed. The apparatus includes a plurality of liquid flow paths each having an inlet adapted for fluid communication with a source of liquid and an outlet adapted for fluid communication with a receiving point, and a chamber positioned intermediately the inlet and the outlet of each liquid flow path.

According to still another aspect of the present invention a method for enhancing a liquid with an enhancement component to provide a beverage is disclosed. The method includes the steps of directing a liquid from a liquid source through a liquid flow path, distributing the liquid in the liquid flow path to a first liquid flow path and a second liquid flow path, and dispensing the liquid from an outlet of the first and second flow path to a beverage receiving point.

According to still another aspect of the present invention a system for enhancing a liquid with a structure having an enhancement component is disclosed. The system includes a liquid distributor with a plurality of liquid flow paths having an inlet adapted for fluid communication with a source of liquid, and an outlet adapted for fluid communication with a beverage receiving point. The capsule is adapted for removable receipt at the outlet of each liquid flow path so that a beverage can be provided at the beverage receiving point by passing the liquid through the liquid flow path and combining the liquid with the enhancement component.

BRIEF DESCRIPTION OF THE DRAWINGS

While the specifications concludes with claims particularly pointing out and distinctly claiming the invention, it is believed that the present invention will be better understood from the following description taken in conjunction with the accompanying drawings in which:

Figure 14A:
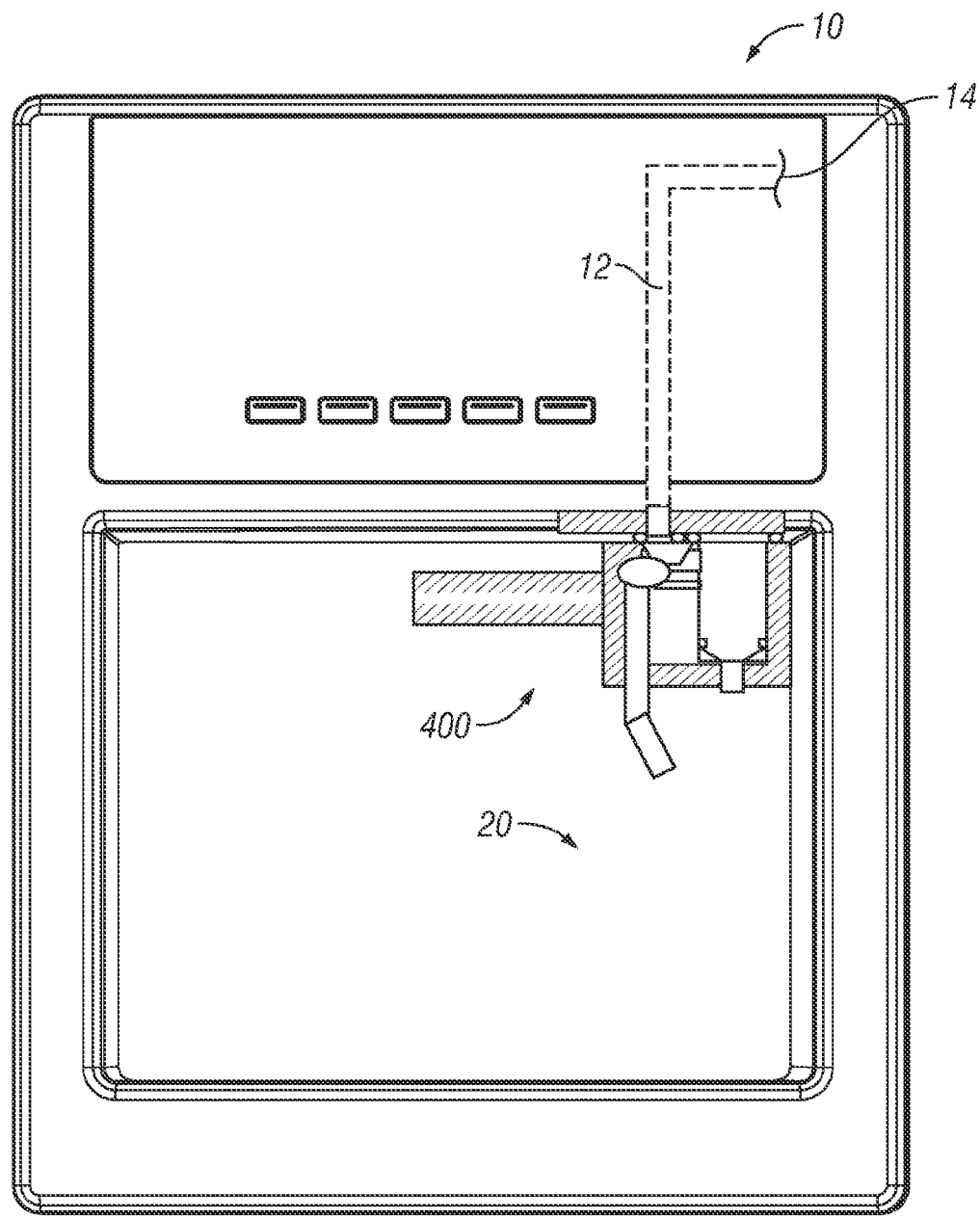
FIG. 14A is a front elevation view of a liquid flow control and beverage preparation module attached to a liquid dispenser according to an exemplary aspect of the present invention.
Figure 14B:
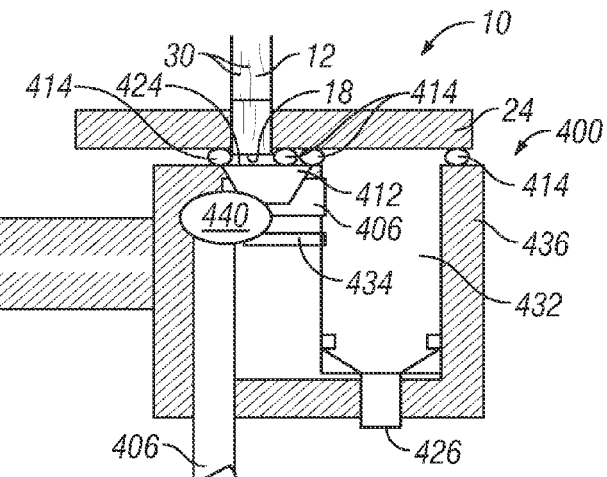
FIG. 14B is a sectional view of one embodiment of a liquid flow control and beverage preparation module shown in FIG.
Figure 14C:
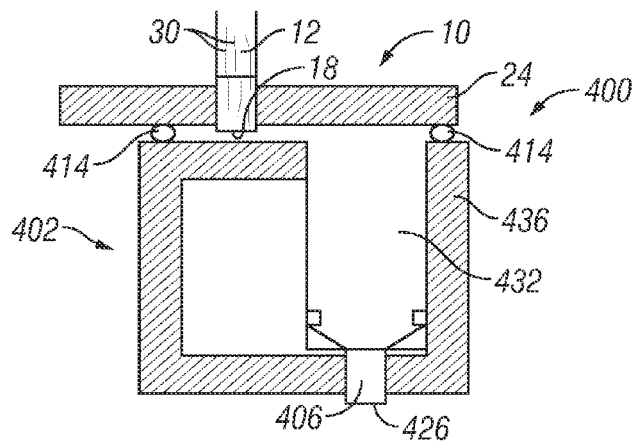
Figure 14D:
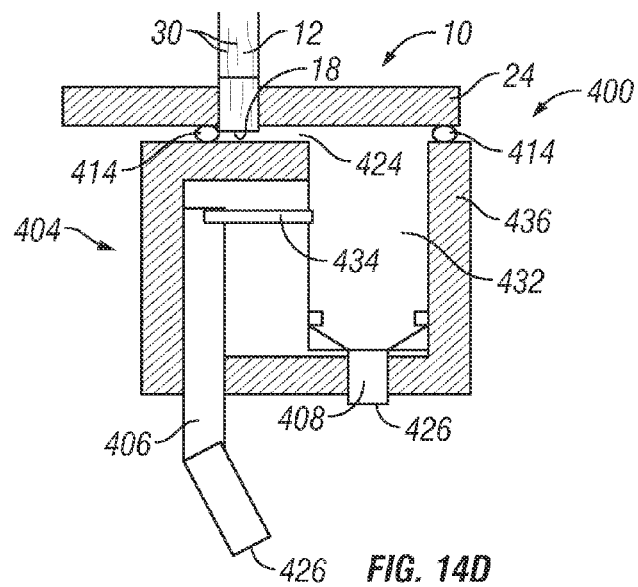
Figure 15A:
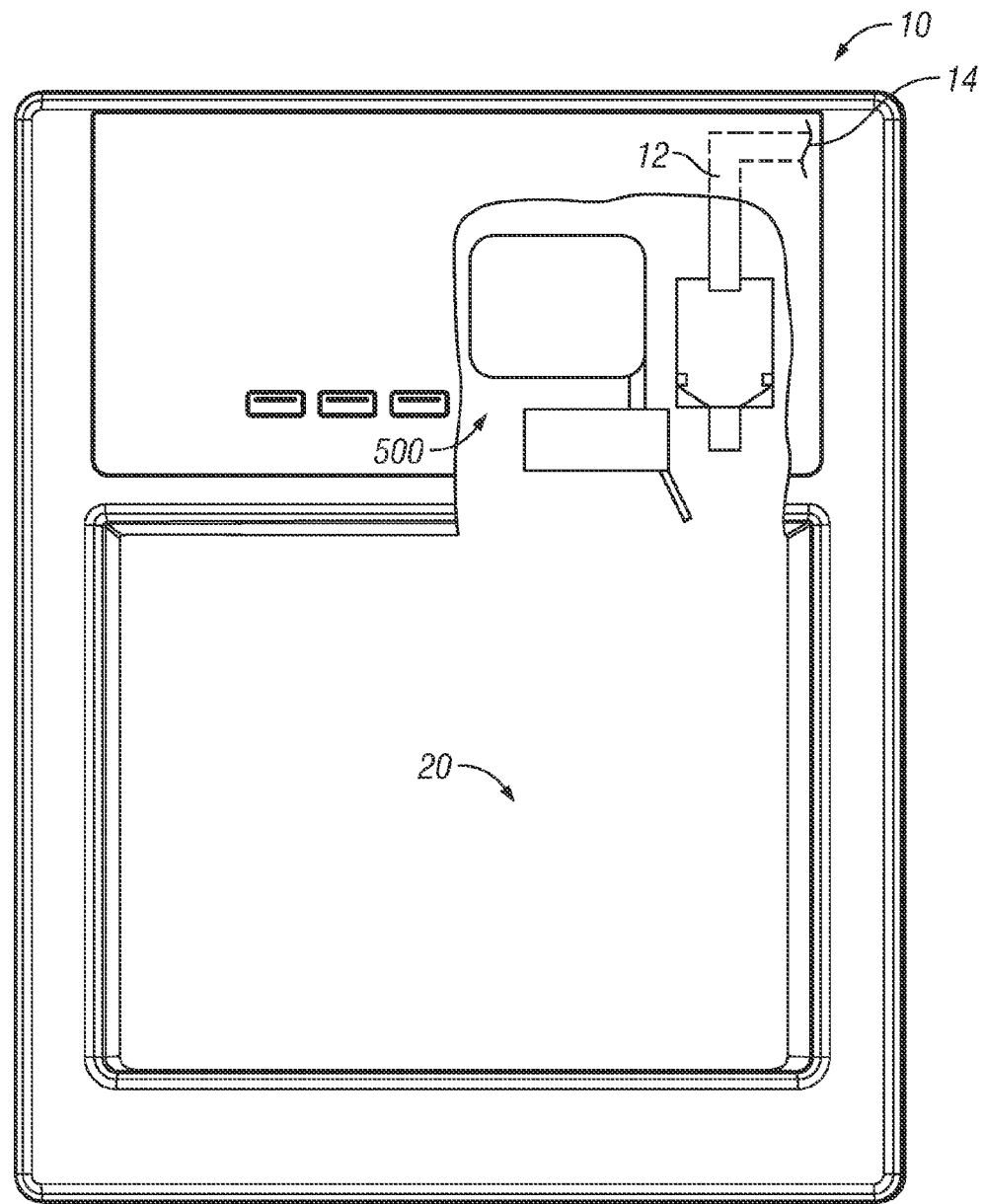
Figure 15B:
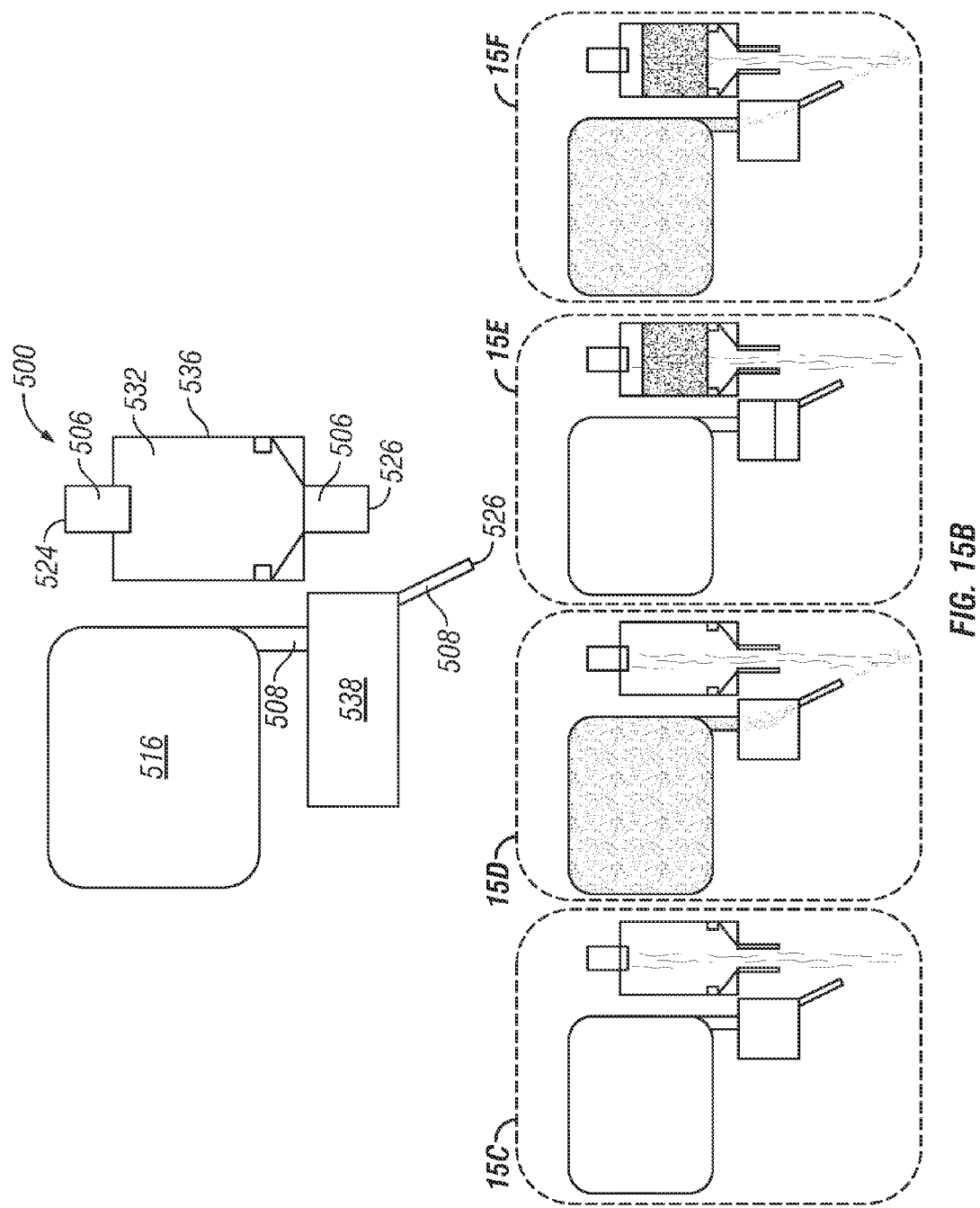
Figure 15C:
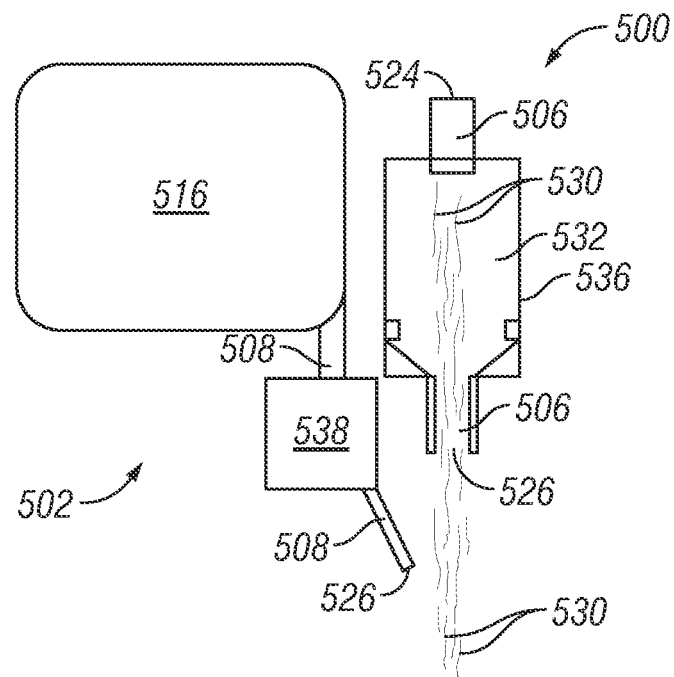
Figure 15D:
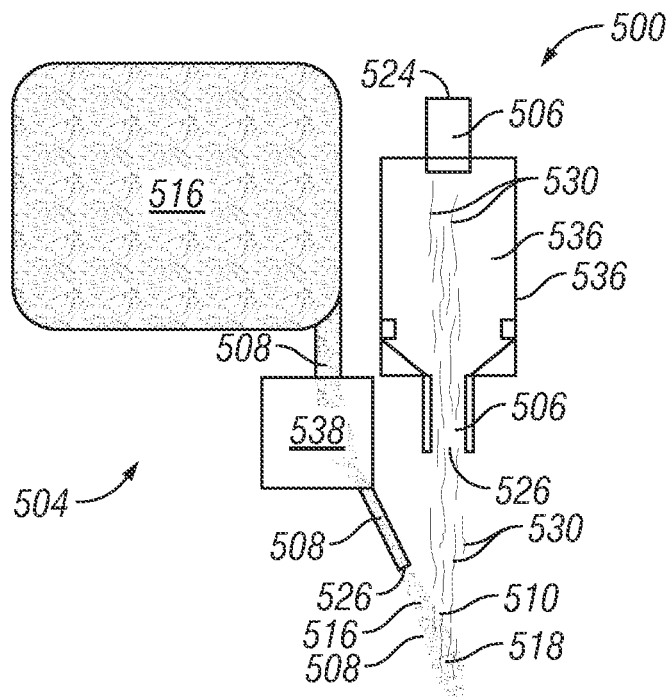
Figure 15E:
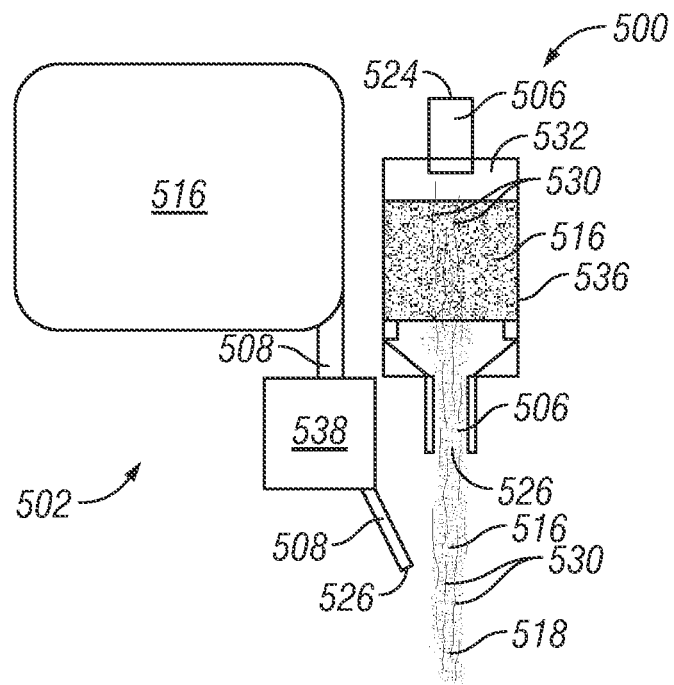
Figure 15F:
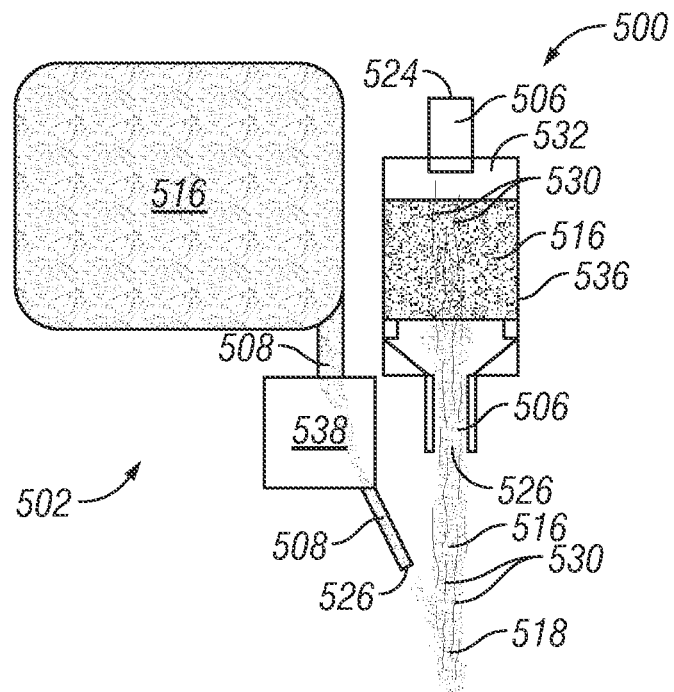
Figure 16A:
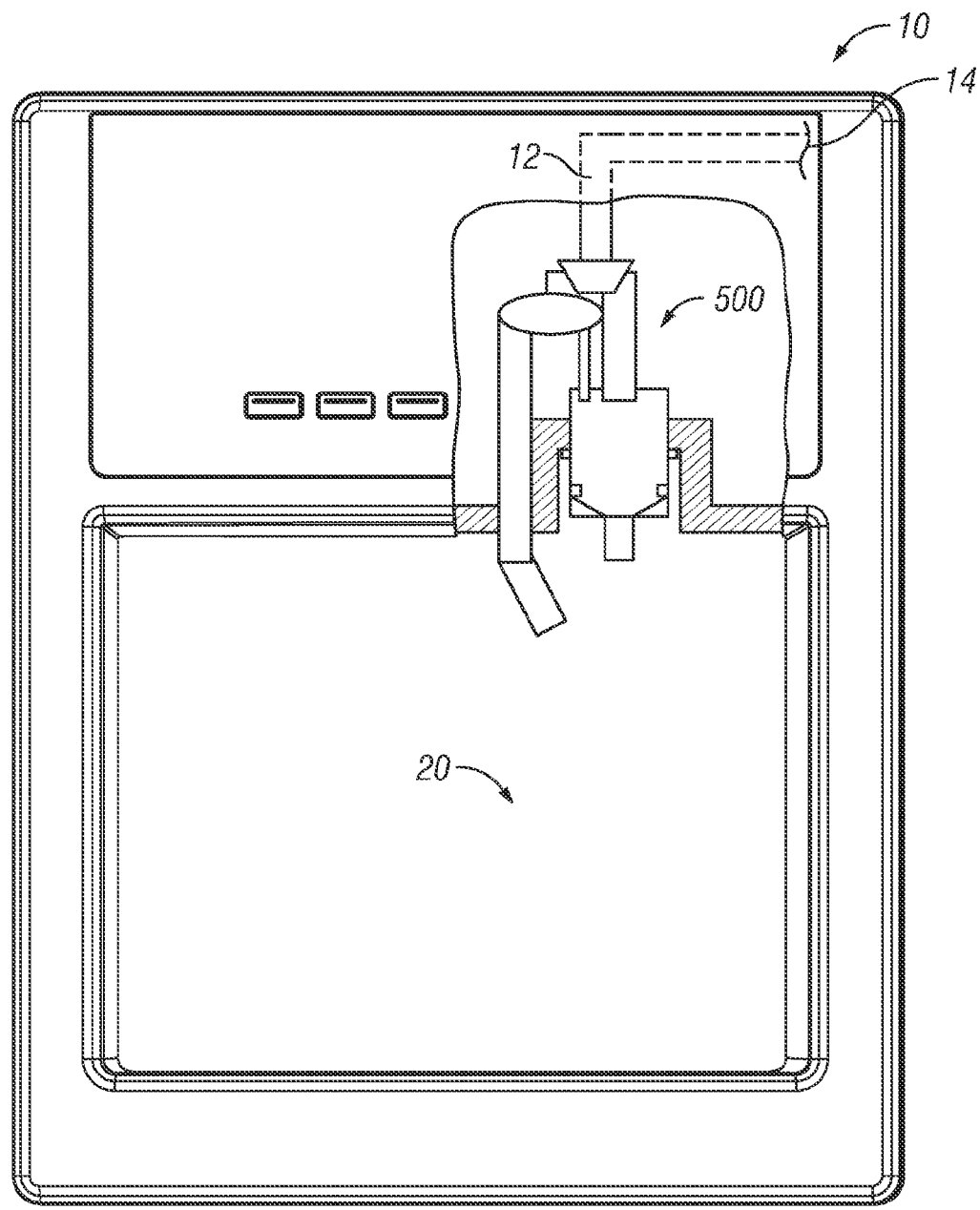
Figure 16B:
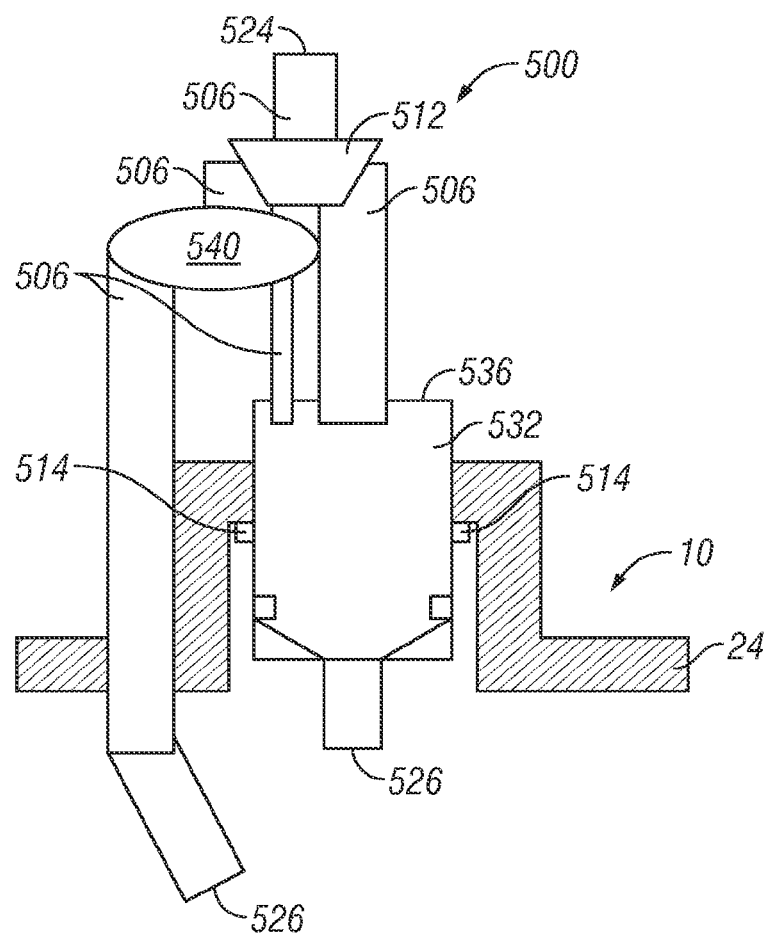
Figure 16B:
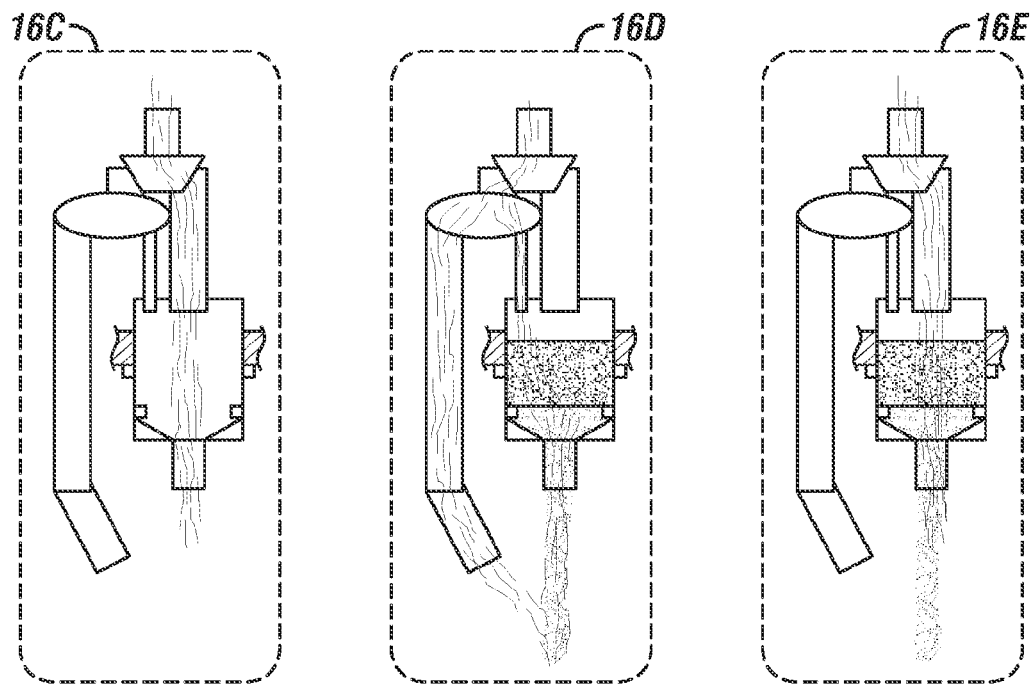
Figure 16E:
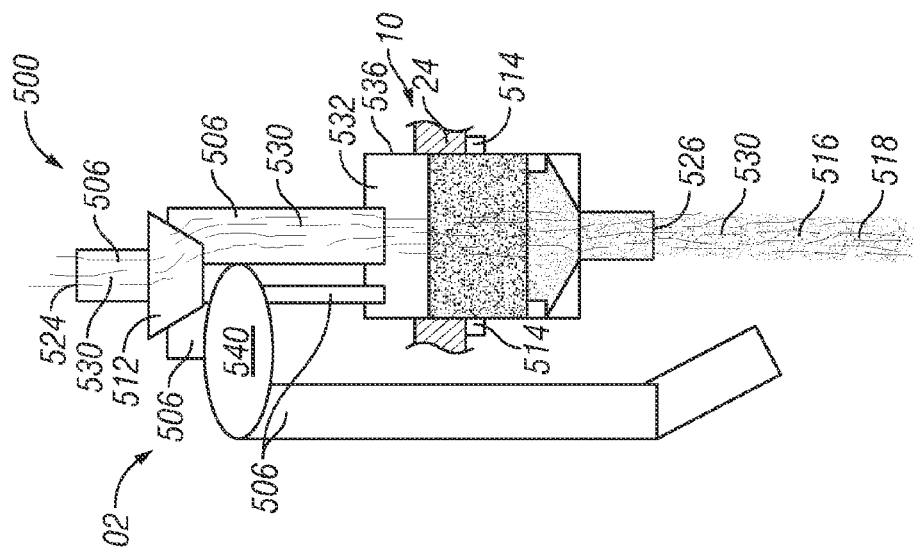
Figure 16D:
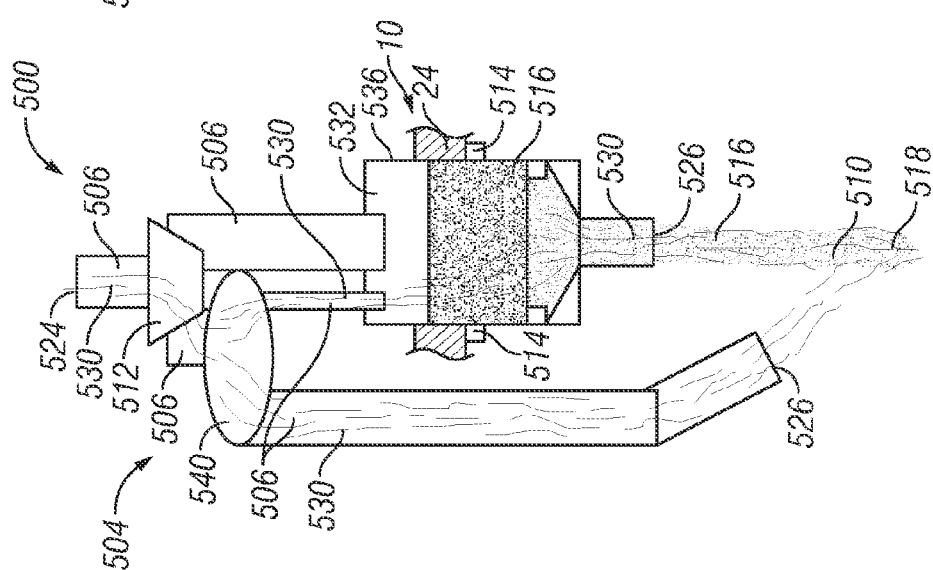
Figure 16C:
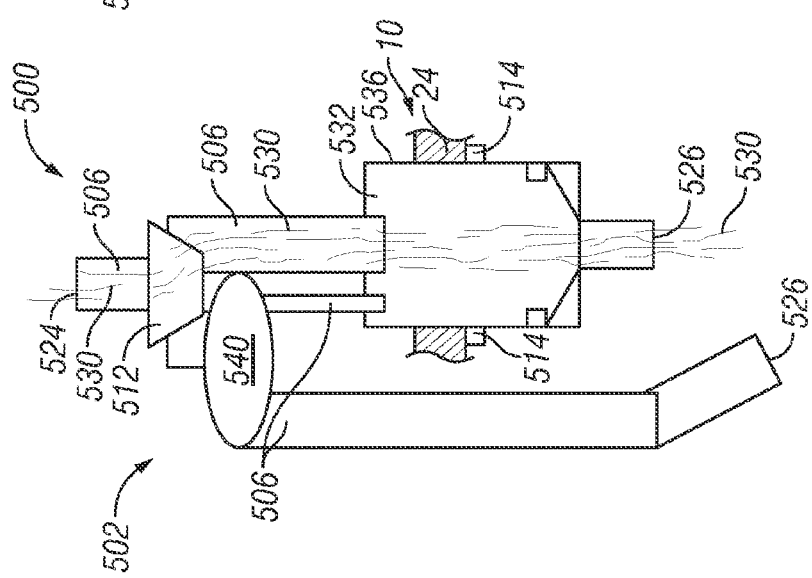
Figure 17A:
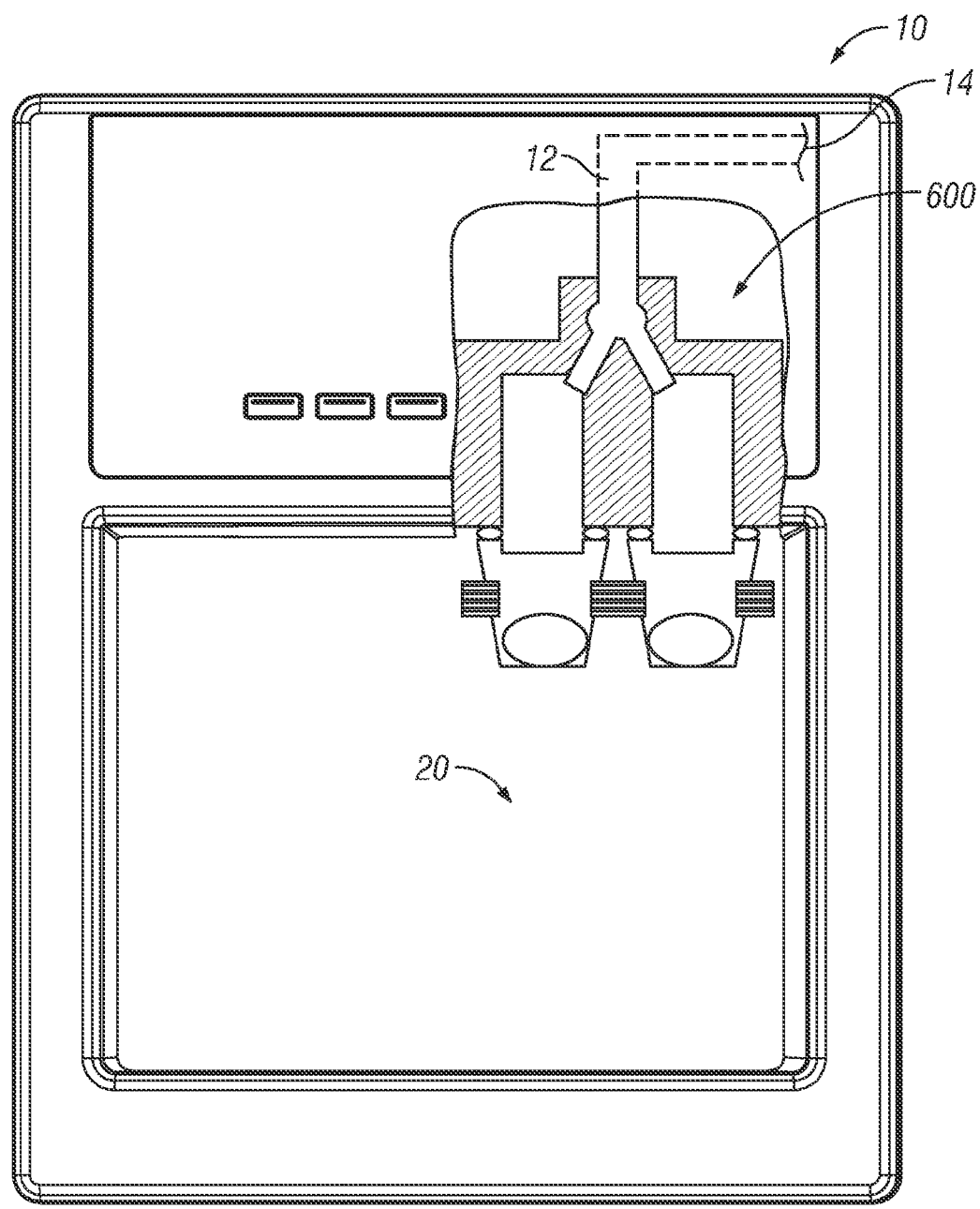
Figure 17B:
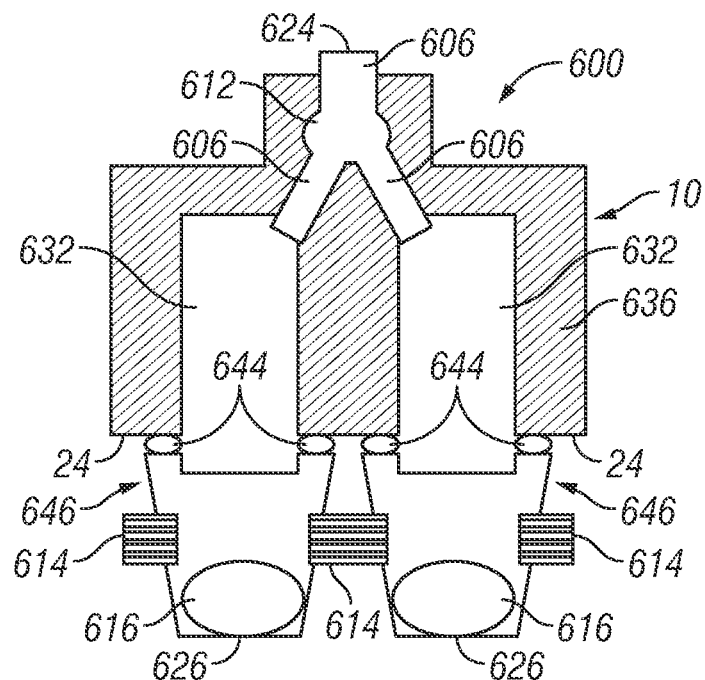
Figure 17C:
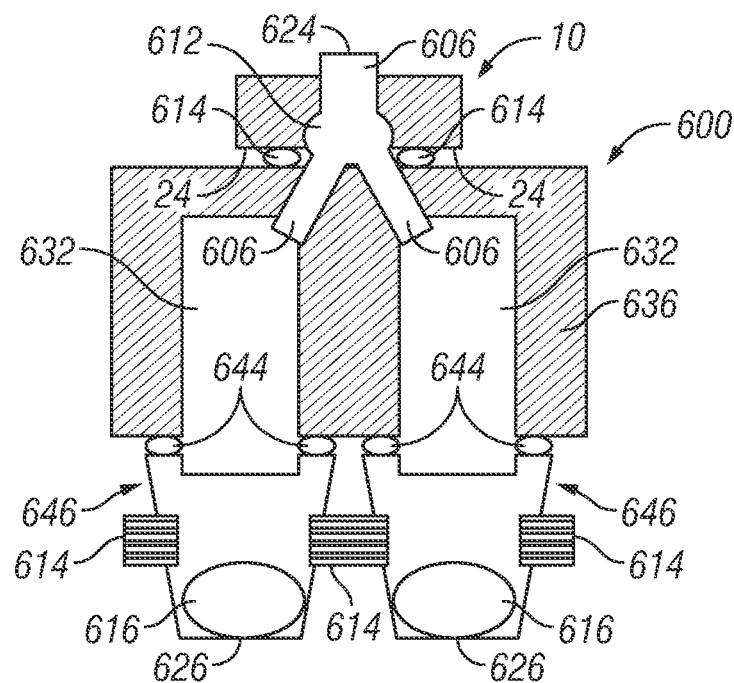
Figure 17D:
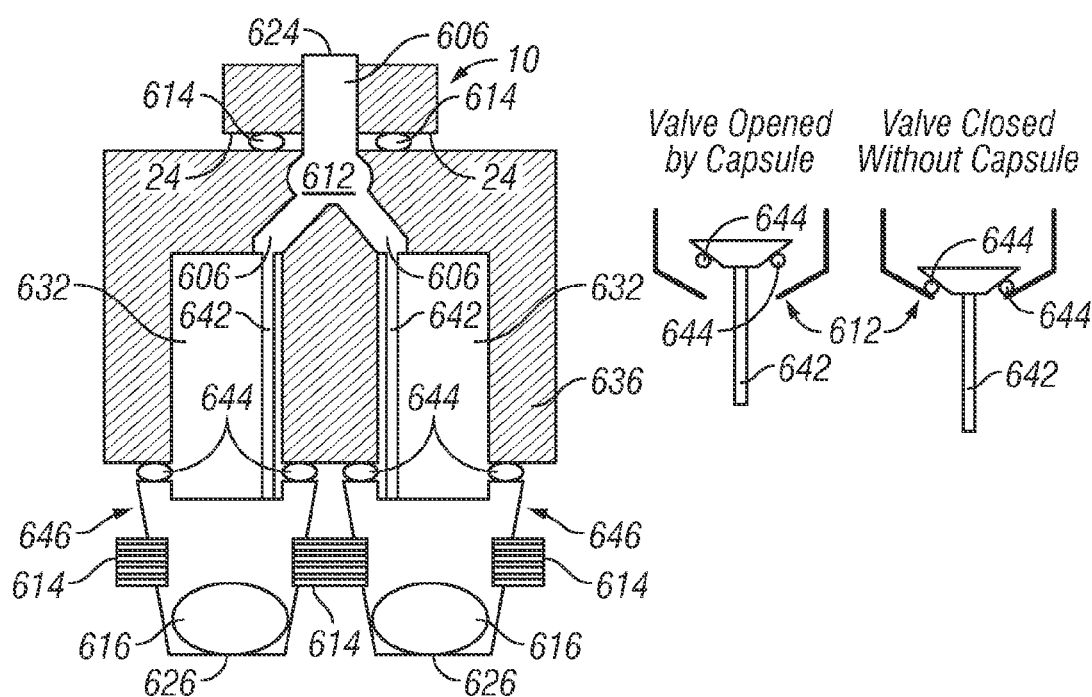
Figure 18:
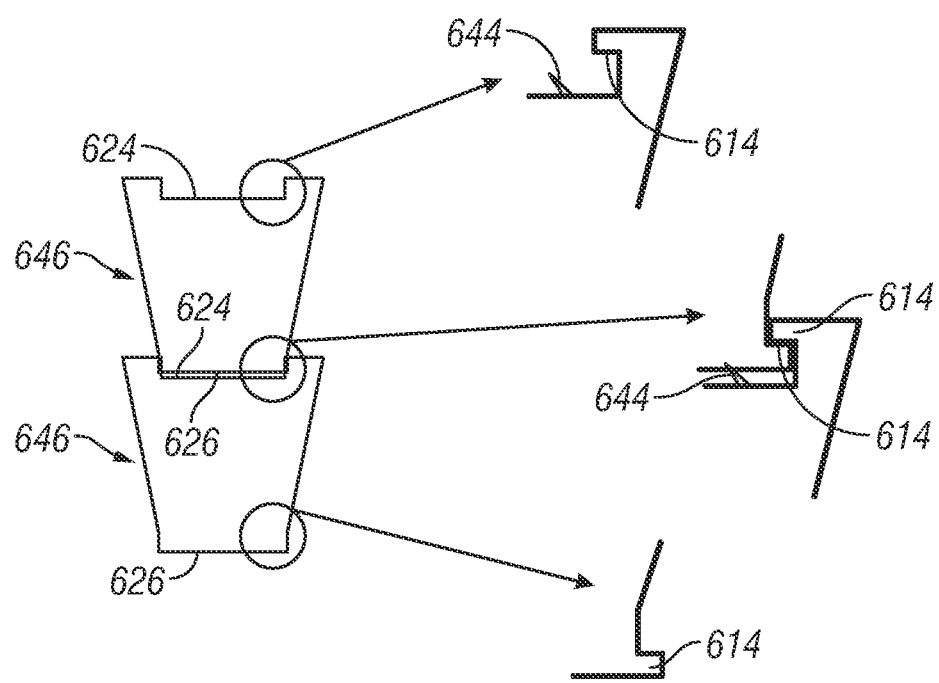

14A being configurable to a flow-through or parallel flow configuration according to an exemplary aspect of the present invention;

FIG. 14C is a sectional view of another embodiment of a liquid flow control and beverage preparation module configured to a flow-through mode according to an exemplary aspect of the present invention;

FIG. 14D is a sectional view of the liquid flow control and beverage preparation module configured to a parallel flow mode according to an exemplary aspect of the present invention;

FIG. 15A is a front elevation view of a liquid flow control and beverage preparation system integrated with a liquid dispenser according to an exemplary aspect of the present invention;

FIG. 15B is an illustrational overview of the liquid flow control and beverage preparation system shown in FIG. 15A being configurable to flow-through and/or parallel flow modes according to an exemplary aspect of the present invention;

FIG. 15C is an enlarged view of the liquid flow control and beverage preparation system taken along line 15C-15C in FIG. 15B configured to a flow-through mode according to an exemplary aspect of the present invention;

FIG. 15D is an enlarged view of the liquid flow control and beverage preparation system taken along line 15D-15D in FIG. 15B configured to a parallel flow mode according to an exemplary aspect of the present invention;

FIG. 15E is an enlarged view of the liquid flow control and beverage preparation system taken along line 15E-15E in FIG. 15B configured to a flow-through mode according to an exemplary aspect of the present invention;

FIG. 15F is an enlarged view of the liquid flow control and beverage preparation system taken along line 15F-15F in FIG. 15B configured to a flow-through and parallel flow mode according to an exemplary aspect of the present invention;

FIG. 16A is a front elevation view of a liquid flow control and beverage preparation system integrated with a liquid dispenser according to an exemplary aspect of the present invention;

FIG. 16B is an illustrational overview of the liquid flow control and beverage preparation system shown in FIG. 16A being configurable to flow-through and/or parallel flow modes according to an exemplary aspect of the present invention;

FIG. 16C is an enlarged view of the liquid flow control and beverage preparation system taken along line 16C-16C in FIG. 16B configured to a flow-through mode according to an exemplary aspect of the present invention;

FIG. 16D is an enlarged view of the liquid flow control and beverage preparation system taken along line 16D-16D in FIG. 16B configured to a parallel flow mode according to an exemplary aspect of the present invention;

FIG. 16E is an enlarged view of the liquid flow control and beverage preparation system taken along line 16E-16E in FIG. 16B configured to a flow-through mode according to an exemplary aspect of the present invention;

FIG. 17A is a front elevation view of a multi-body liquid flow control and beverage preparation system integrated with a liquid dispenser according to an exemplary aspect of the present invention;

FIG. 17B is an enlarged sectional view of the multi-body liquid flow control and beverage preparation system shown in FIG. 17A according to an exemplary aspect of the present invention;

FIG. 17C is a sectional view of another embodiment of the multi-body liquid flow control and beverage preparation system shown in FIG. 17B according to an exemplary aspect of the present invention;

FIG. 17D is a sectional view of another embodiment of the multi-body liquid flow control and beverage preparation system shown in FIG. 17B according to an exemplary aspect of the present invention; and FIG. 18 is an illustration of attachment and sealing interfaces for connecting and sealing together embodiments of the liquid flow control and beverage preparation capsules, pouches, pods and/or cartridges of the present invention.

DETAILED DESCRIPTION

The preferred embodiments of the present invention have been set forth within the drawings and in the foregoing description and although specific terms are employed, these are used in the generically descriptive sense only are not used for the purposes of limitation. Changes in the formed proportioned of parts as well as in the substitution of equivalents are contemplated as circumstances may suggest or are rendered expedient without departing from the spirit and scope of the invention as further defined in the following description and claims.

Overview

The apparatuses, methods and systems of the present invention provide the necessary fluid flow control and beverage preparation architecture, components, structure, to enable various types of the liquid dispenser to have the requisite liquid flow structure to dispense a broad variety of beverages.

Currently, most liquid dispensers are designed to provide liquid at the outlet that is passed through a liquid flow path from the liquid source. The flow structure within the liquid dispenser stays rigid and fixed components which don't allow for the different type of flow regimes needed to prepare various types of beverages. Furthermore, the flow architecture within fluid dispensers is designed and implemented without contemplation of the liquid dispenser being engineered or altered to provide the necessary flow regimes, architecture, or structure to prepare various types of beverages for dispensing. It is therefore the desire of the present invention to provide the necessary liquid flow control and beverage preparation apparatuses, methods and systems that allow for commercially available liquid dispensers to be enabled to provide a myriad of beverages which inherently require that the flow structure or flow regimes of the liquid dispenser be reconfigured to meet the different requirements for preparing different beverages. It is not only the desire of the present invention to allow for commercially available liquid dispensers to be enabled with a liquid flow control and beverage preparation apparatus, method or system, but it is also the desire of the present invention to provide the necessary liquid flow and beverage preparation constructs within the manufacture and production of various types of liquid dispensers, including an indoor ice/water dispenser for a refrigerated appliance. It is a further desire of the present invention to provide liquid flow control and beverage preparation apparatuses, methods and systems wherein the liquid flow control architecture and beverage preparation components are reconfigurable to enable the preparation of various types of beverages. For example, the present invention contemplates the ability to enable a liquid dispenser with the necessary liquid flow and beverage preparation architecture to allow the liquid dispenser to be reconfigured from a traditional flow-through configuration (where liquid from the liquid source passes generally through a liquid flow path to the outlet which dispenses to a receiving point) to some other flow configuration or mode which enables the liquid dispenser to prepare one or more types of beverages. Additionally, the present invention further contemplates the combination or addition of a beverage preparation system with the liquid flow control system, wherein the liquid flow control system may be reconfigured to accommodate the specific structure, or flow regime needed to prepare a beverage using the beverage preparation system. Because the present invention allows liquid dispensers to be enabled with the requisite liquid flow architecture, constructs or configurations to provide multiple liquid dispensing flow scenarios, multiple enhancement or enhanced beverage dispensing scenarios are possible, and no longer limited by the commercial flow control structure that may be included in a commercially available liquid dispenser. Further, the present invention allows manufacturing and production to enable new liquid dispensing products with the flow control architecture of the present invention whereby the liquid dispenser may be used in combination with the beverage preparation systems of the present invention to provide a myriad of beverage types depending on the type desired.

Liquid Dispensers

Figure 1A:
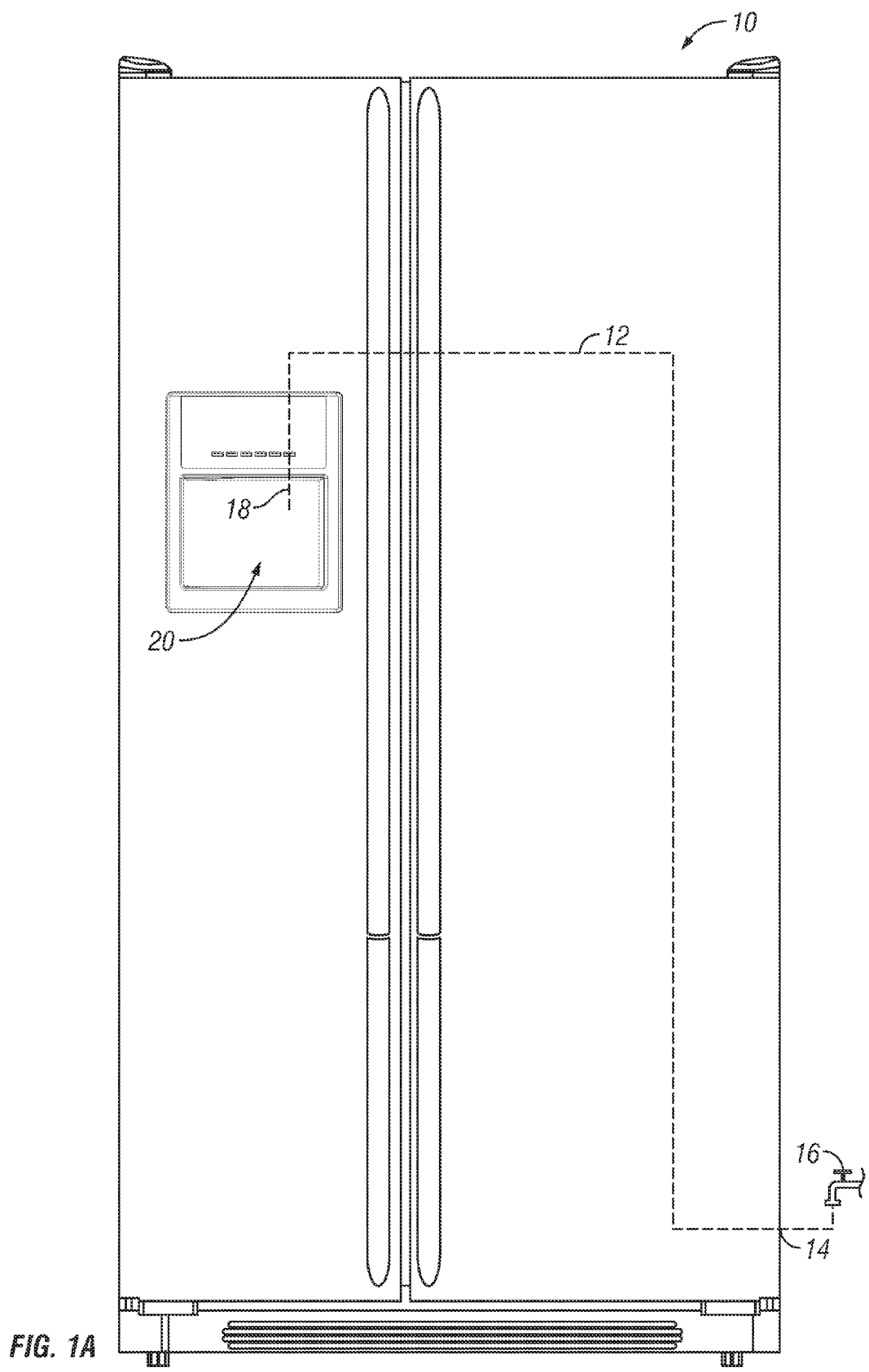
FIG. 1A is front elevation view of a liquid dispensing appliance.
Figure 1B:
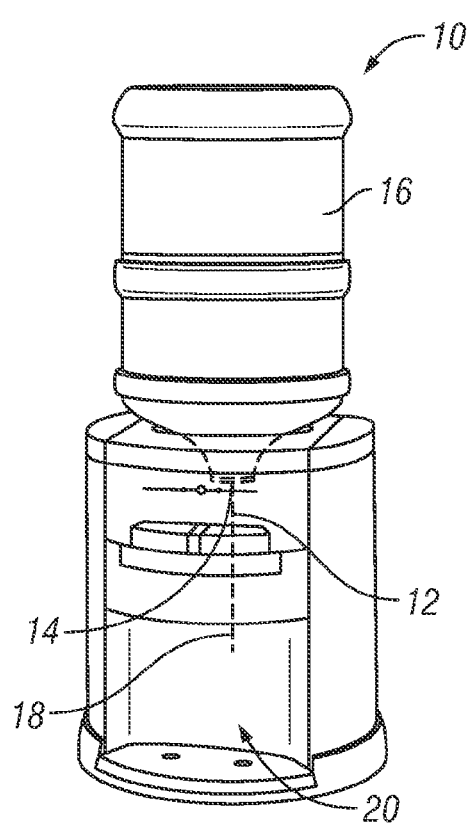
FIG. 1B is a front perspective view of one type of a liquid dispenser.
Figure 1C:
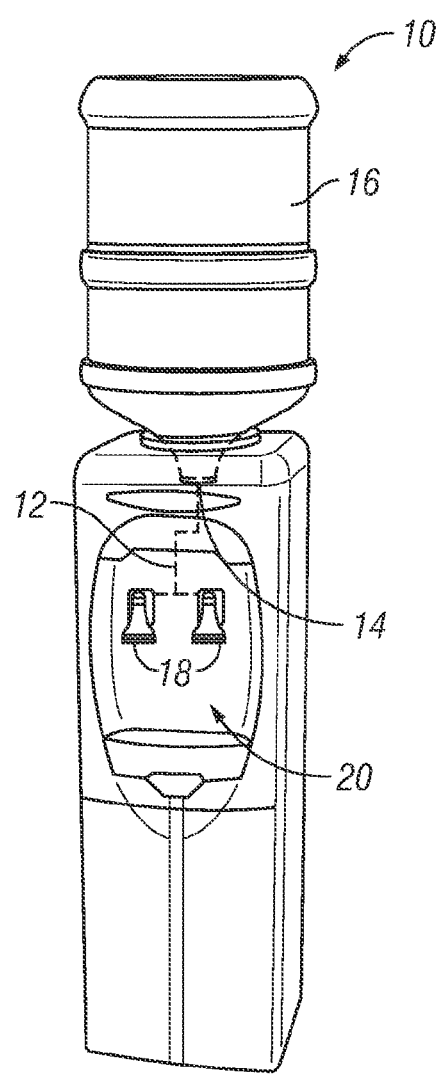
FIG. 1C is a front perspective view of another type of a liquid dispenser.

FIGS. 1A-1E illustrate various types of commercially available liquid dispensing apparatuses 10. Liquid dispensing apparatuses 10 shown in FIGS. 1A-1E are not exhaustive of the numerous types of liquid dispensers that are commercially available, currently being contemplated and designed, and/or will be designed in the future. This means that the present invention is not limited to application in the illustrated liquid dispensing apparatuses 10, but the present invention contemplates application within liquid dispensing apparatuses currently in production or those that will be produced in the future. In short, FIGS. 1A-1E are merely exemplary liquid dispensing apparatuses shown to provide some basis for the breadth and scope of the present invention, which is to mean that the present invention is not limited to application within only liquid dispensing apparatuses 10 shown in FIGS. 1A-1E, but any type of liquid dispenser that provides a liquid flow path dispensing liquid to a receiving point. The present invention is applicable in any such scenario where a liquid flow path dispenses to a receiving point as contemplated by the numerous types of liquid dispensers, including those illustrated in FIGS. 1A-1E. As indicated, common elements exist in all liquid dispensers. These elements are embodied and illustrated in FIGS. 1A-1E. For example, liquid dispensing apparatus 10, shown in FIG. 1A is a refrigerated appliance, and includes a liquid flow path 12 which allows liquid to be communicated from source 16 through inlet 14 into the refrigerated appliance, which is dispensed to outlet 18 at receiving point 20. Thus, in the broad sense, refrigerated appliance shown in FIG. 1A, has the general basic components needed for dispensing liquid to a receiving point from a source. In the case of the refrigerated appliance shown in FIG. 1A, the source is often a valve to which water is supplied from a plumbed water distribution network, such as a well or a municipal water plant. Those skilled in the art can appreciate that source 16 can also be a local source originating in a container or bottle for holding a quantity of liquid at the appliance, such as the liquid dispensing apparatuses 10 illustrated in FIGS. 1B-1C. Like the refrigerated appliance shown in FIG. 1A, liquid dispensing apparatuses 10 illustrated in FIGS. 1B-1C have a liquid source 16 designed to hold a fixed quantity of liquid which is replenishable by exchanging the bottle for a full one. Liquid from the liquid source 16 is dispensed from outlet 18 at receiving point 20 by traveling from source 16 to outlet 18 through liquid flow path 12.

Figure 1D:
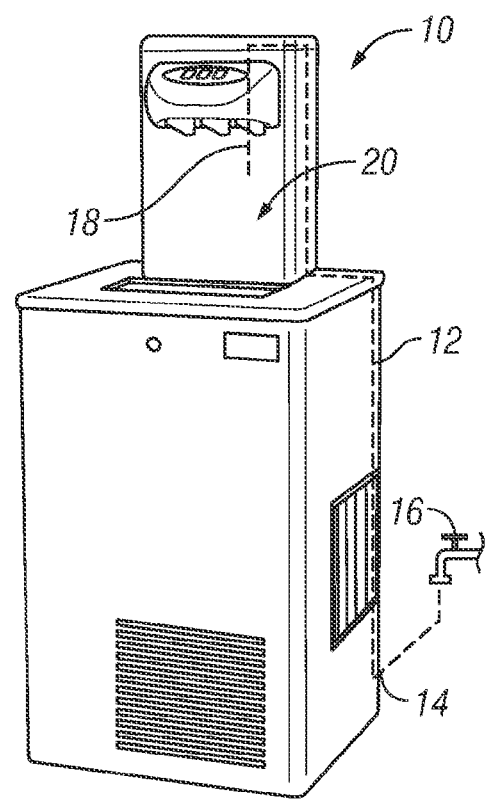
FIG. 1D is a front perspective view of another type of a liquid dispenser.
Figure 1E:
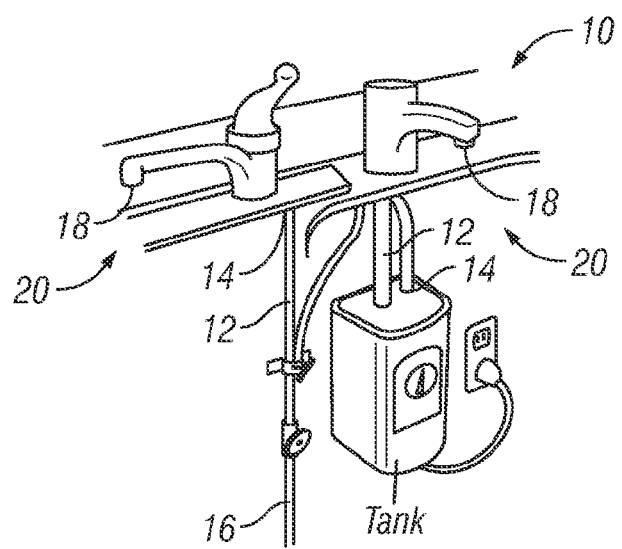
FIG. 1E is a front perspective view of a pair of liquid dispensers.

Another liquid dispensing apparatus 10 is illustrated in FIG. 1D. Similar to those previously described, liquid dispensing apparatus 10 illustrated in FIG. 1D receives liquid from a source 16 received at an inlet 14 in the liquid dispensing apparatus 10 which passes through liquid flow path 12 and is dispensed through outlet 18 at receiving point 20. FIG. 1E illustrates another liquid dispensing apparatus 10. In FIG. 1E the pair of facets receive liquid from a liquid source 16, such as a water distribution network. Liquid travels through the liquid flow path 12 and is dispensed through outlet 18 at the receiving point 20. Thus, in both instances illustrated in FIG. 1E, liquid is communicated from a liquid source 16 and dispensed through the pair of facets at a receiving point 20.

As illustrated in FIGS. 1A-1E, liquid dispensing apparatuses 10 are designed with one purpose, that is to dispense liquid from liquid source 16 through outlet 18 at receiving point 20. As such, liquid flow path 12 is designed to communicate liquid from liquid source 16 to outlet 18 at receiving point 20 of liquid dispensing apparatus 10. Because of the design of the liquid flow path 12 in liquid dispensing apparatuses 10 illustrated in FIGS. 1A-1E, liquid dispensing apparatuses 10 may require a different liquid flow scenario when preparing various types of beverages. Accordingly, the present invention contemplates liquid flow control and beverage preparation apparatuses, methods and systems that enable liquid dispensing apparatuses 10 illustrated in FIGS. 1A-1E, and any other type of liquid dispenser, with the requisite liquid flow architecture or liquid flow configurations needed to facilitate preparation of various types of beverages.

Integration Concepts

Figure 2:
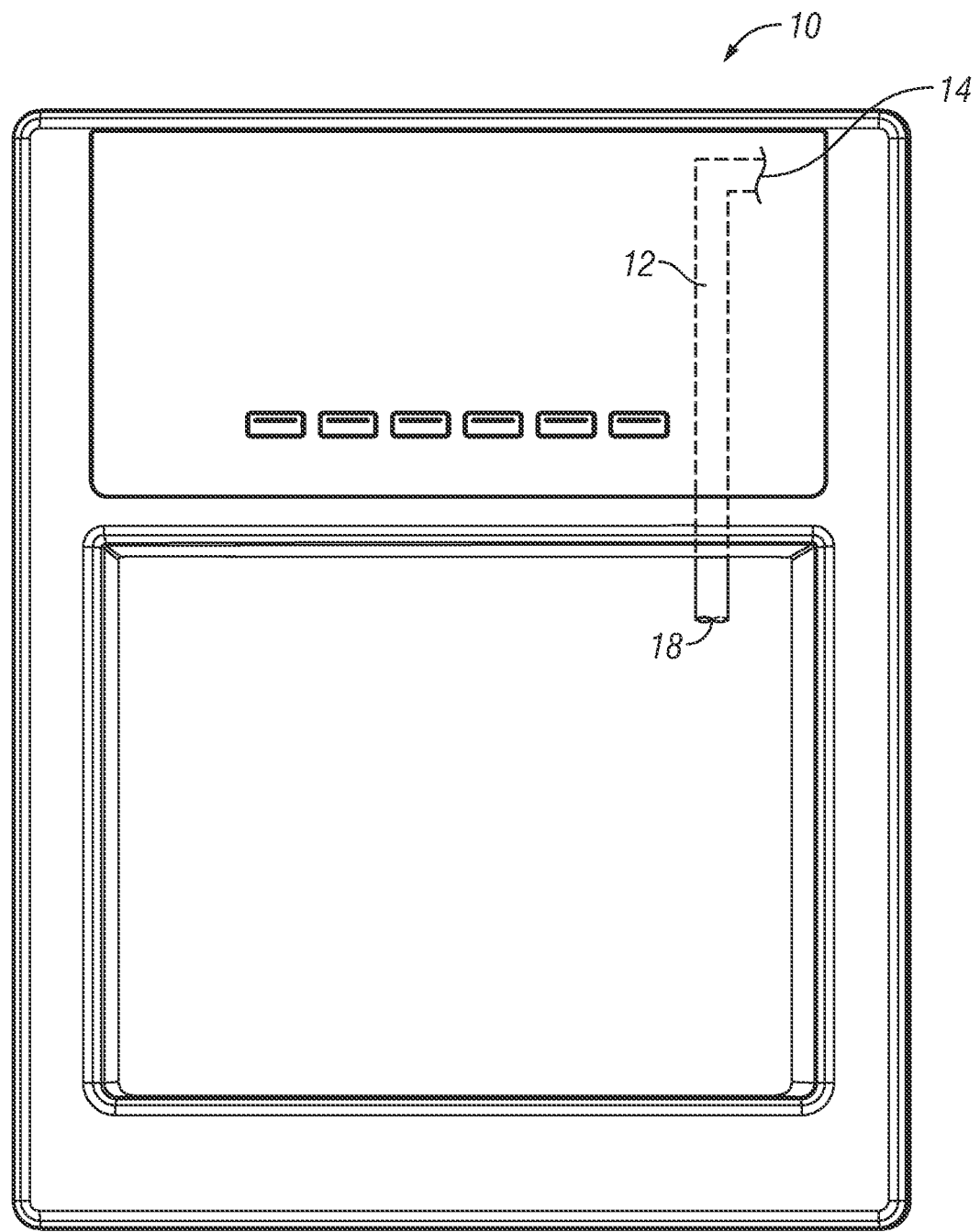
FIG. 2 is a front elevation view of the liquid dispenser of the refrigerator shown in FIG. 1A.

FIGS. 2-4B illustrate various means for enabling the liquid dispenser of the refrigerated appliance shown in FIG. 1A with the liquid flow control and beverage preparation apparatuses, methods and systems of the present invention. As previously discussed, the present invention is not limited to use in the liquid dispenser of a refrigerated appliance, but contemplates use in any liquid dispenser, such as a faucet (see FIG. 1E), a countertop water dispenser (see FIG. 1B), a free standing water cooler (see FIG. 1C), a water dispensing cabinet (see FIG. 1D), a water bubbler, an under-counter dispenser (see FIG. 1E), or any like water dispenser. FIG. 2 illustrates the liquid dispenser of the refrigerated appliance shown in FIG. 1A. Liquid dispensing apparatus 10 includes a liquid flow path 12 through which liquid is received from inlet 14 through outlet 18 to receiving point 20. Thus, liquid dispensing apparatus 10, like other liquid dispensers, has a liquid flow path 12 having an inlet 14 adapted for fluid communication with a source 16 (see FIG. 1A) and an outlet 18 adapted for fluid communication with a receiving point 20.

Figure 3A:
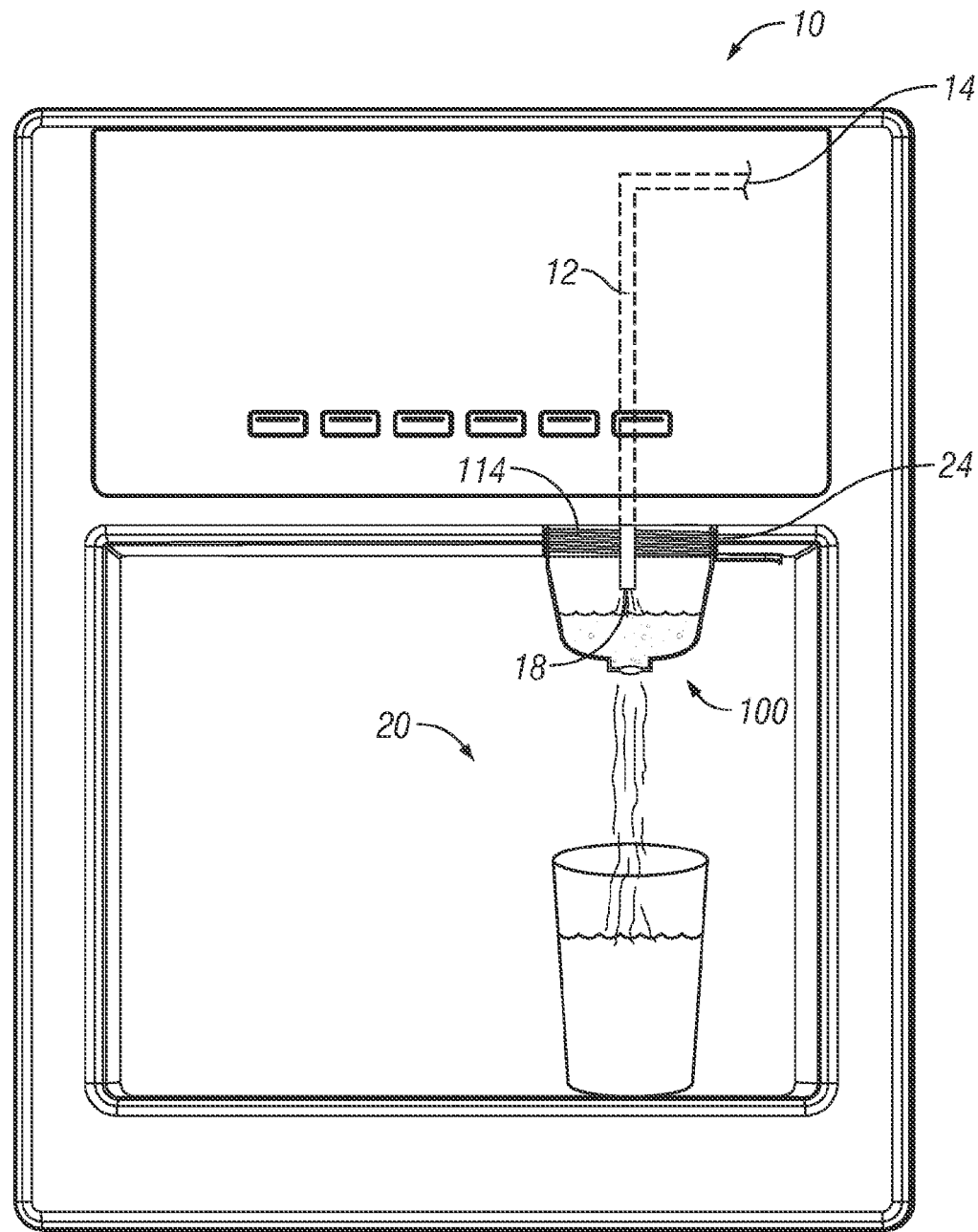
FIG. 3A is a front elevation view of the liquid dispenser shown in FIG. 2 with one exemplary embodiment of the liquid flow control and beverage preparation capsule of the present invention.

FIG. 3A illustrates liquid dispensing apparatus 10 having an attachment interface 24 whereby one or more of the embodiments of the liquid flow control and beverage preparation apparatuses, methods and systems of the present invention may be secured or removably received, such as for example at a liquid dispenser of a refrigerated appliance. Attachment interface 24 may be configured in liquid dispensing apparatus 10 during manufacturing or production of the unit or at any time after manufacture and production of the unit by providing attachment interface 24 as a retrofittable or add-on component. Thus, the present invention contemplates that the apparatuses, methods and systems for liquid flow control and beverage preparation could be configured into the liquid dispenser during manufacturing and production or after the fact by use of aftermarket, retrofit or add-on componentry. As shown in FIG. 3A, liquid flow control and beverage preparation capsule 100 has a corresponding attachment interface 114 adapted to secure to attachment interface 24 in liquid dispensing apparatus 10. In this instance, liquid flow control and beverage preparation capsule 100 is attached at the outlet 18 of liquid flow path 12 of liquid dispensing apparatus 10. The present invention contemplates that the apparatuses, methods and systems for liquid flow control and beverage preparation may be removably received, removably attached, removably inserted, or removably positioned at any point along liquid flow path 12. For example, liquid flow control and beverage preparation capsule 100 could be positioned between inlet 14 and outlet 18 of liquid flow path 12. Thus, beverage preparation capsule 100 could be positionable at any point along liquid flow path 12 depending upon the desired location or permitted space.

Figure 3B:
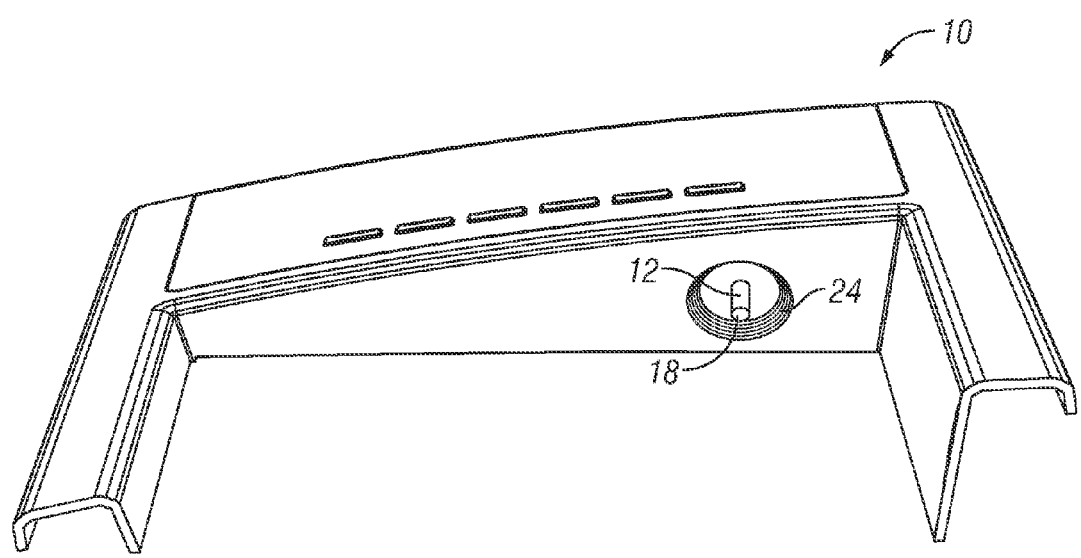
FIG. 3B is a perspective view of an attachment interface at the liquid dispenser for the liquid flow control and beverage preparation capsule according to an exemplary embodiment of the present invention.
Figure 3C:
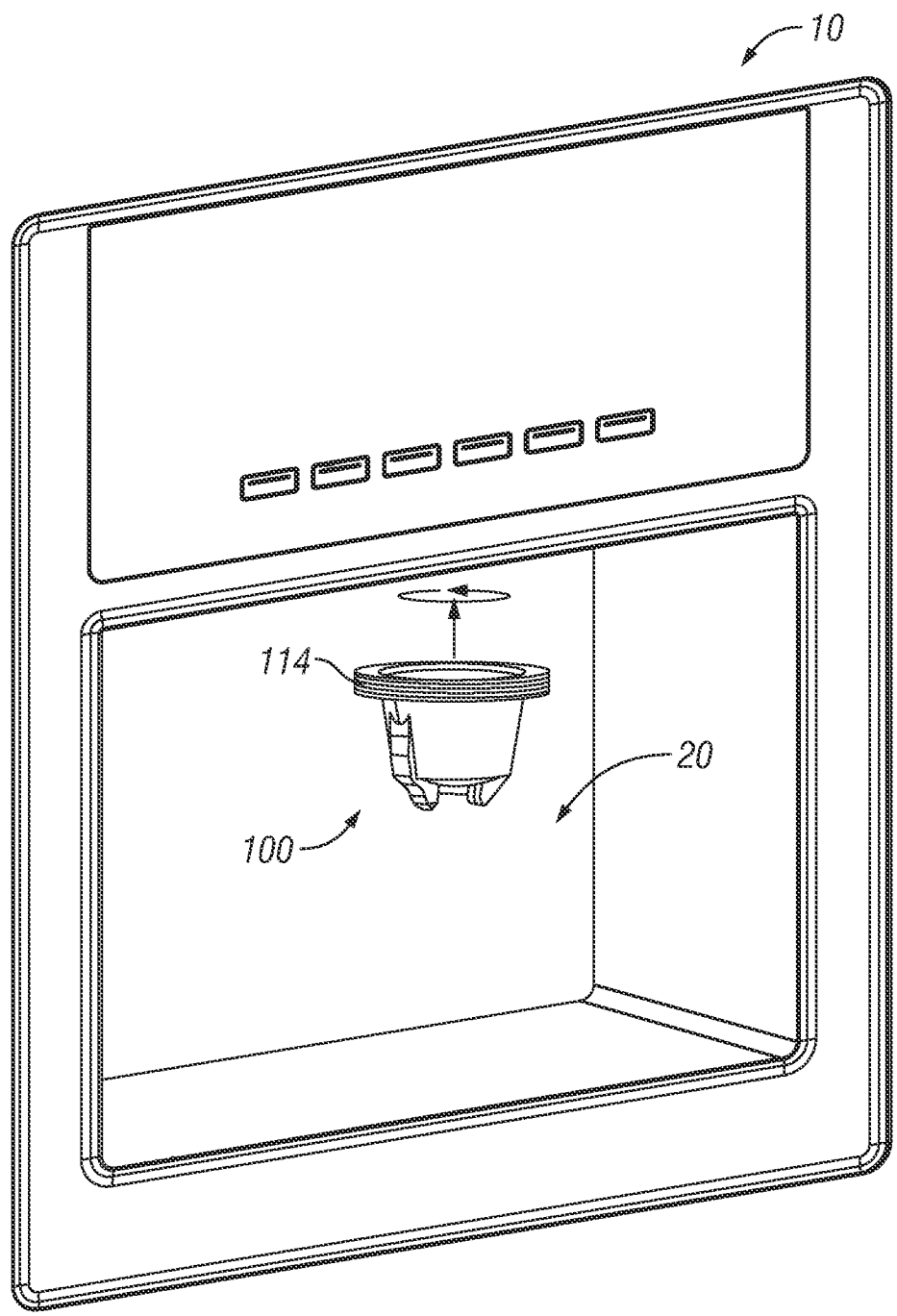
FIG. 3C is a front elevation view of a corresponding attachment interface on a liquid flow control and beverage preparation capsule according to an exemplary embodiment of the present invention.

FIG. 3B illustrates attachment interface 24 configured into liquid dispensing apparatus 10 about liquid flow path 12 before outlet 18. In the aspects illustrated in FIGS. 3A-3C, liquid flow control and beverage preparation capsule 100 is threadably mated to liquid dispensing apparatus 10. For example, liquid flow control and beverage preparation capsule 100 is configured with a threaded attachment interface 114 that mates with threaded attachment interface 24 in liquid dispensing apparatus 10, as best illustrated in FIGS. 3B-3C. Using threaded attachments 24, 114 allows liquid flow control and beverage preparation capsule 100 to be removably received at outlet 18 in liquid dispensing apparatus 10 by threading capsule 100 onto attachment interface 24 in liquid dispensing apparatus 10, as illustrated in FIG. 3C.

Figure 4A:
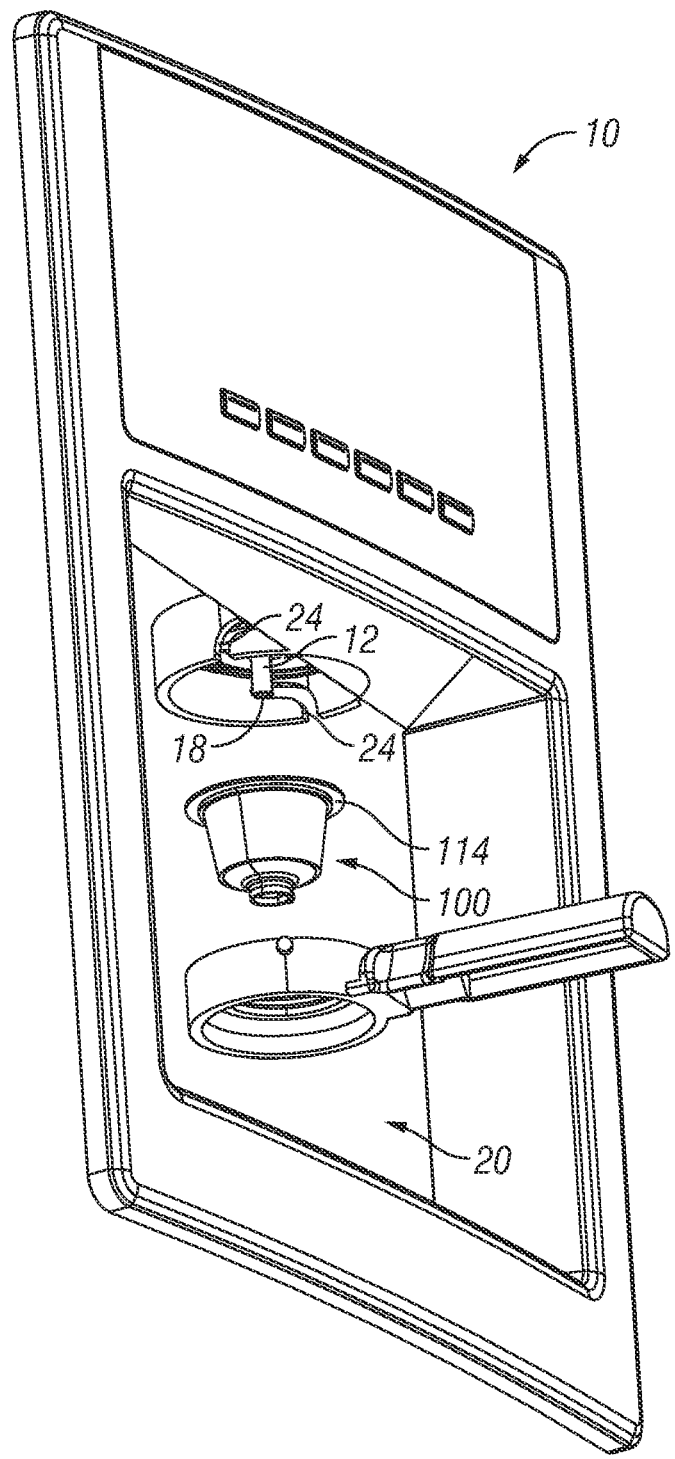
FIG. 4A is a perspective view of the liquid dispenser shown in FIG. 2 with another embodiment of an attachment interface for a liquid flow control and beverage preparation capsule according to an exemplary embodiment of the present invention.
Figure 4B:
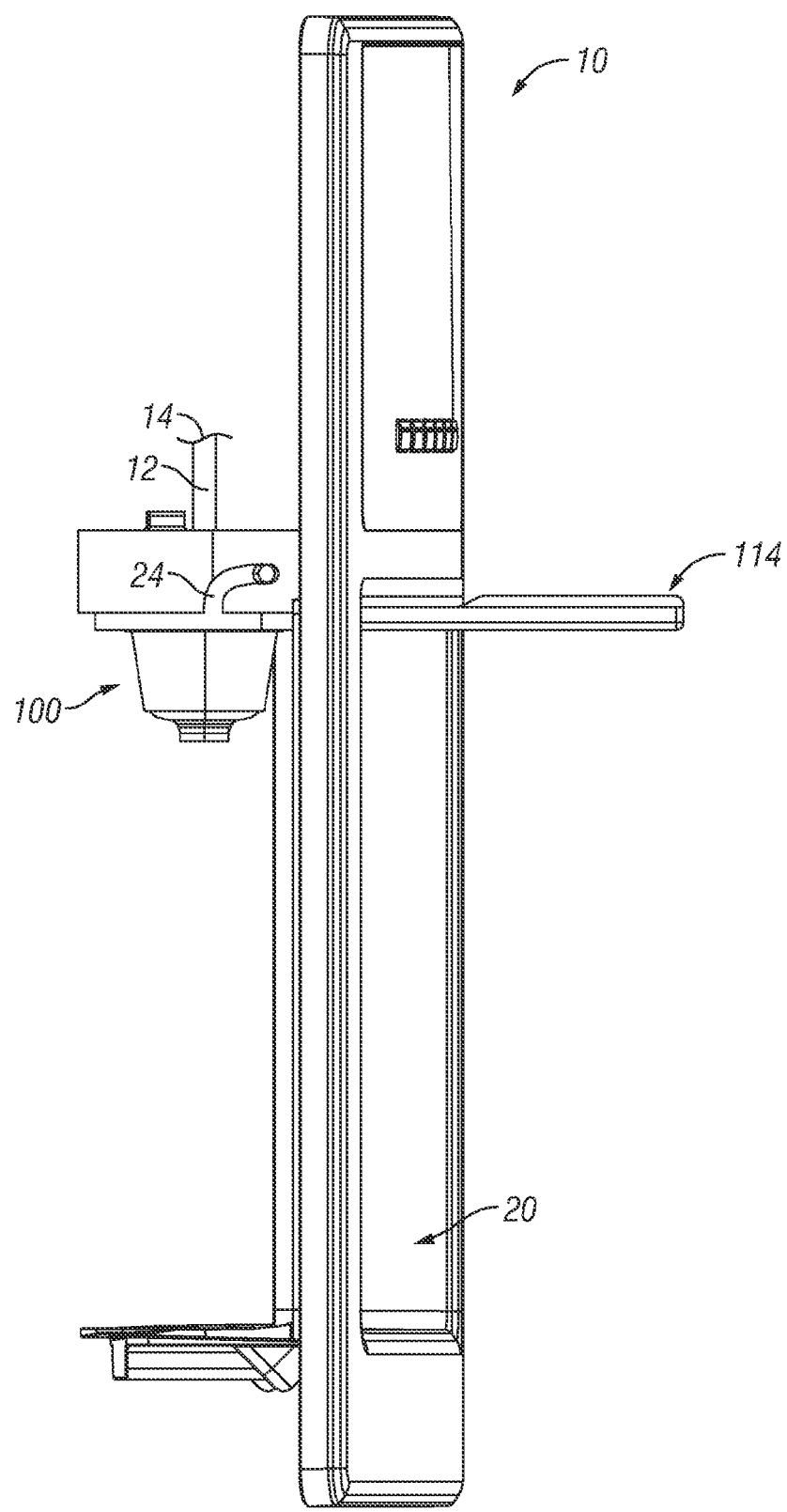
FIG. 4B is a side elevation view of the liquid flow control and beverage preparation capsule attached at the liquid dispenser according to an exemplary embodiment of the present invention.

FIGS. 4A-4B illustrate another means for removably securing capsule 100 to liquid dispensing apparatus 10. As illustrated in FIG. 4A, liquid dispensing apparatus 10 includes an attachment interface 24 about liquid flow path 12 at outlet 18 whereby capsule 100 is removably secured about liquid flow path 12 using attachment interface 114. FIG. 4B illustrates attachment interface 114 secured to attachment interface 24 on liquid dispensing apparatus 10 for removably holding capsule 100 about liquid dispensing outlet 18.

FIGS. 3A-4B illustrate exemplary attachment interfaces or means for securing the apparatuses, methods and systems of the present invention for liquid flow control and beverage preparation. Those skilled in the art can appreciate that any number of attachment mechanisms or means may be used to secure the apparatuses, methods and systems of the present invention within, about or to liquid dispensing apparatus 10. Preferably, at least one of the parts of the liquid flow control and beverage preparation apparatus, illustrated in the various embodiments of the present invention, includes a means for interacting with the liquid dispensing apparatus 10, such as an attachment interface, so as to provide a secure connection between the device and liquid dispensing apparatus 10, such as an indoor dispenser of a refrigerated appliance. For example, the liquid flow control and beverage preparation apparatus as illustrated in the various embodiments of the present invention may be secured, whether removably or permanently, to liquid dispensing apparatus 10 using any of the known attachment mechanisms such as threads (see FIGS. 3A-3C), snaps, pin engagements (see FIGS. 4A-4B), interference, compression or friction fits, or any other connective means commonly known by those skilled in the art. For example, FIGS. 4A-4B illustrate a device with a handle for securing liquid flow control and beverage preparation capsule 100 to liquid dispensing apparatus 10. The device may include means, such as an attachment interface for securing it to the attachment interface 24 in liquid dispensing apparatus 10. It should be noted that capsule 100 may be integrally formed with such a device or separate therefrom. It is not necessary for a capsule 100 to contain separate attaching means, but may include attachment interface 114, that alone allows securement of capsule 100 to liquid dispensing apparatus 10. In the case of the device shown in FIGS. 4A-4B, the device may be used as many times as the capsule 100 is consumed and refilled. The device may also be periodically washed so as to further minimize the potential for back contamination of liquid passing through the liquid flow path 12 in the liquid dispensing apparatus 10.

Liquid Flow Configurations

As shown in FIGS. 5A-5D, liquid flowing through liquid flow path 106 and then provided as beverage 18 for serving or drinking may be controlled, guided and/or directed in varying flow paths depending on the type flow scenarios required for preparation of beverage 118. This is accomplished, by directing liquid flow through one or more beverage preparation processes using liquid flow path 106. Thus, the desired beverage 118, will likely determine the configuration of the liquid flow paths. Furthermore, those skilled in the art can appreciate that different type of enhancement components used to prepare different types of beverages 118 require different fluid liquid constructs. Several types of liquid flow configurations and beverage preparation systems to accomplish the aforementioned objectives of the present invention will now be described, however this list is intended to be descriptive rather than exhaustive of all the various type of liquid flow configurations for facilitating and preparing beverage 118 using the apertures, methods and systems for liquid flow control and beverage preparation.

Figure 5A:
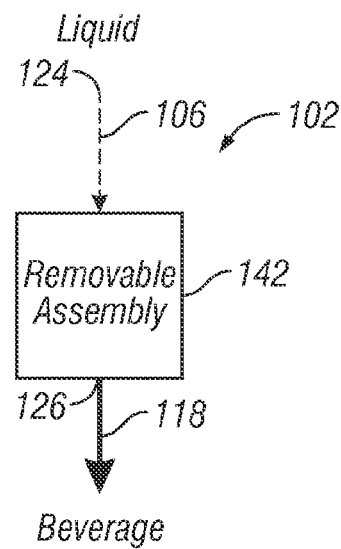
FIG. 5A is a diagram illustrating one liquid flow-through configuration.

FIG. 5A illustrates one exemplary aspect of a flow-through configuration 102 of the present invention. In the flow-through configuration 102, liquid is communicated through liquid flow path 106 passing through removable assembly 142, which may comprise any one or more of the apparatuses, methods and systems of the present invention. For example, liquid flow control and beverage preparation capsule 100 may be positioned anywhere between inlet 124 and outlet 126 of liquid flow path 106, whether with removable assembly 142 or by itself. Liquid passing through liquid flow path 106 passes through removable assembly 142 which may comprise any one of the liquid flow control and beverage preparation capsules, modules, pouches, cartridges, pods or other constructs of the present invention. Thus, in the instance of FIG. 5, removable assembly 142 is used as a generic term for all the different types of liquid flow control and beverage preparation capsules, pods, cartridges, modules, pouches or other constructs of the present invention that may be positioned between inlet 124 and outlet 126 of liquid flow path 106. As liquid passes through removable assembly 142, the liquid may be combined with or affected by an enhancement component (not shown) within the removable assembly 142, thereby dispensing as beverage 118 by changing the nature, such as the chemical or physical nature of liquid passing through liquid flow path 106. Throughout the application, the term "enhancement component" is used. The term enhancement component is to be understood, but not limited to, any flavoring component, a soluble component, a non-soluble component, a powder, a liquid, a brew, a nutraceutical, a medicine, a mineral, a vitamin, an aroma, any combination of the aforementioned enhancement components, or any combination of the aforementioned enhancement components where one enhancement component interacts or reacts with another or with liquid in the liquid flow path to provide the desired beverage. For example, the enhancement component could be a syrup or powder concentrate, coffee or tea grounds. The present invention further contemplates that the enhancement component may be not only to add to a liquid to provide a beverage but also take away a component or some feature/component already existing or added to the liquid to provide a beverage, such as in the case where apparatuses, methods and systems of the present invention are used to provide filtering, purifying, or other conditioning processes of liquid known to others having ordinary skill in the art. Thus, as liquid passes through liquid flow path 106 shown in FIG. 5A, liquid may be chemically or physically altered to provide beverage 118 at outlet 126 of removable assembly 142 using an enhancement component. In the case where removable assembly 142 is empty or without an enhancement component, liquid passing through liquid flow path 106 dispenses at the outlet 126 being unchanged. For example, in the case where water is communicated through liquid flow path 106, and not changed or affected by an enhancement component, water dispenses at outlet 126 as the beverage 118. Thus, depending upon the desired beverage, a removable assembly 142 may or may not include an enhancement component.

FIG. 5A is described as a flow-through configuration 102. The present invention uses the term "flow-through" to indicate the origination of a flow stream from the inlet 124 passing through flow path 106 whether directly, indirectly or divertedly through chamber or a removable assembly 142 configured for receipt of one or more of the liquid flow control and beverage preparation devices of the present invention. "Flow-through is also used to indicate liquid dispensed at an outlet in the same liquid flow path having the inlet. Thus, the use of the term "flow-through" should be understood as liquid in the liquid flow path 106 flowing through the housing, chamber, location or spot where the enhancement component resides.

Figure 5B:
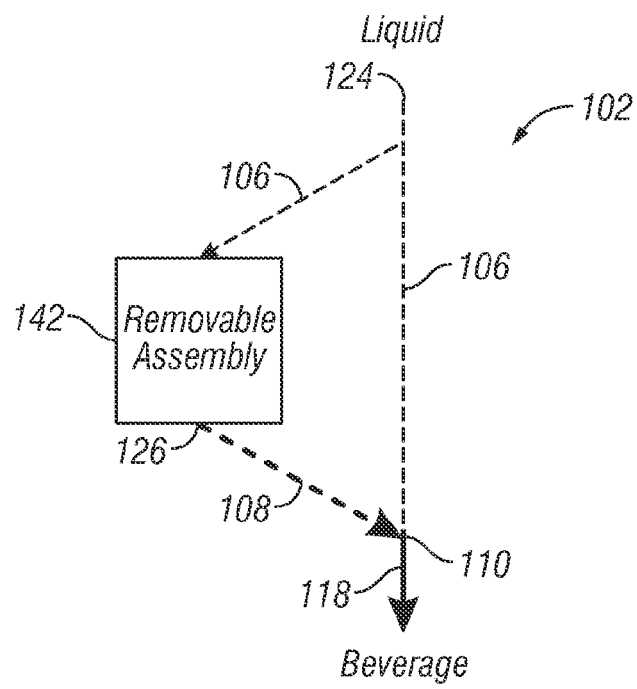
FIG. 5B is a diagram illustrating another liquid flow-through configuration.

FIG. 5B illustrates another flow-through configuration 102. For the purposes of the present invention, flow-through configuration 102 illustrated in FIG. 5B further defines the use of the term flow-through. As previously discussed with regard to FIG. 5A, liquid passes through liquid flow path 106 between an inlet 124 and one or more outlets 126. In the case of flow-through configuration 102 shown in FIG. 5A, all the liquid passing through liquid flow path 106 travels undiverted through liquid flow path 106. In the case of flow-through configuration 102 shown in FIG. 5B, a portion of liquid passing through liquid flow path 106 is diverted through another liquid flow path 106 between the inlet 124 and the outlet 126 of the overall liquid flow path 106. The diverted portion travels through the liquid flow path 106 and is passed through removable assembly 142. In FIG. 5B, removable assembly 142 includes an enhancement component (not shown). The enhancement component could be included with or part of any one of the apparatuses, methods and systems of the present invention. The liquid passing through removable assembly 142 or any of the apparatus, methods, or systems of the present invention, alone or in combination with removable assembly 142 is combined with or affected by the enhancement component and dispenses at the outlet 126 as a beverage. Liquid passing through the removable assembly 142 is combined with or affected by an enhancement component and then travels through enhancement flow path 108 to a mixing point 110 where it combines with liquid in the liquid flow path 106 at mixing 110 to provide beverage 118. Because, like the scenario shown in FIG. 5A, liquid passes directly through the enhancement component (not shown) in removable assembly 142, the liquid flow scenario illustrated in FIG. 5B is considered a "flow-through" configuration 102.

Figure 5C:
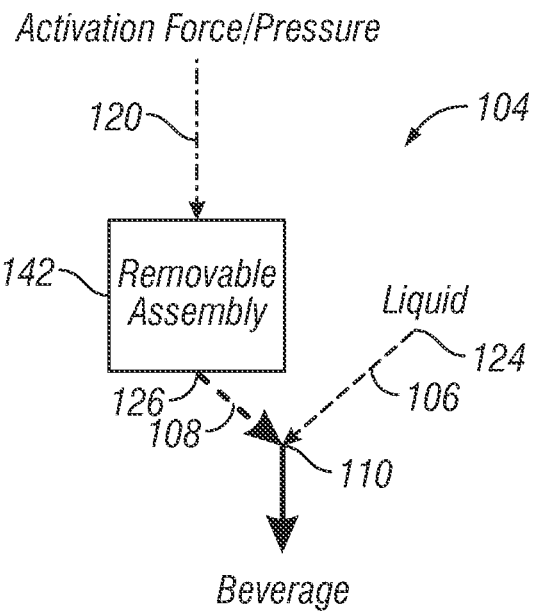
FIG. 5C is a diagram illustrating one parallel liquid flow configuration.

FIG. 5C illustrates a "parallel flow" configuration 104. According to the flow configuration illustrated in FIG. 5C, liquid is passed through the liquid flow path 106 from inlet 124 directly to outlet 126. A removable assembly 142 is provided having an enhancement component (not shown) to combine with or affect liquid passing through liquid flow path 106. As with previous flow configurations, removable assembly 142 may include any one or more of the liquid flow control and beverage preparation devices of the present invention, whether alone or in combination with removable assembly 142. Using force or pressure 120, an enhancement component is dispensed through enhancement flow path 108 to mixing point 110, where enhancement component travelling through enhancement flow path 108 combines with or affects liquid passing through liquid flow path 106 to provide beverage 118. As will be later described, force or pressure 120 causing enhancement component to dispense through enhancement path 108 may include, but should not be limited to, force 120 acting on a bladder or membrane housing enhancement component causing the enhancement component to dispense through enhancement flow path 108, or housing enhancement component in a pre-pressurized membrane or housing that upon opening the housing or membrane, pressure within the housing or membrane dispenses the enhancement component into the enhancement flow path 108 for mixing with liquid from the liquid flow path 106 at the mixing point 110 to prepare beverage 118. The pressure/force acting to dispense the enhancement component could be derived from a positive or negative head pressure resulting from passing liquid through or into liquid flow path 106, such as where vacuum or Venturi effect is used to draw the enhancement component into the liquid flow path 106 or where positive head pressure of the liquid acts on a bladder holding the enhancement component. The term "parallel flow" is distinguishable from a "flow-through" scenario. The use of the term "parallel flow" within the present invention is used to indicate the presence of a liquid flow stream originating separately from the liquid flow path 106 which passes through an enhancement flow path 108 to combine with liquid from the liquid flow path 106. Thus, the use of the term "parallel flow" will indicate flow-through scenarios where the enhancement flow path originates and travels separately from the liquid flow path until the two are combined to prepare a stage or a final form of the beverage.

Figure 5D:
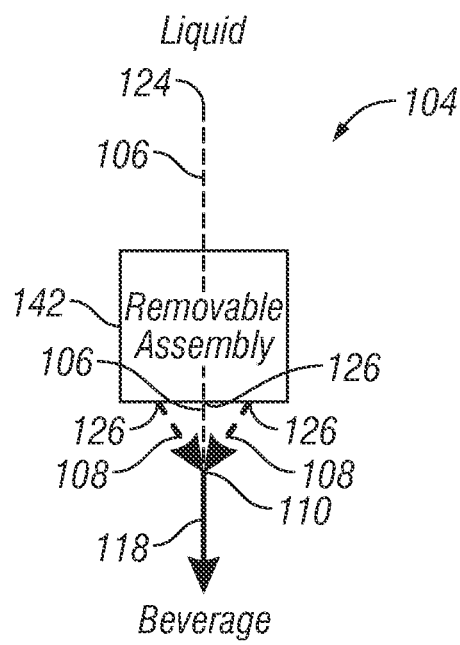
FIG. 5D is a diagram illustrating another parallel liquid flow configuration.

FIG. 5D illustrates another parallel flow configuration 104. In FIG. 5D, liquid passes from inlet 124 through liquid flow path 106 into removable assembly 142. Liquid passes through liquid flow path 106 then removably assembly 142 and exits removable assembly 142 through outlet 126. The passing of liquid through liquid flow path 106 within removable assembly 142 causes an enhancement component (not shown) to dispense from removably assembly 142 through outlets 126 into enhancement flow path 108. Enhancement flow paths 108 and liquid flow path 106 join at mixing point 110 to provide beverage 118. In the flow scenario illustrated in FIG. 5D, enhancement flow paths 108 originate and travel separately from liquid flow path 106 until the point at which liquid flow path 106 and enhancement flow paths 108 combine at mixing point 110. Although the enhancement flow path 108 may be very small relative to liquid flow path 106, the two flow paths are distinct from one another and flow separate from one another at least until the two combine at mixing point 110. The parallel flow configuration 104 shown in FIG. 5D is designed such that liquid passing through liquid flow path is used to move an enhancement component through enhancement flow path 108 to combine with liquid from liquid flow path 106 at mixing point 110 to provide beverage 118. For example, in one exemplary aspect of the present invention, passing liquid through liquid flow path 106 draws an enhancement component through enhancement flow 108 path to join with liquid flow path 106 at mixing point 110 by Venturi effect or the presence of a negative head at the outlet of enhancement flow path 108.

Although FIGS. 5A-5D illustrate flow-through and parallel flow configurations, those shown are not exhaustive of all the different flow configurations contemplated by the present invention. However, all of the different flow scenarios of the present invention can be described as a "parallel flow" or "flow-through" configuration based on the definitions and description. The robustness of the present invention is a result of recognition that the flow-through and parallel flow configurations illustrated in FIGS. 5A-5D can be used separately, together, or reconfigured, for example, to take a traditional flow-through scenario and reconfigure it to a parallel flow scenario or vice versa. Furthermore, the present invention contemplates the combination of parallel and flow-through scenarios, for example, the combination of one or more of the liquid flow control and beverage preparation devices of the present invention with one or more of the other devices of the present invention to provide a combination of flow-through or parallel flow liquid dispensing scenarios. Apparatuses, methods and systems for liquid flow control and beverage preparation using the flow scenarios described in FIGS. 5A-5D will be illustrated and discussed in subsequent figures and detailed description discussed herein. These embodiments are not exhaustive and alternatives or similar systems are contemplated.

Liquid Flow Control and Beverage Preparation Pod

Figure 6A:
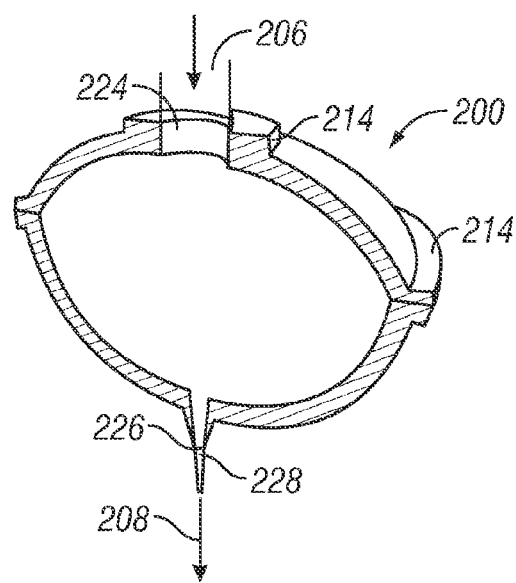
FIG. 6A is a sectional view of one embodiment of a liquid flow control and beverage preparation pod configurable to a flow-through or parallel flow configuration according to an exemplary aspect of the present invention.
Figure 6B:
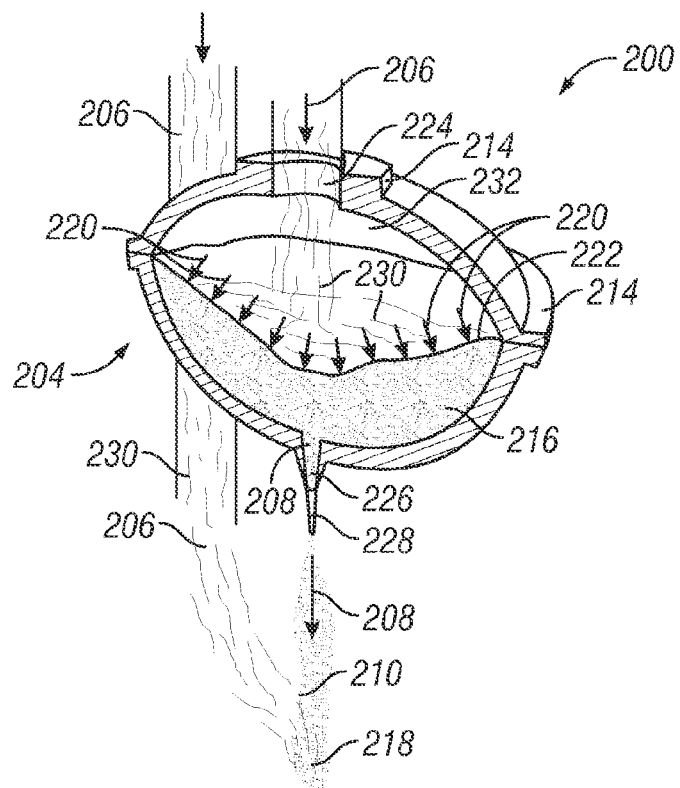
FIG. 6B is a sectional view of the liquid flow control and beverage preparation pod shown in FIG. 6A configured to a parallel flow mode according to an exemplary embodiment of the present invention.
Figure 6C:
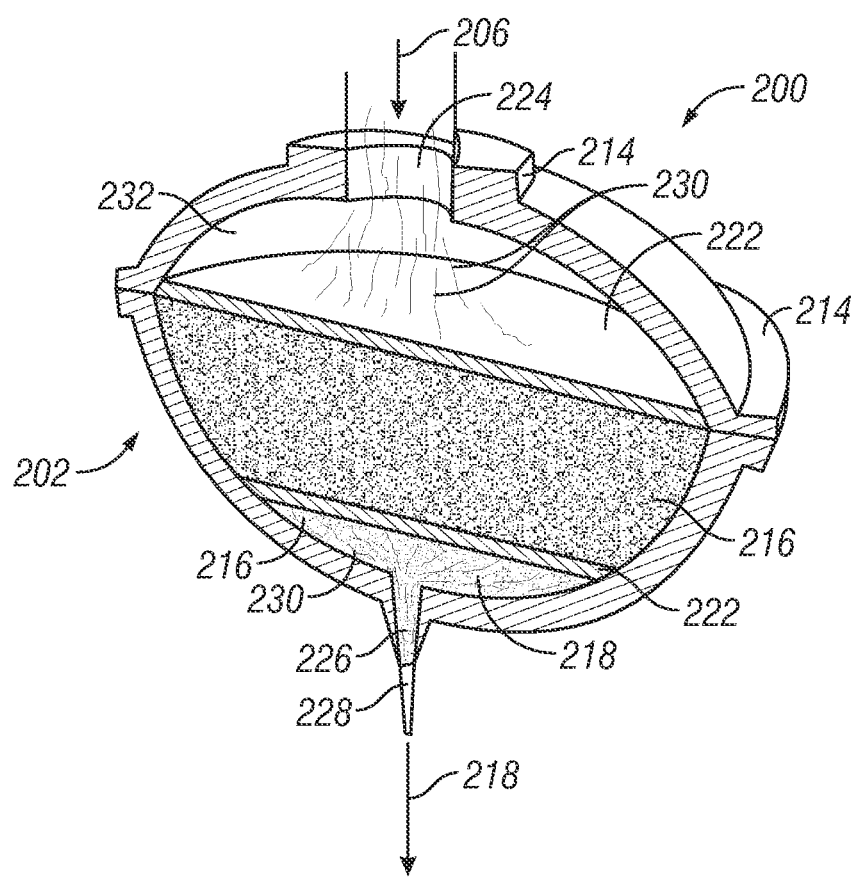
FIG. 6C is a sectional view of the liquid flow control and beverage preparation pod shown in FIG. 6A configured to a flow-through mode according to an exemplary embodiment of the present invention.

FIGS. 6A-6E illustrate one exemplary aspect of a liquid flow control and beverage preparation pod 200 of the present invention. The illustrations in FIGS. 6A-6C illustrate the ability of the present invention to reconfigure liquid flow control and beverage preparation pod 200 between a flow-through configuration 202 (shown in FIG. 6C) and a parallel flow configuration 204 (shown in FIG. 6B). Although liquid flow control and beverage preparation pods 200 illustrated in FIGS. 6B and 6C have many of the same features, both can be altered to facilitate parallel or flow-through dispensing by swapping-out or changing one or more of the components within the device. The benefits of being able to perform both parallel flow-through dispensing with the same liquid flow control and beverage preparation pod 200 will become clear by way of illustration and discussion in the preceding descriptions. First, the ability to dispense a myriad of beverages necessarily requires different liquid flow architecture within liquid flow control and beverage preparation pod 200. By way of example, a beverage resulting from brewing, such as coffee or tea, is achieved primarily by providing a liquid flow-through configuration (where liquid percolates through the brew and dispenses as a beverage). Conversely, parallel flow configurations are often best for creating carbonated beverages and enhancing a liquid stream that has already received some form of conditioning or another, such as the addition of a concentrate (such as syrup) to the carbonated liquid stream. FIG. 6A illustrates liquid flow control and beverage preparation pod 200 void of liquid flow control components. Liquid flow control and beverage preparation pod 200 includes a liquid flow path 206 that enters into liquid flow control and beverage preparation pod 200 by way of inlet 224. Liquid flow path 206 having inlet 224 is adapted for liquid communication with a source of liquid, such as a liquid dispenser. Liquid flow control and beverage preparation pod 200 also includes an outlet 226 adapted for communication with a receiving point where the beverage prepared from using liquid flow control and beverage preparation pod 200 is captured in a receptacle, such as a cup. Outlet 226 of liquid flow control and beverage preparation pod 200 may include a seal or plug 228 for closing off outlet 226. The body of pod 200 may include attachment interfaces 214, for securing pod 200 within or to a liquid dispenser as shown by way of example in FIGS. 3A-4B. Liquid flow control and beverage preparation pod 200 is designed to be positionable between the inlet and outlet or at the outlet of the liquid flow path of a liquid dispenser. Furthermore, liquid flow control and beverage preparation pod 200 is designed so that is configurable between a flow-through configuration (shown in FIG. 6C) adapted to produce the enhanced beverage 218 by passing liquid through liquid flow path 206, and a parallel flow configuration (FIG. 6B) adapted to produce the enhanced beverage 218 by passing liquid through liquid flow path 206 and an enhancement component 216 through an enhancement flow path 208, and combining the two flow paths at a mixing point 210. Using the attachment interface 214 on pod 200, pod 200 could be screwed within a liquid dispenser between the inlet and outlet of the liquid flow path in the liquid dispenser or at the outlet of the liquid flow path of the liquid dispenser (see FIGS. 3A-4B).

FIG. 6B illustrates another embodiment of the liquid flow control and beverage preparation pod 200 shown in FIG. 6A configured to a parallel flow configuration 204. Like the flow configuration illustrated in FIG. 5C, in FIG. 6B a liquid flow path 206 is provided through which liquid passes through inlet 224 of pod 200. Liquid 230 enters the chamber 232 in pod 200. Chamber 232 is separated from enhancement component 216 within pod 200 by membrane 222. In one aspect, enhancement component 216 may be fully enclosed within membrane 222 or separated from chamber 232 by membrane 222. Membrane 222, is preferably a deformable membrane constructed of a hygienically safe material that has been approved for use in contact with liquid flow streams for human consumption. In the case where enhancement component 216 is housed within membrane 222, enhancement component 216 may be replenished by simply removing membrane 222 from within pod 200 after each use and replacing with a new membrane 222 filled with a new, unused enhancement component 216. Alternatively, in the case where membrane 222 separates enhancement component 216 from chamber 232, pod 200 may be disassembled, washed and sanitized, and enhancement component 216 replenished within the lower half of pod 200, and covered by membrane 222 secured between the upper and lower half portions of pod 200 when reassembled. As liquid 230 enters chamber 232 through inlet 224, the pressure or force 220 associated with liquid 230, whether alone or in combination with the weight of the body of liquid 230 within chamber 232, causes membrane 222 to deform. The deformation of membrane 222 causes enhancement component 216 to dispense through outlet 226. In the case where seal or plug 228 is not removed beforehand, the pressure or force 220 acting on membrane 222 causes seal or plug 228 to separate from outlet 226 of pod 200. As shown in FIG. 5C, a force or pressure acts on removable assembly 142 to dispense an enhancement component through enhancement flow path 108. In the case illustrated in FIG. 6B, liquid 230 is the pressure or force 220 acting on a membrane 222 that causes enhancement component 216 to dispense through enhancement flow path 208. Further, like illustrated in FIG. 5C, a separate liquid flow path is provided which combines with the enhancement flow path at a mixing point to provide a beverage. In the case illustrated in FIG. 6B, liquid flow control and beverage preparation pod 200 is used in combination with another liquid flow path 206 through which liquid 230 passes. Liquid 230 passing through liquid flow path 206 external to pod 200 combines with enhancement component 216 and enhancement flow path 208 at mixing point 210 to provide beverage 218. Although not shown, a valve or flow divider may be used, such as illustrated in FIG. 14B or 16D to partition the liquid flow path 206 into two parallel liquid flow paths 206, one flow path 206 entering through inlet 224 of pod 200 and the other passing externally to pod 200. The valve or flow divider may be used to control the rate at which one flow stream is introduced into the pod 200 to create the necessary activation pressure or force 220, or to control the relative flow rates of enhancement component 216 dispensing from pod 200 and liquid passing through external flow path 206 to thereby control the concentration of beverage 218. In this manner, valve or flow divider may be used to control the flow of liquid into pod 200 and around pod 200 to control the strength of beverage 218. Enhancement component 216 traveling through enhancement flow path 208 joins with or combines with liquid 230 passing through the external liquid flow path 206 downstream of outlet 226 of pod 200. The embodiment shown in FIG. 6B contemplates that the mixing point could be at the outlet 226 of pod 200 in midair to form beverage 218 which is provided at the receiving point and captured in a receptacle, such as a cup. The deformable membrane 222 within pod 200 helps minimize the potential for back contamination of the liquid dispensing apparatus, such as the liquid dispensing system of a refrigerator in a case where liquid flow control and beverage preparation pod 200 is used in combination with an indoor dispenser of a refrigerated appliance. Those skilled in the art can appreciate that chamber 232 need not be separated from enhancement component 216 by a membrane 222. For example, an air buffer could exist within the upper portion of chamber 232 and act as a buffer between enhancement component 216 in the lower portion of pod 200 and the liquid dispensing system of the liquid dispensing apparatus to which liquid flow control and beverage preparation pod 200 is attached or used in combination with. Thus, by way of example, using the parallel flow configuration 204 of pod 200 shown in FIG. 6B, an enhancement component 216, such as a syrup concentrate, could be housed in the lower half of pod 200 and separated from chamber 232 by membrane 222. The syrup concentrate is dispensed from pod 200 as liquid 230 applies pressure or force 220 on membrane 222 to cause the syrup to dispense and subsequently combine with liquid from the liquid flow path 206 at mixing point 210 to provide beverage 218. By controlling the pressure acting on membrane 222 and the volumetric flow of liquid 232 through liquid flow path 206 external to pod 200, the concentration of beverage 218 may be controlled. For example, in the case where a lightly concentrated beverage is desired, the majority of flow of liquid 230 may be diverted through liquid flow path 206 external to pod 200 whereby liquid 230 comprises the majority component of beverage 218 and enhancement component 216 dispensed through enhancement flow path and combined with liquid 230 at mixing point 210 comprises a minority component of beverage 218. Alternatively, in the case where a heavily concentrated beverage is desired, the majority of flow could be diverted through pod 200 whereby enhancement component 216 dispenses at a greater rate than liquid 230 flowing through liquid flow path 206 external to pod 200 such that enhancement component 216 is the majority component of beverage 218 and liquid 230 is the minority component of beverage 218 thereby providing a heavily concentrated beverage 218. As previously indicated, liquid flow control and beverage preparation pod 200 shown in 6B may be reconfigured with necessary componentry to provide the flow-through configuration 202 of pod 200 shown in FIG. 6C. For example, pod 200 could be used in the parallel flow configuration 204, subsequently rinsed and sanitized and reused to provide the flow-through configuration 202 shown in FIG. 6C.

FIG. 6C illustrates flow-through configuration 202 of liquid flow control and beverage preparation pod 200 according to an exemplary aspect of the present invention. As previously indicated, by swapping out or changing the components within pod 200, pod 200 may be changed or reconfigured between parallel flow and flow-through configurations to provide the requisite liquid flow configurations for preparation of various types of beverages. For example, by reconfiguring membrane 222 shown in FIG. 6B with a different type of membrane 222 shown in FIG. 6C, pod 200 shown in FIG. 6C may be used with hot, brewed, or powder-based enhancement components 216. In the flow-through configuration 202 of liquid flow control and beverage preparation pod 200 shown in FIG. 6C, chamber 232 is separated from enhancement component 216 by membrane 222. Membrane 222 may be a permeable membrane, such as a filter, that retains enhancement component 216 within the lower portion of pod 200. Additionally, outlet 226 of pod 200 may be separated from enhancement component 216 by another membrane 222, such as a permeable membrane. The present invention contemplates that enhancement component may be entirely enclosed within permeable membrane 222 such that membrane 222 may be used and disposed of and replenished by a new membrane having a new enhancement component housed within membrane 222. Alternatively, membrane 222 may be configured to lock within pod 200 to trap enhancement component 216 from escaping through outlet 226 of pod 200. In this embodiment, enhancement component 216 could be replenished after each use and membranes 222 could be removed, washed and sanitized after each subsequent use. The lower membrane 222 positioned within the lower portion of pod 200 could have attachment points for securing membrane 222 within the lower portion. Similarly, the upper membrane 222 could be secured within pod 200 using attachment points using attachment points in the upper portion of pod 200 after filling the lower portion of pod 200 with enhancement component 216. After each use or multiple uses, the upper membrane 222 could be removed and enhancement component disposed of and replenished with a new enhancement component. Like the flow configuration illustrated in FIG. 5A, liquid passes through liquid flow path and is combined or affected by an enhancement component through which the liquid passes to dispense the beverage. Liquid flow control and beverage preparation pod 200 illustrated in FIG. 6C presents the same liquid flow scenario as illustrated in FIG. 5A. Liquid flow control and beverage preparation pod 200 has a liquid flow path 206 having an inlet 224 adapted for fluid communication with a source of liquid, such as a source of liquid available at a liquid dispensing apparatus, and an outlet 226 adapted for fluid communication with a receiving point, such as a receiving point provided at a liquid dispensing apparatus (see liquid dispensing apparatus shown in FIGS. 1A-4B). Liquid flow control and beverage preparation pod 200 is designed to be positionable between the inlet and outlet or at the outlet of the liquid flow path of the liquid dispensing apparatus such that liquid 230 passing through liquid flow path 206 enters pod 200 through inlet 224. Liquid 230 enters into chamber 232 and begins to fill chamber 232 and passes through permeable membrane 222. As liquid 230 percolates through enhancement component 216, liquid 230 is combined with or affected by enhancement component 216 and passes through the lower permeable membrane 222 as a beverage 218 which is subsequently dispensed from pod 200 through outlet 226. Seal or plug 228 may be removed prior to use of pod 200. Alternatively, the pressure or force of liquid 230 passing through pod 200 may cause seal or plug 228 to release from outlet 226 of pod 200 to thereby allow beverage 218 to dispense through outlet 226. In this manner, pod 200 may be used to prepare a beverage 218 that requires a flow-through configuration 202 as illustrated in FIG. 6C. For example, in the case where a brewed beverage 218 is desired, tea, coffee or other grounds may be placed between membranes 222 such that liquid 230, whether heated or not, percolates through enhancement component 216 (coffee, tea or other brew) providing a brewed beverage 218 at outlet 226 of pod 200. As indicated in the liquid dispensing scenario shown in FIG. 5A, removable assembly 142 could be any of the apparatuses, methods and systems for liquid flow control and beverage preparation of the present invention. The control of liquid flow into pod 200 may be controlled/enabled by another apparatus, method or system of the present invention, such as liquid flow control and beverage preparation module 400 shown in FIG. 14C or liquid flow control and beverage preparation system 500 shown in FIG. 16E. Using the modules and systems shown in FIG. 14C and FIG. 16E in combination with a liquid dispensing apparatus, such as those illustrated in FIGS. 1A-4B, liquid flow through pod 200 may be controlled. Furthermore, pod 200 may be removably inserted at the liquid dispensing interface of the liquid dispensing apparatus, using the desired enhancement component, for providing the desired beverage. For example, in the case where a brewed beverage is desired, the level of concentrate or the level of brew may be controlled by diverting a portion of liquid passing through the liquid flow path through an external flow path such as the flow path 206 illustrated in FIG. 6B passing outside of pod 200 (see also FIG. 16D). Using, for example, the embodiment illustrated in FIG. 16D, a portion of the liquid flow may be diverted through pod 200 and external to pod 200 to thereby control the level of concentration of the beverage 218. This could be accomplished by splitting a hot water stream by sending a portion of the water stream through pod 200 and the other portion external to pod 200 based upon the setting of the flow divider or the valve used to separate the streams. Using an actuator or by manual operation, the proportion of liquid flow through and around pod 200 could be controlled to thereby control the level of concentration of beverage 218. In the case where a strong beverage is desired, all of the liquid flow could be directed through pod 200 to combine with enhancement component 216 and dispense as beverage 218. Alternatively, in the case where a weaker beverage 218 is desired, a majority of the flow may be diverted around pod 200 such that the majority of liquid flow passes through the liquid flow path and recombines with enhancement component in the enhancement flow path to provide a less concentrated beverage 218.

Figure 7A:
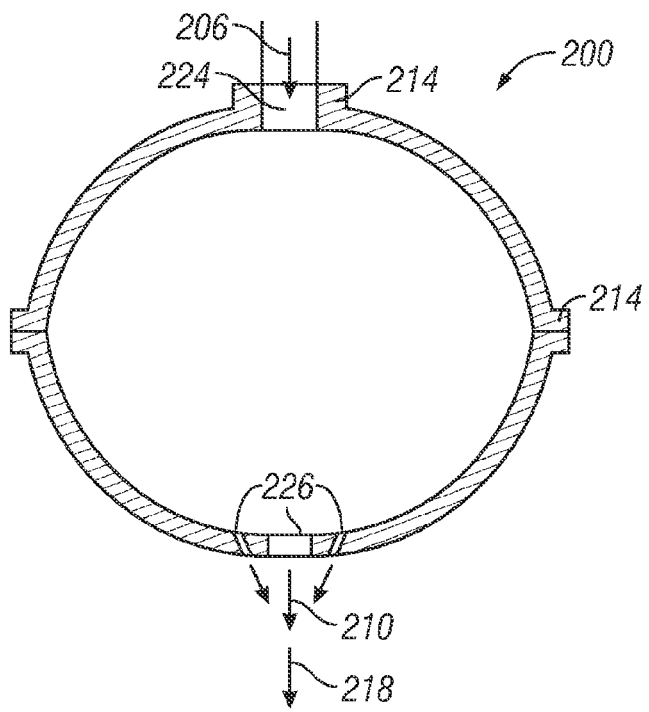
FIG. 7A is a sectional view of another embodiment of a liquid flow control and beverage preparation pod configurable to a flow-through or parallel flow configuration according to an exemplary aspect of the present invention.
Figure 7B:
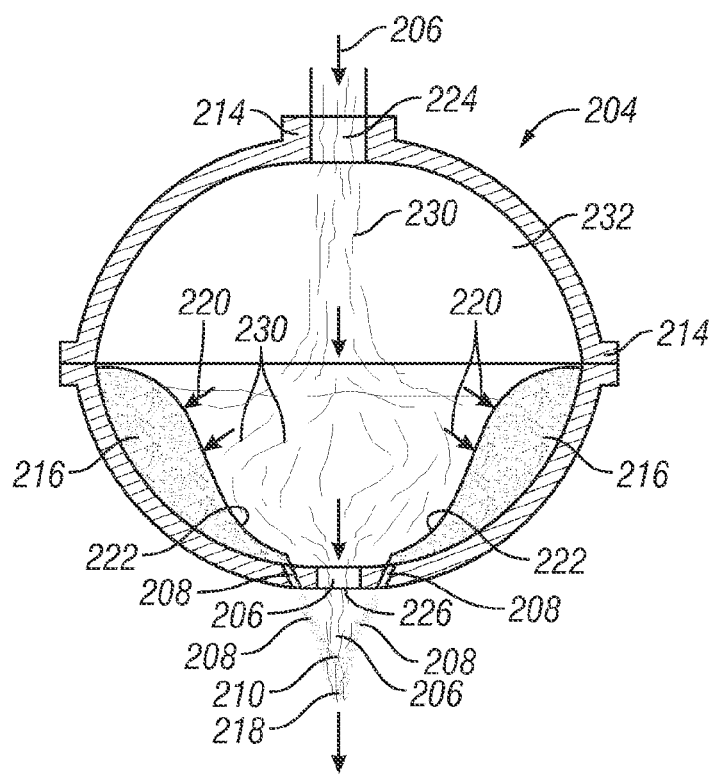
FIG. 7B is a sectional view of the liquid flow control and beverage preparation pod shown in FIG. 7A configured to a parallel flow mode according to an exemplary embodiment of the present invention.
Figure 7C:
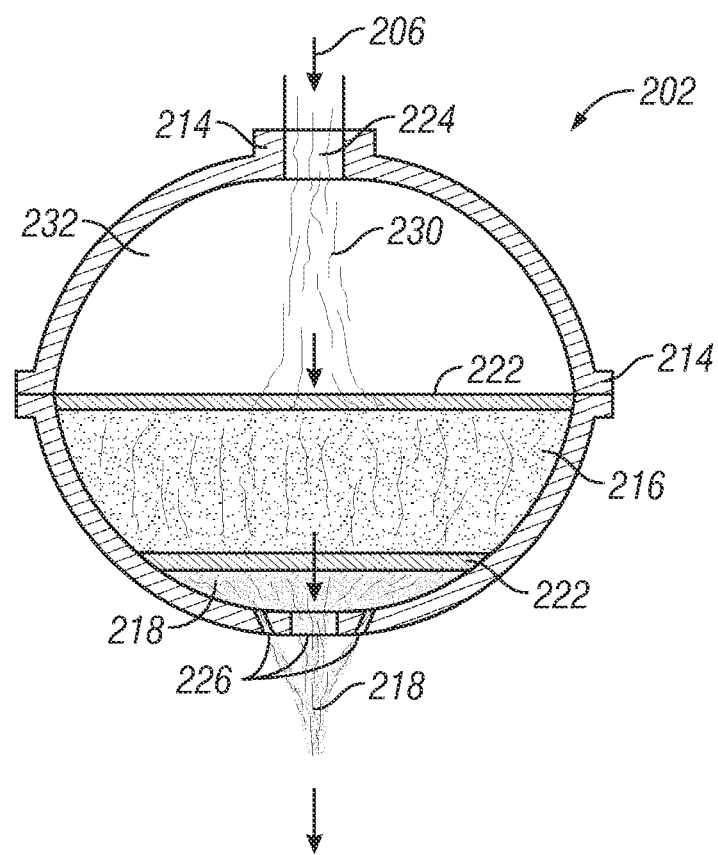
FIG. 7C is a sectional view of the liquid flow control and beverage preparation pod shown in FIG. 7A configured to a flow-through mode according to an exemplary embodiment of the present invention.

FIGS. 7A-7C illustrate another exemplary liquid flow control and beverage preparation pod 200 of the present invention. Like pod 200 illustrated in FIG. 6A, pod 200 shown in FIG. 7A includes an upper and lower portion which may be disassembled for changing the internal components of pod 200. Pod 200 is configured and adapted to be positionable between the inlet and outlet of a liquid flow path of a liquid dispensing apparatus or at the outlet of a liquid dispensing apparatus. For example, pod 200 could be secured at the liquid dispensing outlet 18 of the water/ice dispenser of a refrigerated appliance using one or more of the attachment means shown (see FIG. 4A). Pod 200 is designed to be configurable between flow-through configuration 202 (shown in FIG. 6C) and parallel flow configuration 204 (shown in FIG. 7B) by swapping out the internal components of pod 200. Liquid flow control and beverage preparation pod 200 also includes attachment interfaces 214 which may be used in securing pod 200 at the outlet of a liquid dispensing apparatus as shown in FIGS. 3A, 3C, and 4A-4B. Pod 200 also includes outlets 226 in a bottom portion wherein one or more of outlets 226 may have a reduced diameter to restrict or an enlarged diameter to allow greater liquid flows depending upon the desired flow through outlets 226 in the bottom portion of pod 200. FIG. 7B illustrates the parallel flow configuration 204 of liquid flow control and beverage preparation pod 200. Pod 204 may include upper and lower portions that disassemble from one another allowing for replenishment of enhancement component 216, washing and sanitizing of components within pod 204 or pod components themselves, or exchanging pod components to reconfigure pod 204 to a flow-through configuration 202, as shown in FIG. 7C. Enhancement component 216 is separated from chamber 232 in pod 204 by membrane 222. Like previous embodiments, membrane 222 may be a flexible membrane to allow for deformation when acted upon by a pressure/force 220 created by liquid 230. Membrane 222 may totally enclose enhancement component 216 such that when enhancement component 216 has been entirely used, membrane 222 may be removed from pod 204, discarded, and replaced with a new membrane 222 having a new enhancement component 216. Alternatively, membrane 222 may be configured to affix to pod 204 when assembled such that membrane 222 may be filled with the desired quantity of enhancement component 216 and enclosed by assembling pod 204 (attaching lower portion to upper portion). Thus, liquid 230 passing through liquid flow path 206 enters chamber 232 of pod 204. Either the weight of liquid 230 or the pressure/force associated with liquid 230 entering pod 204, or both, may cause deformation of membrane 222 when pressure/force 220 acts on membrane 222. The deflation or collapsing of membrane 222 causes enhancement component 216 to dispense through enhancement flow path 208 while liquid 230 dispenses through liquid flow path 206 at outlet 226 of pod 204. The two flow paths, the liquid flow path 206 and enhancement flow path 208 combine at mixing point 210 to provide beverage 218. This means that liquid 230 passes through pod 204, through liquid flow path 206 at outlet 226 and combines with enhancement component 216 passing through enhancement flow path 208 at outlet 226; the two combine at mixing point 210 to provide beverage 218. Regarding the liquid flow path 206 and enhancement flow paths 208 at the outlet 226 of pod 204, one or more plugs or seals 228 (not shown) may be used to seal or plug outlets 226 to prevent premature escaping of liquid 230 or enhancement component 216 from pod 204. The seal or plug 228 may also be included at the inlet 224 of pod 204 such that as liquid 230 is passed through liquid flow path 206 toward inlet 224, the seal or plug at inlet 224 and outlets 226 of pod 204 are broken, ruptured or displaced simultaneously to allow dispensing from pod 204 through liquid flow paths 206 and enhancement flow paths 208. Unlike parallel flow configuration 204 of liquid flow control and beverage preparation pod 200 shown in FIG. 6B, flow control of liquid through outlets 226 in pod 204 shown in FIG. 7B is controlled by manipulating the diameter of the orifices of outlets 226 (enhancement flow paths 208 and liquid flow path 206 passing through pod 204 at outlet 226). For example, the aperture of liquid flow path 206 at outlet 226 of pod 204 could be relatively large compared to the diameter of the orifices of enhancement flow paths 208 at outlet 226 of pod 204. In this configuration, liquid 230 would be the majority component of beverage 218 where enhancement component 216 would be the minority component of beverage 218 to thereby provide a weaker concentrated beverage 218. Alternatively, the orifice size of enhancement flow paths 208 at outlet 226 of pod 204 could be enlarged relative to the orifice size of liquid flow path 206 at outlet 226 of pod 204 so that a greater portion of enhancement component 216 is dispensed and combined with liquid 230 from liquid flow path 206. In another aspect of the parallel flow configuration 204 illustrated in FIG. 7B, the diameter of the orifice for liquid flow path 206 may be restricted to increase the force or pressure 220 acting on membrane 222 and at the same time restrict the volumetric flow of liquid 230 flowing out liquid flow path 206. If a heavily concentrated beverage 218 is desired, the diameter of the orifice for liquid flow path 206 may be significantly decreased relative to the size of the diameter of the orifices for the enhancement flow paths 208 such that a larger pressure or force 220 acts on membrane 222 to cause enhancement component 216 to dispense at a faster rate relative to liquid 230 dispensing through liquid flow path 206 thereby increasing the concentration of enhancement component 216 in beverage 218. The present invention also contemplates that pod 204 may be reconfigured with a bottom portion having varying orifice sizes for liquid flow path 206 and enhancement flow paths 208 depending upon the desired concentration of beverage 218. Thus, for example, if a strong beverage 218 is desired, a bottom portion with the requisite diameter orifices is selected to construct pod 204 to provide the desired concentration of beverage 218. It is contemplated that the user may select, for example, a weak, average or strong concentration bottom portion of pod 204 with the requisite orifice diameters to provide the desired concentration of beverage 218. By selecting the bottom portion with the desired orifice diameters and assembling pod 204 with the bottom portion having the desired diameter of orifices or concentration rating, the user can control the strength or concentration of beverage 218. In the parallel flow configuration 204 of liquid flow control and beverage preparation pod 200 shown in FIG. 6B, the concentration of beverage 218 is controlled by valving or dividing the flow stream to control the volume of liquid versus enhancement component; whereas with parallel flow configuration 204 of pod 200 shown in FIG. 7B, the concentration of enhancement component in beverage 218 is controlled by altering the diameter of the orifices for enhancement flow paths 208 and liquid flow path 206. Those skilled in the art can appreciate that the rate at which liquid is introduced into pod 204 may be controlled by valving or flow splitters or some other geometry, other than by controlling the proportional liquid flows using differing orifice diameters. The present invention also contemplates that orifice restrictors may be provided to reduce the diameter of the orifice of the liquid flow path to increase the amount of concentration of enhancement component 216 in beverage 218. The restrictors may be included with the bottom portion of pod 204 or provided as a separate component that are inserted into one or more of the orifices at the outlet 226 of pod 204. In another aspect of the present invention, the proportion of the enhancement component 216 dispensed relative to the proportion of liquid 230 may be controlled by changing the elasticity of membrane 222 to allow a desired amount of deformation for a fixed force or pressure 220 acting on membrane 220 to dispense enhancement component 216 from pod 204. For example, a thicker walled membrane 222 may have a stiffer rigidity and thereby prevent deformation of membrane 222 when acted upon by force or pressure 220, whereas a thinner membrane 222 would be more susceptible to deformation when acted upon by the same force or pressure 220. Thus, by altering the material type and/or thickness of membrane 222, the relative proportions of enhancement component 216 to liquid component 230 being dispensed may be controlled to thereby control the concentration of enhancement component 216 in beverage 218. In addition to controlling the ratio or proportion of enhancement component 216 to the liquid component 230, membrane 222 provides a bather between enhancement component 216 and liquid 230 to prevent enhancement component 216 and/or contaminants from being drawn back up into the liquid dispensing system, such as liquid dispensing apparatuses 10 shown and/or illustrated in FIGS. 1A-4B. Similarly, because enhancement component 216 combines with liquid 230 at a mixing point 210 beyond outlets 226 and pod 204 in mid-air, the likelihood of contaminants being drawn back up into pod 204 or liquid dispensing system of liquid dispensing apparatuses 10 (shown in previous figures) is minimized.

FIG. 7C illustrates the companion pod to the parallel flow configuration 204 of pod 200 shown in FIG. 7B. Thus, pod 204 illustrated in FIG. 7B may be reconfigured with different components to provide a flow-through configuration 202 as illustrated in FIG. 7C. Pod 202 illustrated in FIG. 7C is configured for providing a beverage 218 that is created using enhancement components 216, such as for example coffee, tea, or powder, which are used to impart, affect or combine with liquid 230 communicated into pod 202 through inlet 224 of liquid flow path 206. Pod 202 illustrated in FIG. 7C is not limited to use with only coffee, tea or powders. Other enhancement components 216 may be used, such as for example gels or liquid concentrates. According to one aspect of pod 202 shown in FIG. 7C, a pair of permeable membranes 222, such as a filter membrane, are provided wherein enhancement component 216 is retained between the two. For example, the void between the two permeable membranes 222 may be filled with an enhancement component 216, such as coffee or tea grounds (or any brewable grounds) or even a powder substance whereby liquid 230, is passed through inlet 224 of pod 202, travels through permeable membrane 222, and percolates through enhancement component 216 to combine, join or be affected by enhancement component 216 to dispense as a beverage 218 for drinking, serving or other uses. Like pod 200 illustrated in FIG. 6C, pod 202 may be disassembled and membranes 222 taken out, washed and sanitized and replaced along with enhancement component 216. Upper and lower portions of pod 202 may also be washed and sanitized in the process of recharging or replenishing enhancement component 216. With the reconfiguration of pod 200 from parallel flow configuration 204 shown in FIG. 7B to flow-through configuration 202 shown in FIG. 7C, beverage 218 passing through the lower permeable membrane 222 is discharged from pod 202 through the orifices at the outlet 226 of pod 202. In this embodiment, because pod 202 is a flow-through configuration, liquid 230 passing through pod 202 combines with or is affected by enhancement component 216. Liquid 230 combined with or affected by enhancement component 216 is subsequently dispensed from pod 202 through any one of the orifices at the outlet 226 of pod 202 to provide beverage 218. Like previous embodiments, the upper portion of pod 202 includes a chamber 232 that receives liquid 230 from inlet 224 of liquid flow path 206. An air buffer may be set up within chamber 232 of pod 202 to prevent back contamination of the liquid dispensing system of the liquid dispensing apparatus 10 (see liquid dispensing apparatuses by way of example illustrated in FIGS. 1A-4B). The air buffer created or setup within chamber 232 provides a gap or separation between liquid 230 that has come into contact with membrane 222 or enhancement component 216 from being drawn back up into or coming back into contact with components of the liquid dispensing system of any one of the dispensing apparatuses with which pod 202 is used with. In addition to an air buffer, a material buffer may also be used. A material buffer could be a one-way valve placed at the inlet 224 of pod 202 to prevent backflow of liquid 230 once liquid 230 is introduced into pod 202. One or more plugs or seals (not shown) could be included at inlet 224 and outlets 226 of pod 202 to preserve enhancement component 216 and protect pod 202 from becoming contaminated. Seals or plugs at inlet 224 and outlets 226 of pod 202 could be configured to rupture, dislodge or open upon communication of liquid 230 through liquid flow path 206. Depending upon the desired dispensing regime of beverage 218, seals or plugs at outlets 226 and inlet 224 could be designed to open, rupture or be displaced simultaneously or in sequence. For example, a seal or plug at inlet 224 of pod 202 could be designed with a weaker structure so that the seal ruptures or opens prior to the seals opening or rupturing at outlets 226 of pod 202 to thereby allow liquid 230 to enter and fill a substantial portion of the lower portion of pod 202 and some of the chamber 232 before the lower seal opens. By configuring the seals in the outlets 226 of pod 202 to open or be displaced after the seal at the inlet, liquid 230 within pod 202 is given a chance to percolate within enhancement component 216 for a longer period of time until the pressure/force 220 ruptures or opens the seals or plugs at the outlets 226 of pod 202. Those skilled in the art can appreciate that the material type, thickness or interference fit of a plug within outlets 226 of pod 202 could be configured to control the amount of liquid or the volume of liquid 230 that is received within pod 202 prior to the seal being ruptured or opened or the plug being displaced from outlets 226. Using this type of flow control regime allows pod 202 to provide another feature for controlling the flow and subsequently the concentration of enhancement component 216 in beverage 218.

Liquid Flow Control and Beverage Preparation Capsules

Figure 8A:
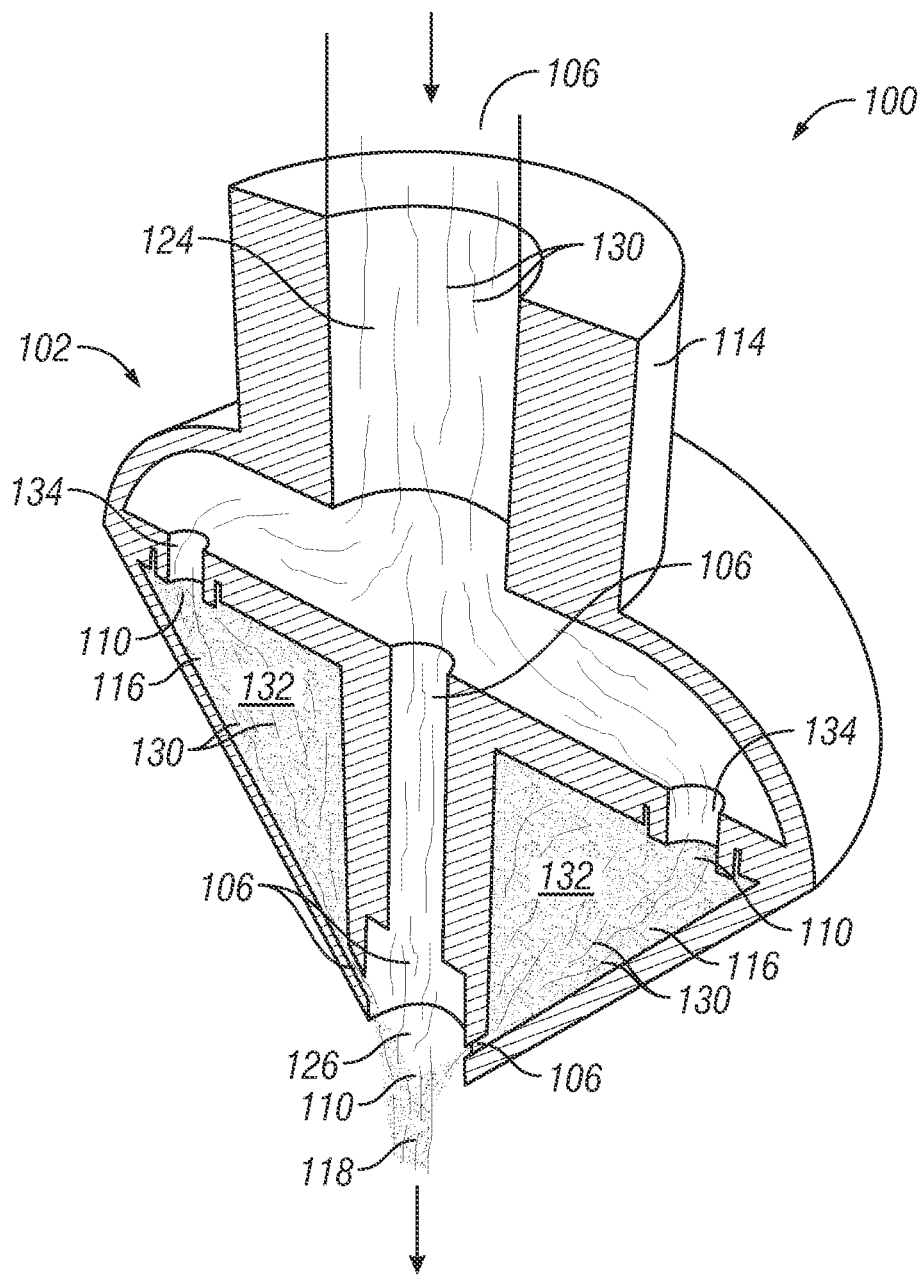
FIG. 8A is a sectional view of one embodiment of a liquid flow control and beverage preparation capsule configurable to a flow-through or parallel flow configuration according to an exemplary aspect of the present invention.
Figure 8B:
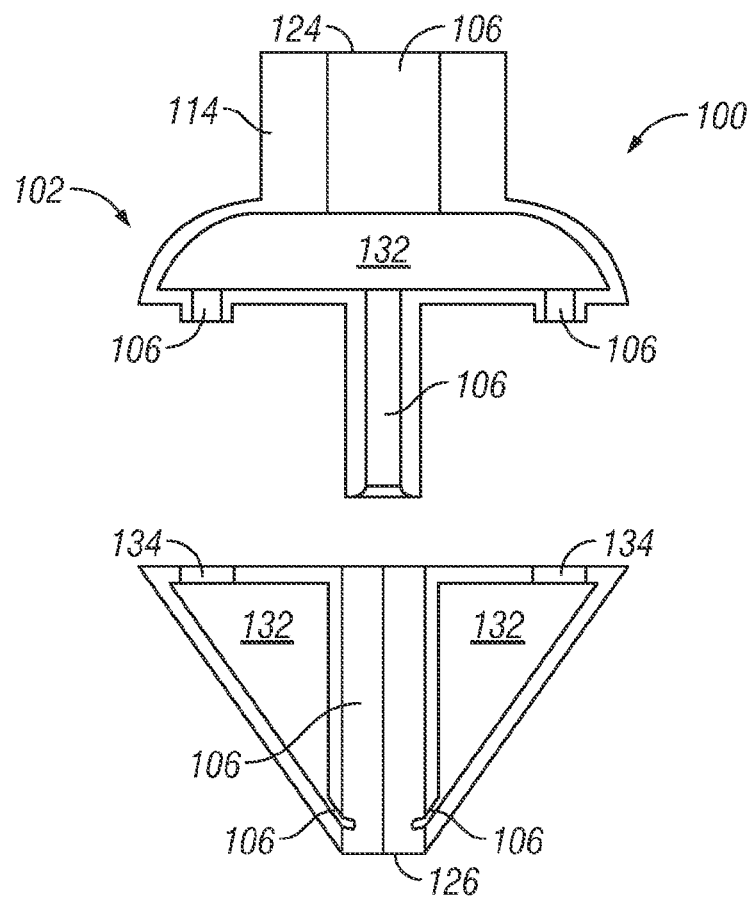
FIG. 8B is a sectional view of some exemplary components of the liquid flow control and beverage preparation capsule shown in FIG. 8A.
Figure 8C:
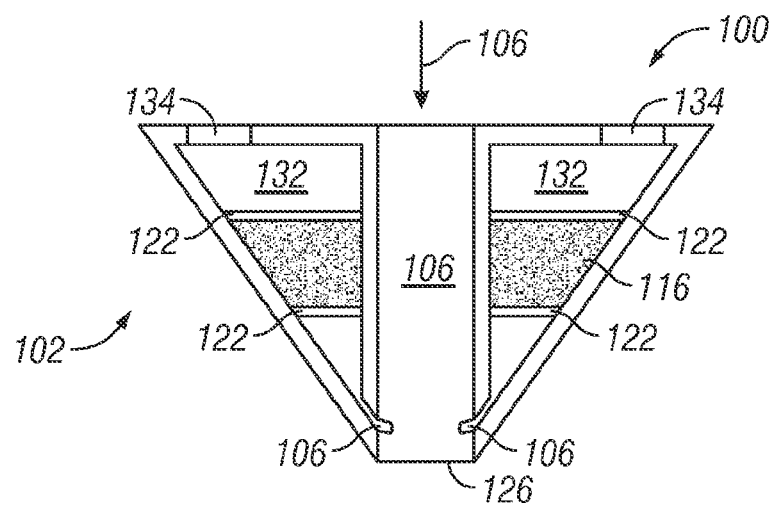
FIG. 8C is a sectional view of the liquid flow control and beverage preparation capsule shown in FIG. 8A configured to a flow-through mode according to an exemplary embodiment of the present invention.
Figure 8D:
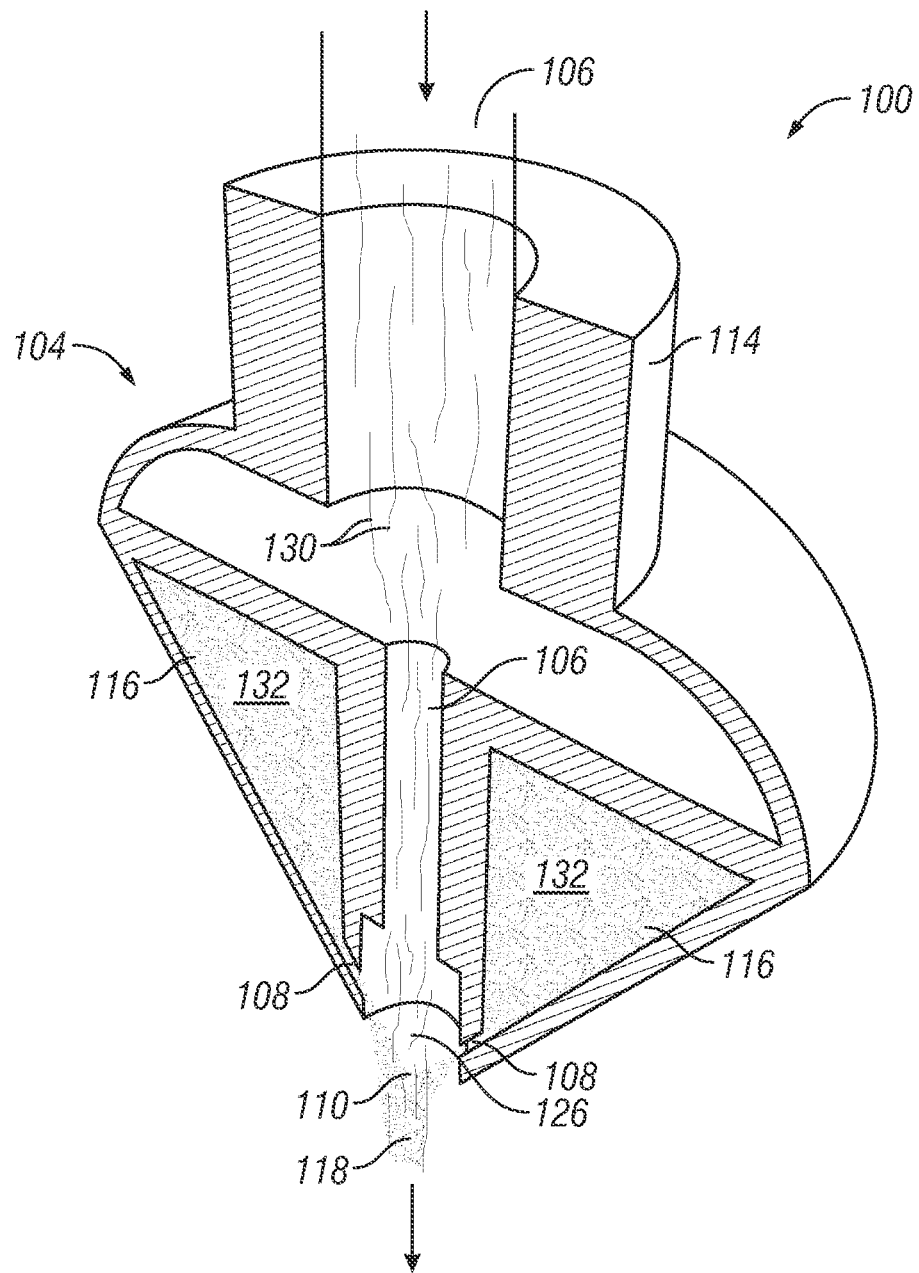
FIG. 8D is a sectional view of the liquid flow control and beverage preparation capsule shown in FIG. 8A configured to a parallel flow mode according to an exemplary embodiment of the present invention.

FIGS. 8A-8D illustrate another exemplary embodiment of a liquid flow control and beverage preparation capsule 100. Specifically, FIGS. 8A-8C illustrate a flow-through configuration 102 of liquid flow control and beverage preparation capsule 100. FIG. 8D illustrates a parallel flow configuration 104 of liquid flow control and beverage preparation capsule 100. Like the capsules and pods previously discussed, liquid flow control and beverage preparation capsule 100 may be configured with an attachment interface 114 for securing to a liquid dispensing apparatus, such as those illustrated in FIGS. 1A-4B. For example, the holding device illustrated in FIG. 4A may be used to secure capsule 100 about a liquid dispensing outlet of any one or more of the liquid dispensing apparatuses previously discussed and/or contemplated. Liquid flow control and beverage preparation pod 100 may be included as a component part of one or more of the liquid flow control and beverage preparation modules and systems of the present invention, such as for example liquid flow control and beverage preparation modules illustrated in FIGS. 14A-14D or liquid flow control and beverage preparation systems illustrated in FIGS. 15A-17D. In these instances, capsule 100 may be removably received within any one of the liquid flow control and beverage preparation modules or systems of the present invention, used and subsequently recharged with the enhancement component or discarded. Additionally, as illustrated in FIG. 8B, capsule 100 may include separable upper and lower portions. The upper portion of capsule 100 may include one or more types of attachment means such as an attachment interface 114 for securing to or about a liquid dispensing outlet of one or more of the liquid dispensing apparatuses shown, illustrated or contemplated by the present invention. The lower portion of capsule 100 could be separated from the upper portion to fill chamber 132 with an enhancement component, recharge chamber 132 with a new enhancement component, and/or for washing and sanitizing the lower portion of capsule 100. Like the other flow-through configurations previously illustrated and discussed, flow-through configuration 102 of capsule 100 shown in FIG. 8A receives liquid 130 through liquid flow path 106 at the inlet 124 of capsule 100. Liquid entering inlet 124 could comprise any type of conditioned liquid stream, such as a chilled, heated, carbonated or another like condition liquid stream. For example, some liquid dispensing apparatuses dispense various types of conditioned liquid streams whether heated, chilled or carbonated. Any liquid stream preparable by the liquid dispensing could be presented at the inlet 124 of capsule 100. As previously discussed, the type of liquid stream or the conditioning of the liquid 130 will depend upon the type of beverage being prepared. For example, in the case of preparing a brewed beverage, the liquid stream is a heated liquid stream. Liquid dispensing apparatuses that prepare and dispense heated liquid streams are known in the art.

Internally, capsule 100 may be partitioned into one or more chambers 132. Enhancement component 116 is stored or housed within the one or more chambers 132. Liquid flow path 106 is in fluid communication with one or more of the chambers via ports 134 extending through the chamber walls. Thus, liquid flow path 106 travels through a central liquid flow path 106 and through ports 134 into chambers 132 housing enhancement component 116. Those skilled in the art can appreciate that the diameter of ports 134 and central liquid flow path 106 could be enlarged or restricted to vary the volumetric flow of liquid 130 through ports 134 and liquid flow path 106. The variation in diameter between ports 134 and the central liquid flow path 106 could be varied relative to one another to control concentration of beverage 118. Chambers 132 housing enhancement component 116 are also in fluid communication with the central liquid flow path 106 via liquid flow paths 106 at or near outlet 126 of capsule 100. Like ports 134, the diameter of the liquid flow paths 106 may be enlarged or restricted to control the volumetric flow of the combination of liquid 130 and enhancement component 116 from chambers 132 into the central liquid flow path 106. Seals or plugs (not shown) may be included at inlet 124, ports 134, liquid flow paths 106 and/or outlet 126 of capsule 100. The seals or plugs could be configured to rupture or be dislodged simultaneously or consecutively. For example, in one aspect of the present invention, a seal at inlet 124 could be ruptured by passing liquid 130 through liquid flow path 106 which subsequently ruptures seals at ports 134 and/or the inlet of the central liquid flow path 106, following which a seal or plug at outlet 126 could be separated from outlet 126 to allow liquid 130 to pass simultaneously through chamber 132 and central liquid flow path 106. In another aspect of the present invention, outlet 126 could include a plug and inlet 124 a seal, wherein the seal at the inlet 124 and the plug at the outlet 126 are simultaneously opened by passing liquid 130 through liquid flow path into inlet 124 of capsule 100 or exposing the seal and plug to the pressure associated with liquid 130. Those skilled in the art can appreciate that the type of material and thickness of the material used for the seal may be used to control the point at which the seal opens or ruptures depending upon the force/pressure of liquid 130 acting on the seal. Using different types of materials and different thicknesses for the seals, the seals positioned at different points, such as at inlet 124, ports 134 and outlet 126 of capsule 100, may be designed to rupture or open simultaneously or consecutively depending upon the desired operation of capsule 100.

According to an exemplary method of the present invention, liquid 130 passes through inlet 124 from liquid flow path 106 into capsule 100. Liquid 130 is diverted through ports 134, and a portion of liquid 130 passes through the central liquid flow path 106. The present invention contemplates that other liquid flow control architectures or geometries may be included in liquid flow path 106 to control how liquid 130 is diverted, whether through central liquid flow path 106 and/or ports 134. Liquid 130 passing through ports 134 enters chambers 132 and is combined or affected by enhancement component 116. Liquid 130 and enhancement component 116 dispense together into the central liquid flow path 106 through liquid flow paths 106 at or near outlet 126 of capsule 100. The liquid 130 traveling through central liquid flow path 106 then combines with the mixture of enhancement component 116 and liquid 130 at mixing point 110 to provide the final beverage 118. As previously indicated, by controlling the diameter of the orifices of central liquid flow path 106 and ports 134, the concentration of beverage 118 may be controlled. For example, in the case where capsule 100 is used for preparing more than one beverage (meaning capsule 100 is not a single serve capsule) the diameter of the orifices of ports 134 could be reduced relative to the diameter of the central liquid flow path 106 to increase the amount of liquid 130 being dispensed relative to enhancement component 116. Similarly, the diameter of the orifices for ports 134 could be enlarged relative to the diameter of the orifice for central liquid flow path 106 so that all of the enhancement component 116 is dispensed during the beverage preparation process providing a more concentrated beverage 118 at outlet 126 of capsule 100. Thus, in one aspect of the embodiment illustrated in FIG. 8A, liquid 130 passing through ports 134 into chambers 132 may be used to "wash out" liquid enhancement component 116 residing in chamber 132 to combine with liquid 130 passing through the central liquid flow path 106.

FIGS. 8B-8C illustrate another flow-through configuration 102 of liquid flow control and beverage preparation capsule 100. As previously discussed, capsule 100 shown in FIG. 8B may include an upper and lower portion separable from one another. The upper portion may include attachment interface 114 for securing about a liquid dispensing outlet of a liquid dispenser or within one or more of the liquid flow control and beverage preparation modules or systems of the present invention. The upper portion of capsule 100 may be permanently or removably secured. For example, the upper portion could be permanently fixed at a dispensing interface of a liquid dispenser so that all the user has to do to prepare a beverage is attach the lower portion having an enhancement component to the upper portion. The lower portion of capsule 100 may be secured to the upper portion using means known to those skilled in the art, including those discussed and contemplated. The upper portion may include a liquid flow path 106 passing through inlet 124 into chamber 132. Liquid flow path 106 may be split into one or more liquid flow paths, such as a central liquid flow path 106 and outer liquid flow paths 106. The lower portion of capsule 100 includes a central liquid flow path 106 and ports 134 through which the central and outer liquid flow paths in the upper portion pass through. The lower portion of capsule 100 may also include one or more chambers 132 for holding an enhancement component 116, such as illustrated in FIG. 8C. Each compartment 132 is in fluid communication with central liquid flow path 106 through the smaller liquid flow paths 106 illustrated in the bottom portion of capsule 100. Enhancement component 116 may be housed or sandwiched between permeable membranes 122 within compartments 132. For example, enhancement component 116 could be included in a permeable membrane that is disposable or a permeable membrane that is washed, sanitized and reused. Enhancement component 116 could also be recharged after each use. Chambers 132 can include one or more attachment points for securing membrane 122 within capsule 100.

According to one method of operation, liquid passes through liquid flow path 106 and is diverted into chambers 132; a portion flows through central liquid flow path 106. The liquid passing through chambers 132 combines with or is affected by enhancement component 116 and dispenses out of the smaller liquid flow paths 106 and joins with liquid 130 in central liquid flow path 106 to provide a beverage at outlet 126. Forming capsule 100 into separate components, such as an upper and lower portions, has many advantages. For example, depending upon the desired beverage, the user may select the lower portion having the desired enhancement component 116 and attach the lower portion to the upper portion for preparing the beverage. In another aspect of the present invention, lower portion could include a liquid concentrate sealed within chamber 132 by seals at ports 134 and outlet 126. The seals at ports 134 could be opened or ruptured upon attachment of the lower portion to the upper portion. This could be accomplished by the liquid flow paths 106 in the upper portion mechanically piercing through seals in ports 134 in the lower portion. Liquid passing through the liquid flow path 106 would open outlet 126 during the beverage preparation process. Those skilled in the art can appreciate that any one of the liquid flow control and beverage preparation pods, capsules, pouches, modules, cartridges or systems of the present invention may be enabled with the concepts and structure illustrated in FIGS. 8B-8C.

FIG. 8D illustrates parallel flow configuration 104 of liquid flow control and beverage preparation capsule 100. The parallel flow configuration 104 has the same basic structure as the flow-through configuration illustrated in FIG. 8A except that capsule 100 shown in FIG. 8B does not include ports 134 whereby liquid 130 passing through liquid flow path may enter into chamber 132 housing enhancement component 116. Like the parallel flow diagram illustrated in FIG. 5D, capsule 100 has a central liquid flow path 106 passing through capsule 100 from inlet 124 to outlet 126. Chamber(s) 132 housing enhancement component 116 are in fluid communication with central liquid flow path 106 at or near outlet 126 via enhancement flow paths 108. In operation, enhancement component 116 is drawn out of chamber(s) 132 by passing liquid 130 through central liquid flow path 106 past the outlets of enhancement flow paths 108 in fluid communication with chamber(s) 132. A drawing, siphoning or Venturi effect is created as liquid 130 passes by enhancement flow paths 108. Because liquid 130 passes by the outlets of the enhancement flow paths 108 with some velocity, a lower pressure is created near the outlets of enhancement flow paths 108 thereby creating a negative head pressure scenario where enhancement component 116 is drawn or sucked out of chamber 132 into liquid flow path 106 to combine with liquid 130 at mixing point 110 to prepare beverage 118. The present invention appreciates that by controlling the diameter of the central liquid flow path 106, the velocity of liquid 130 traveling through liquid flow path 106 may be controlled which in turn controls the negative head pressure or vacuum created at the outlet of enhancement flow paths 108 for drawing enhancement component 116 into combination with liquid in central liquid flow path 106. Like other embodiment of the present invention previously discussed and illustrated, one or more seals or plugs may be included at inlet 124 and outlet 126 of capsule 100. The seals or plugs may be configured to open simultaneously or consecutively. For example, outlet 126 of capsule 100 could be secluded with plug 128 illustrated in FIG. 9B. As liquid 130 passes through liquid flow path 106 the pressure of the liquid dislodges the plug 128 from outlet 126 thereby starting the beverage preparation process. Like all the embodiments of the liquid flow control and beverage preparation capsules, pods, pouches or cartridges of the present invention, capsule 100 illustrated in FIG. 8B may be reusable (rechargeable) or a single serving disposable type capsule. For example, capsule 100 could include upper and lower portions so that the lower portion may be recharged with an enhancement component and reassembled to the upper portion to provide a reusable type capsule. Similar to those considerations previously discussed, the concentration of beverage 118 dispensed from capsule 100 shown in FIG. 8D may be controlled by altering the diameter of the central liquid flow path 106 relative to the diameter of enhancement flow paths 108 in communication with enhancement component 116 in chamber(s) 132. For example, in the case where capsule 100 is a multiple use embodiment, the diameter for the central liquid flow path 106 may be significantly larger than the diameter of the enhancement flow paths 108 in the case where a weaker concentrated beverage 118 is desired. In this instance, beverage 118 would consist mainly of liquid 130 as very little enhancement component 116 would be drawn from chambers 132. Alternatively, in the case where a stronger concentrated beverage 118 is desired, the diameter of the enhancement flow paths 108 could be enlarged relative to the diameter of the central liquid flow path 106 such that a greater volume of enhancement component 116 is metered into liquid flow path 106 which has a reduced volumetric flow thereby providing a more concentrated beverage 118 at outlet 126. Similar to earlier written description and embodiments of the present invention, capsule 100 could be designed such that the mixing point 110 of enhancement component 116 and liquid 130 could be at the outlet 126 of capsule in midair to assist in preventing back contamination issues as previously discussed.

Those skilled in the art can appreciate that capsule 100 illustrated in FIGS. 8A-8D may be reconfigured between flow-through configuration 102 and parallel flow configuration 104 depending upon the desired type of beverage being prepared. In the case where capsule 100 includes an upper and lower portion, a lower portion having flow-through configuration could be used for beverages requiring a flow-through configuration and a lower portion having a parallel flow configuration could be used for beverage preparation process requiring a parallel flow configuration. For example, the lower portion could include a flow-through configuration used for brewing such beverages as coffee or tea and then be subsequently swapped out for a different bottom portion having a parallel flow configuration used for preparing carbonated syrup beverages.

Figure 9A:
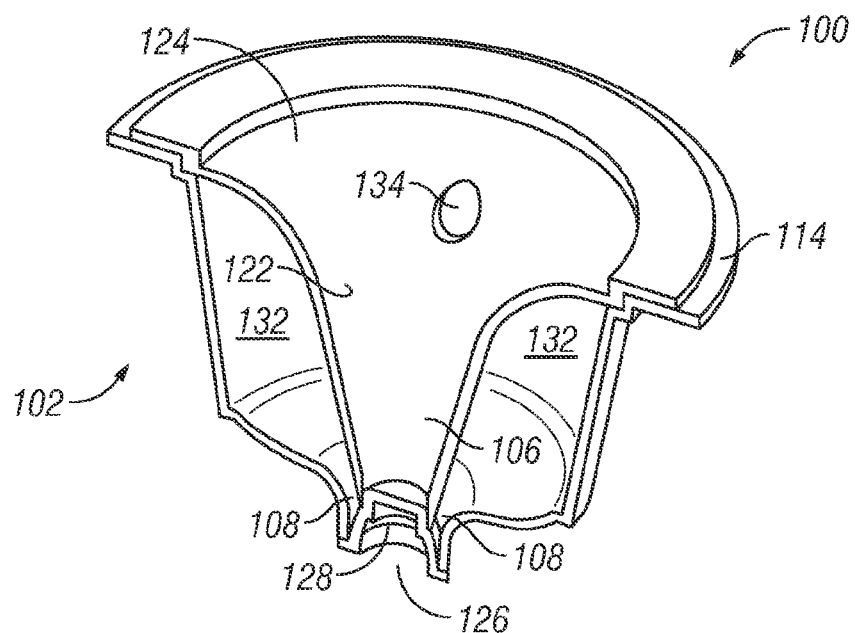
FIG. 9A is a sectional view of another embodiment of a liquid flow control and beverage preparation capsule configured to a parallel flow mode according to an exemplary aspect of the present invention.
Figure 9B:
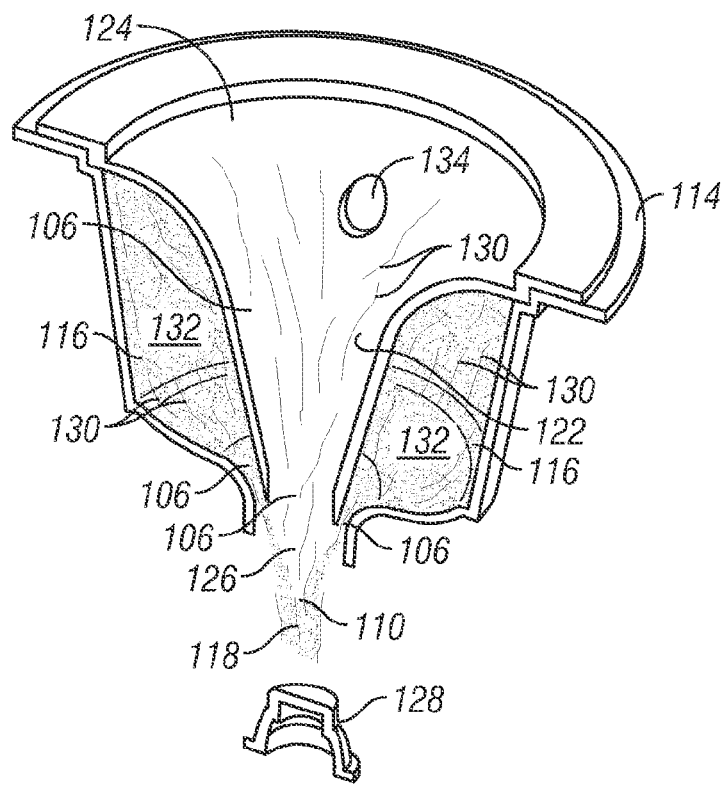
FIG. 9B is another view of the liquid flow control and beverage preparation capsule shown in FIG. 9A.

FIGS. 9A-11B illustrate flow-through and parallel flow configurations of another embodiment of liquid flow control and beverage preparation capsule 100. One type of flow-through configuration 102 of capsule 100 is illustrated in FIGS. 9A-9B. Capsule 100 shown in FIG. 9A has a similar operation to the flow-through diagram illustrated in FIG. 5B. Capsule 100 may be designed as a single integral piece or as a combination of separate components. For example, capsule 100 may include a membrane 122 that is inserted within capsule 100 and a plug or seal 128 at the outlet 126 of capsule 100. The flow-through membrane 122 may be swapped out or exchanged for a parallel flow membrane 122 as illustrated in FIGS. 10A-11B. Membrane 122 may be a rigid, semi-rigid feature or pliable feature depending upon the desired beverage being prepared. As shown, membrane 122 separates liquid flow path 106 from chamber 132. Chamber 132 is adapted to house an enhancement component 116 as illustrated in FIG. 9B. Like those previously discussed, capsule 100 includes attachment mechanism 114 for securing about a liquid dispensing outlet or interface of a liquid dispensing apparatus. Additionally, capsule 100 could be used in combination with any one of the liquid flow control and beverage preparation modules or systems of the present invention (see FIGS. 14A-17D). In the case where membrane 122 is a separate component from capsule 100, membrane 122 may be removed, washed and sanitized after each use. Likewise, capsule 100 and plug 128 could be separated from membrane 122, washed and sanitized for reuse. Membrane 122 could be removably affixed to capsule 100 using means well known to those skilled in the art, including those contemplated and described herein. Enhancement component 116 shown in FIG. 9B could be recharged after each use of capsule 100 by disassembling capsule 100 and reassembling capsule 100 filled with a new enhancement component 116. Membrane 122 may also include one or more ports 134 passing through the wall of membrane 122 into chamber 132. The diameter of port 134 passing through the wall of membrane 122 could be controlled to control the volumetric flow of liquid through port 134 into chamber 132. For example, depending upon the strength of the beverage desired, membrane 122 could be swapped out for another style of membrane having a different sized diameter for port 134. In operation, capsule 100 is sealed at a liquid dispensing outlet whereby liquid 130 is sealably communicated into liquid flow path 106 from the liquid dispenser. Depending upon the diameter and shape of port 134, the volumetric flow of liquid 130 passing through port 134 into chamber 132 may be controlled. Liquid 130 passing through port 134 into chamber 132 combines with enhancement component 116. Liquid 130 is affected or combined with enhancement component and dispensed through liquid flow path 106 near outlet 126. Liquid 130 passing through the central liquid flow path combines with liquid 130 and enhancement component 116 passing from chamber 132 into the central liquid flow path 106 at mixing point 110 to provide beverage 118. Thus, liquid 130 passing into chambers 132 "washes out" enhancement component 116 from chambers 132 to combine with liquid 130 passing through the central liquid flow path 106. In the case where the capsule is a multiple use capsule, the diameter of port 134 could be controlled to control the volumetric flow of liquid 130 through port 134 into chamber 132. For example, if a heavily concentrated beverage 118 is desired, the diameter of port 134 could be enlarged to allow for a higher volumetric flow of liquid 130 into chamber 132. Conversely if a less concentrated beverage 118 is desired, diameter of port 134 could be decreased so that only a small portion of liquid 130 passes through port 134 into chamber 132 leaving the majority of liquid 130 (unaffected by an enhancement component) passing through the central liquid flow path 106. The present invention appreciates that by controlling the diameter of port 134, capsule 100 illustrated in FIG. 9B could be configured from a flow-through configuration to a parallel flow configuration. For example, capsule 100 could be reconfigured to a parallel flow configuration such as those illustrated in FIGS. 10A-11B by reducing the diameter of port 134 to the point where liquid 130 is no longer capable of passing through port 134 into chambers 132. Thus, if only air is allowed to pass through port 134 then enhancement component 116 would pass into liquid flow path without first being combined with liquid 130. Both the inlet 124 and outlet 126 of capsule 100 could include a seal or plug such as plug 128 illustrated in FIG. 9B. The seal or plug at the inlet and outlets of capsule 100 could be ruptured simultaneously or consecutively depending upon the desired beverage preparation process.

According to one exemplary method of operation, capsule 100 is sealed at or about the liquid dispensing outlet or interface of a liquid dispenser. Liquid flow passing into liquid flow path causes the seal at inlet 124 of capsule 100 to open so that liquid 130 passes through liquid flow path 106 into chamber 132. The pressure of liquid 130 acting on plug 128 dislodges plug 128 from outlet 126 allowing liquid 130 and enhancement component 116 to dispense from capsule 100 to a receiving point at the liquid dispenser. As previously indicated, flow-through configuration 102 of capsule 100 illustrated in FIGS. 9A-9B may be reconfigured to a parallel flow configuration 104 illustrated in FIGS. 10A-11B. The reconfiguration of capsule 100 could be accomplished by simply changing out membrane 122 to provide a different flow-through configuration depending upon the desired beverage and the required beverage preparation process. Capsule 100 illustrated in FIGS. 9A-9B may be better suited for use with one type of enhancement component whereas capsule 100 illustrated in FIGS. 10A-11B may be better suited for another type of enhancement component. Generally, flow-through configurations are better suited for brewable type beverages such as tea or coffee, whereas parallel flow configurations may be better suited for syrup or carbonated type beverages. As indicated, FIGS. 10A-11B illustrate different embodiments of the parallel flow configuration 104 of liquid flow control and beverage preparation capsule 100. The same considerations discussed previously with regard to FIGS. 9A-9B are applicable here. Capsule 100 may be designed as a two or more piece component having a membrane 122 for separating chamber 132 from liquid flow path 106, and a single or two-piece plug 128 for sealing outlet 126 of capsule 100. Membrane 122 may be snap fit to capsule 100 and plug 128 snap fit to outlet 126 in the case where the capsule 100 is reusable or assembled by the user with the desired enhancement component being added into compartment 132. Capsule 100 includes attachment interface 114 for securing about a liquid dispensing outlet or interface of a liquid dispenser or within one of the liquid flow control and beverage preparation modules or systems of the present invention. As with all of the embodiments of the present invention, the material for capsule 100 may be a type that is safe for use in such beverage preparation processes and resists contamination such as bacterial, mold or mildew growth.

Figure 10A:
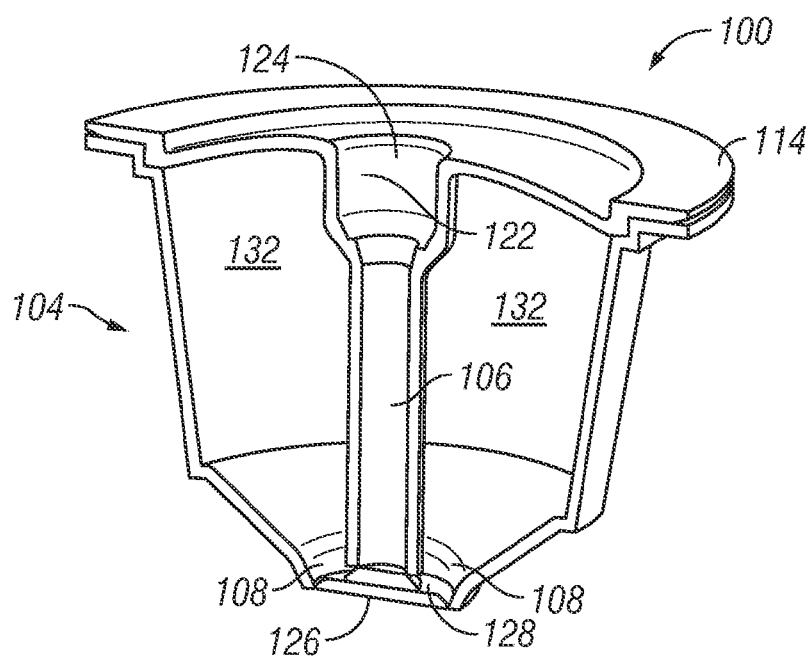
FIG. 10A is a sectional view of another embodiment of a liquid flow control and beverage preparation capsule configured to a parallel flow mode according to an exemplary aspect of the present invention.
Figure 10B:
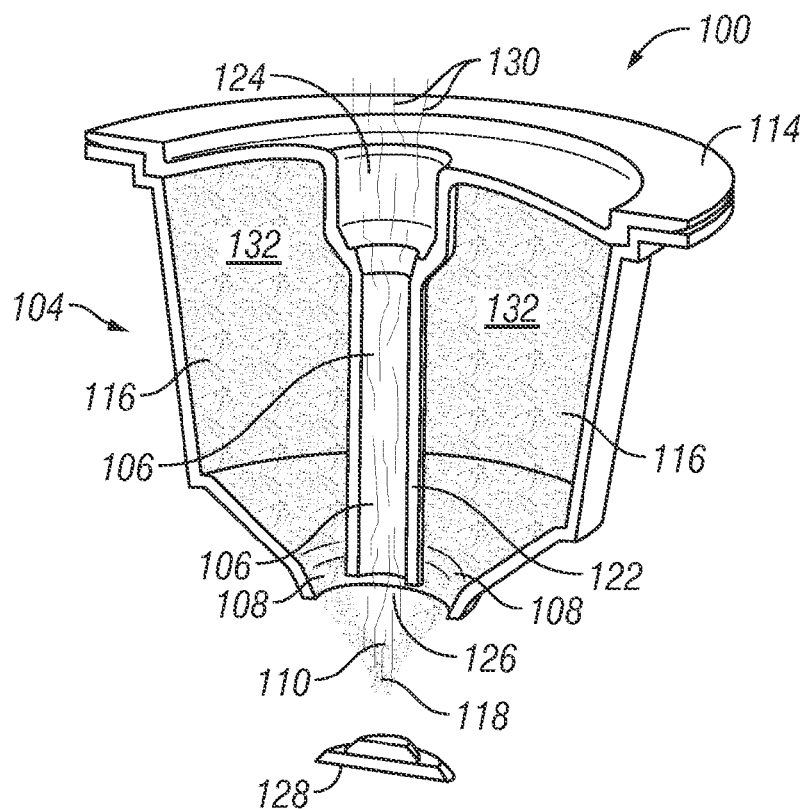
FIG. 10B is another view of the liquid flow control and beverage preparation capsule shown in FIG. 10A.

According to an exemplary method of operation, as is illustrated in FIG. 10B, capsule 100 receives liquid 130 through inlet 124 into liquid flow path 106. A seal may be provided at inlet 124 which is ruptured by the passing of liquid 130 through liquid flow path 106. The seal may be manually removed, mechanically ruptured or opened by pressure of liquid 130. The velocity of liquid passing through liquid flow path 106 may be controlled by controlling the diameter of liquid flow path 106. For example, if a high velocity liquid flow rate is desired, the diameter of liquid flow path 106 may be reduced (assuming liquid 130 is under a constant pressure). Conversely, if a lower velocity liquid flow is desired, the diameter of liquid flow path may be increased. This could be accomplished by swapping out membrane 122 for membranes having varying sized liquid flow path diameters. Parallel flow configuration 102 illustrated in FIG. 10B operates similar to parallel flow configuration diagramed in FIG. 5D and illustrated in FIG. 8A. Liquid 130 passing through liquid flow path is separated from chamber 132 by membrane 122. Chamber 132 is communication with liquid flow path and outlet 126 of capsule 100 via enhancement flow paths 108. Liquid 130 passing by the outlet of enhancement flow paths 108 draws, sucks or siphons enhancement component 116 from chambers 132. Enhancement component 116 travels through enhancement flow paths 108 and combines with liquid 130 in liquid flow path 106 at mixing point 110 to provide beverage 118. Thus, by Venturi effect or the creation of a negative head pressure at the outlet of enhancement flow paths 108, enhancement component 116 is siphoned or drawn out of chamber 132 into liquid flow path 106 to combine with liquid 130. As previously indicated, plug 128 could be a two-piece or single piece plug. For example, the upper portion of plug 128 could be separate from the lower portion of plug 128, whereby the upper portion seals the central liquid flow path 106 and the lower portion of plug 128 seals the outlet 126 of capsule 100. Thus, in the case were plug 128 is two-piece plug, the upper portion may be dislodged first followed by the lower portion. Alternatively, the upper and lower portions of plug 128 may be dislodged simultaneously to allow liquid 130 to pass through outlet 126 and enhancement component 116 to pass through enhancement flow paths 108 to outlet 126 to combine with liquid 130.

Figure 11A:
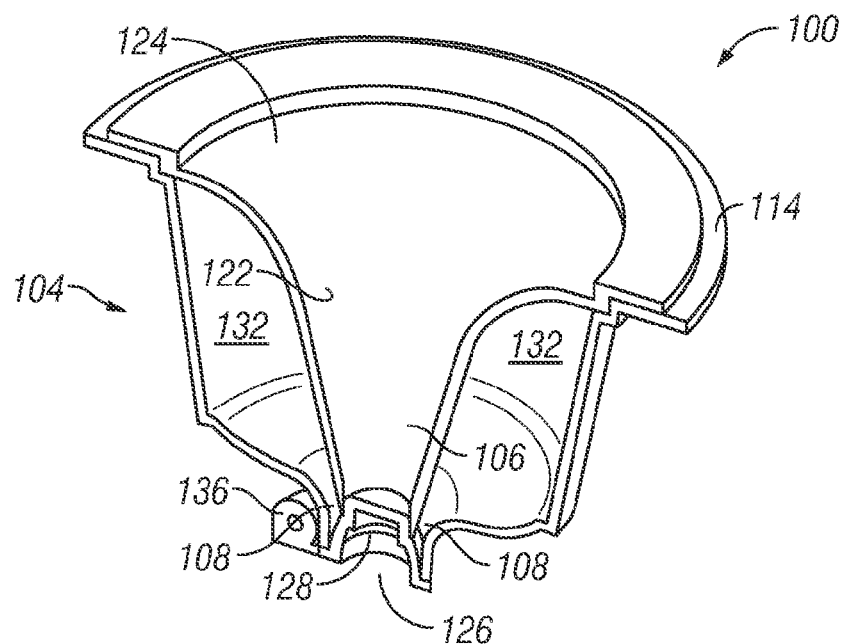
FIG. 11A is a sectional view of another embodiment of a liquid flow control and beverage preparation capsule configured to a parallel flow mode according to an exemplary aspect of the present invention.
Figure 11B:
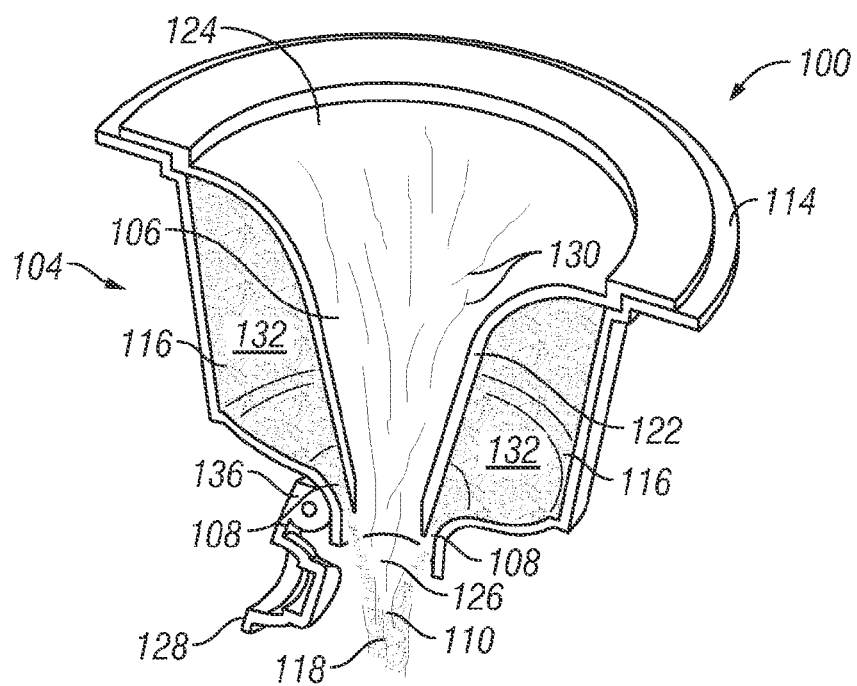
FIG. 11B is another view of the liquid flow control and beverage preparation capsule shown in FIG. 11A.

FIGS. 11A-11B illustrate another embodiment of liquid flow control and beverage preparation capsule 100 in a parallel flow configuration 104. The same considerations discussed with regard to FIGS. 10A-10B are applicable to FIGS. 11A-11B, which further illustrate another embodiment of plug 128. In the case shown in FIG. 11B, plug 128 is attached to capsule 100 by hinge 136. Thus, as liquid 130 is passed through liquid flow path 106, pressure of liquid 130 acting on plug 128 dislodges plug 128 from the outlet 126 of liquid flow path 106 and enhancement flow paths 108 to allow dispensing. Plug 128 includes an upper portion for mating with the outlet of the central liquid flow path 106 and a lower portion having larger diameter than the upper portion for mating with the outlet 126 of capsule 100. Thus, upon dislodging of plug 128, both liquid flow path 106 and enhancement flow paths 108 are opened. FIGS. 11A-11B also illustrate a different embodiment of membrane 122. As previously discussed, by altering the diameter of enhancement flow paths 108, the volumetric flow of enhancement component 116 traveling there through may also be controlled. Altering the diameter of enhancement flow paths 108, in addition to controlling the velocity of liquid 130 traveling through liquid flow path 106, controls the rate at which enhancement component 116 is dispensed from chamber 132 through enhancement flow paths 108. The design of membrane 122, as illustrated in FIGS. 11A-11B, allows a higher volumetric flow of liquid 130 to pass through liquid flow paths 106 at a reduced velocity assuming liquid 130 is under the same pressure as it would be in FIGS. 10A-10B. By selecting a different membrane 122, the diameter of enhancement flow path 108 can be altered. For example, FIGS. 10A-10B illustrate a larger diameter for enhancement flow paths 108 as a result of the size and shape of membrane 122; FIGS. 11A-11B illustrate smaller diameter enhancement flow paths 108 as a result of membrane 122 used in the embodiment shown in FIGS. 11A-11B. Thus, the present invention provides a user with the flexibility of selecting the type of membrane 122 based on such things as the type of beverage being prepared, the desired concentration of the beverage and other considerations relevant to a beverage preparation process by selecting the components that go within capsule 100, such as the design of membrane 122.

Figure 12A:
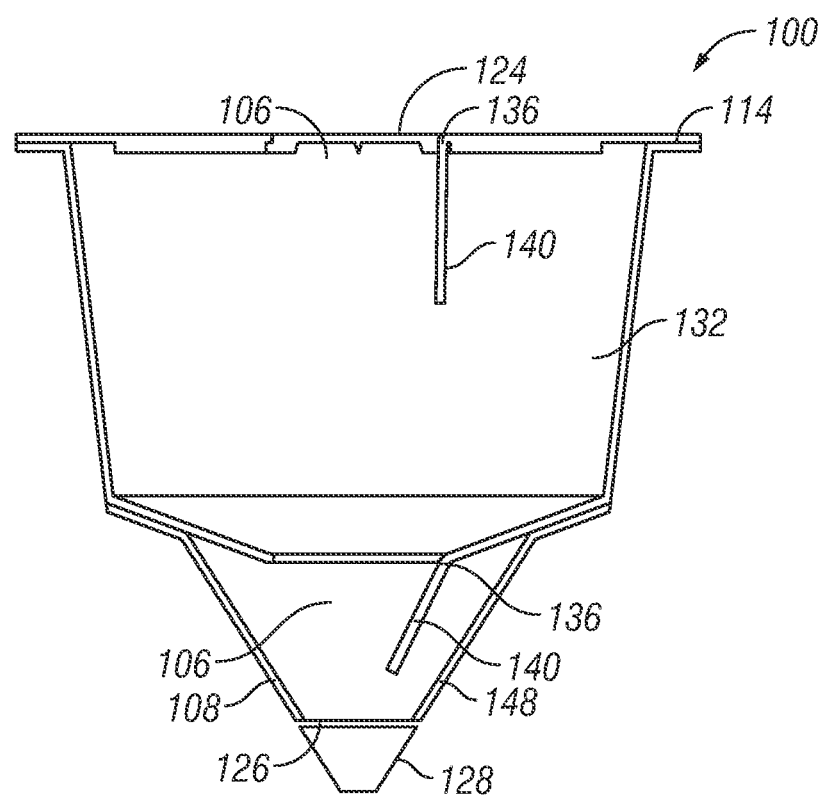
FIG. 12A is a sectional view of another embodiment of a liquid flow control and beverage preparation capsule configurable to a flow-through or parallel flow configuration according to an exemplary aspect of the present invention.
Figure 12B:
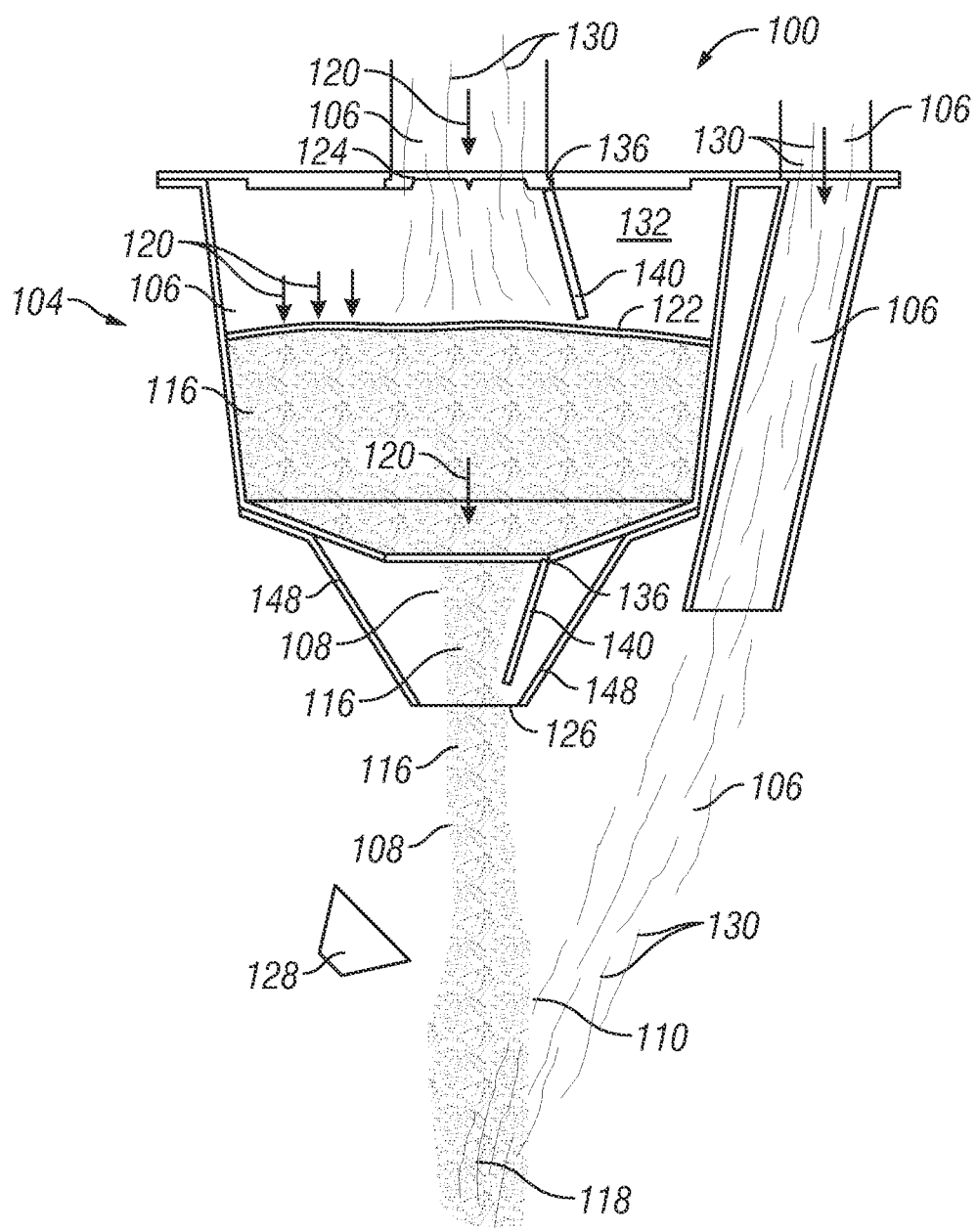
FIG. 12B is another sectional view of the liquid flow control and beverage preparation capsule shown in FIG. 12A configured to a parallel flow mode according to an exemplary aspect of the present invention.
Figure 12C:
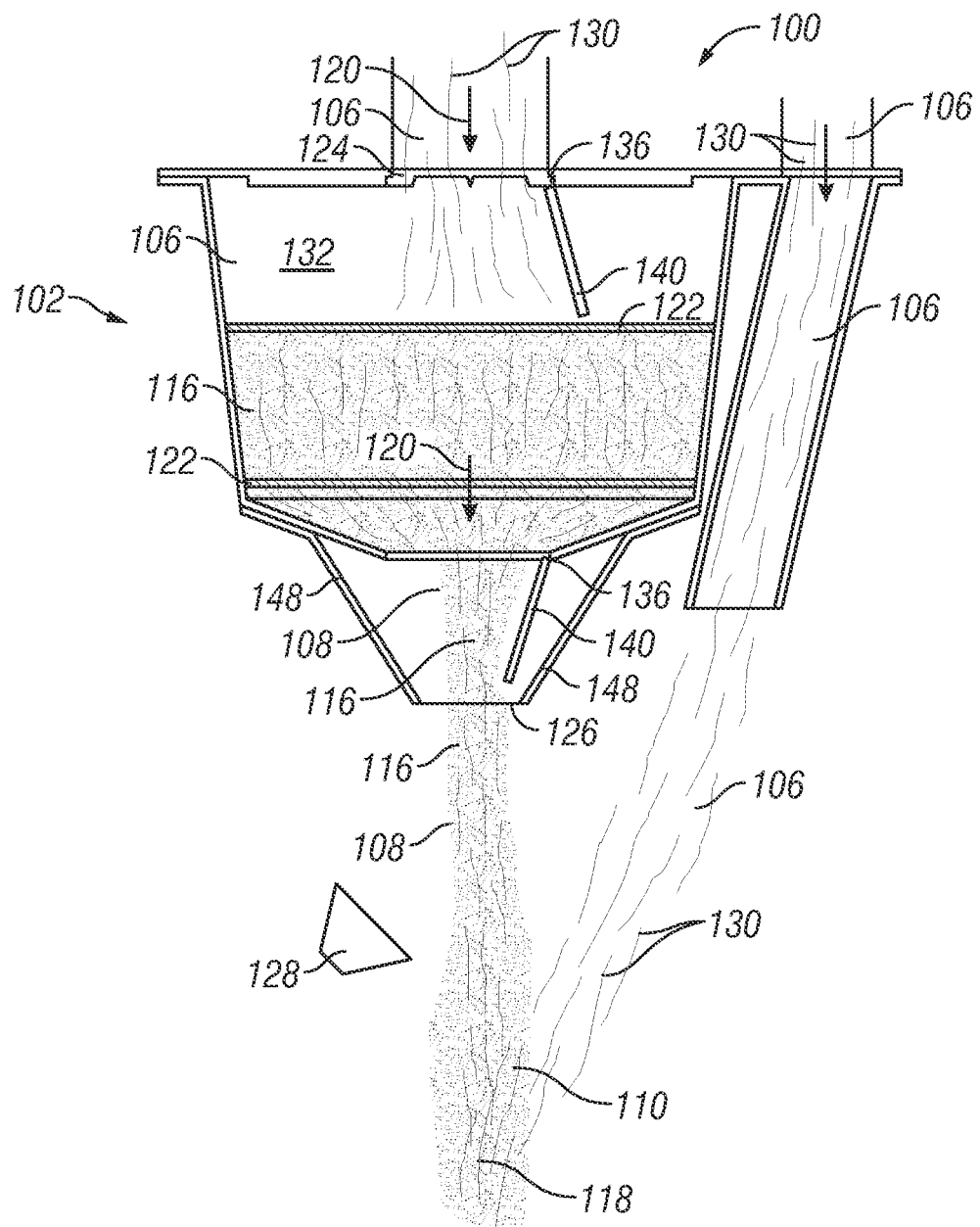
FIG. 12C is another sectional view of the liquid flow control and beverage preparation capsule shown in FIG. 12A configured to a flow-through mode according to an exemplary aspect of the present invention.

FIGS. 12A-12C illustrate another liquid flow control and beverage preparation capsule 100 according to an exemplary aspect of the present invention. Like those capsules illustrated and previously discussed, capsule 100 shown in FIG. 12A includes attachment interface 114 whereby capsule may be secured about a liquid dispensing outlet on interface of a liquid dispenser, such as those illustrated in the present invention, those discussed and those contemplated. Capsule 100 may also be used with any one of the liquid flow control and beverage preparation modules or systems of the present invention. Capsule 100 may be a single piece or multi-piece construct. Like capsules previously illustrated and discussed, capsule 100 shown in FIG. 12A may include an upper portion, such as a lid portion that is removably attachable to the body of capsule 100. Capsule 100 also includes an inlet 124 for liquid flow path 106. Inlet 124 is openable and closeable by gate 140. Gate 140 may be attached to the upper portion of capsule 100 by hinge 136. Hinge 136 may be a mechanical or living hinge. A chamber or chambers 132 may be formed within the body of capsule 100 for housing enhancement component 116. Another gate 140 is provided in the lower portion of capsule 100 and includes a hinge, whether mechanical or living, to allow gate 140 to be opened and closed. The bottom most portion of capsule 100 includes a shroud 148 to eliminate or reduce splashing or splatter when gates 140 are opened or ruptured and during liquid dispension. The outlet 126 of capsule 100 may also include a plug 128. Plug 128 is secured to capsule 100 using connection means known to those skilled in the art, including those previously described and discussed in the present invention.

FIG. 12B illustrates parallel flow configuration 104 of liquid flow control and beverage preparation capsule 100. By swapping out or reconfiguring one or more of the components illustrated in FIG. 12A, capsule 100 may be configured to a parallel flow configuration 104 as illustrated in FIG. 12B or a flow-through configuration 102 as illustrated in FIG. 12C. The parallel flow configuration 104 as illustrate in FIG. 12B includes a liquid flow path 106 passing external to capsule 100. The external liquid flow path 106 may be an integral or a separate component to capsule 100. A fluid flow manifold may be provided in addition to capsule 100 to control the flow of liquid 130 into capsule 100 or the external flow path 106. A valve or flow divider such as illustrated in FIGS. 14A-14D and 16A-16E may be included in the manifold to divert flow of liquid 130 through capsule 100 and/or through the external liquid flow path 106. The term manifold is used to describe the liquid flow control configurations used in addition to capsule 100 illustrated in FIG. 12B. The manifold may be provided by one of the liquid flow control and beverage preparation modules or systems of the present invention. Furthermore, the necessary liquid flow control manifold may be included in the liquid dispensing apparatus to which capsule 100 is used in combination with. In the embodiment illustrated in FIG. 12B, capsule 100 includes a compartment 132 housing enhancement component 116. The compartment 132 is separated from enhancement component 116 by membrane 122. The membrane 122 may be a deformable membrane whereby force or pressure 120 acting on membrane 122 causes deformation of membrane 122 thereby causing enhancement component 116 to rupture or open gate 140 and dispense through shroud 148 and outlet 126 of capsule 100. As previously discussed, the type of material and thickness of the material used for membrane 122 may be controlled so that the amount of deformation of membrane 122 is also controlled thereby determining the amount of enhancement component 116 dispensed from capsule 100 given the magnitude of the pressure/force 120 acting on membrane 122. Thus, in operation, as liquid 130 passes through liquid flow path 106, pressure of liquid 130 causes gate 140 to open or rupture and rotate downwardly about hinge 136 whereby liquid 130 enters compartment 132. Liquid 130 fills compartment 132 and the weight of liquid 130 and/or the pressure/force 120 acting on membrane 122 causes membrane 122 to deform. The deformation of membrane 122 causes enhancement component 116 to apply a pressure force 120 on the lower gate 140 thereby opening and rupturing the gate 140, causing the gate to rotate downwardly about hinge 136 at the same time which plug 128 is dislodged or released from outlet 126 of capsule 100. The present invention contemplates that plug 128 may be a thermoweld or other barrier or seal that dislodges, opens or ruptures when pressure of enhancement component 116 is applied to enhancement component to dispense out outlet 126 via enhancement flow path 108. Although capsule 100 is shown with a plug 128, the present invention contemplates capsule operation and structure without a plug 128, given capsule 100 may be sealed at or near outlet 126 by gate 140. As gate 140 opens or ruptures, enhancement component 116 may be dispensed at a higher pressure in an erratic manner. Thus, shroud 148 helps eliminate or reduce the splashing or splattering of enhancement component when dispensed. Liquid 130 passing through external liquid flow path 106 combines with enhancement component dispensed from capsule 100 at mixing point 110 to provide beverage 118. External liquid flow path 106 may include one or more seals at the inlet and outlet of the liquid flow path to preserve the hygienical integrity of the flow path. Those skilled in the art can appreciate that external liquid flow path 106 may not be required in some instances of use of capsule 100. For example, liquid flow control and beverage preparation module illustrated in FIG. 14A includes a flow path that would function as an external liquid flow path in the case where capsule 100 shown in FIG. 12B is used to prepare a beverage. As previously discussed in embodiments of the present invention, capsule 100 shown in FIG. 12B may include an air gap between membrane 122 and inlet 124 within compartment 132 to assist in preserving the hygienical integrity of the liquid dispensing system to which capsule 100 is attached or used in combination with.

FIG. 12C illustrates a flow-through configuration 102 of liquid flow control and beverage preparation capsule 100. In FIG. 12C, enhancement component 116 is contained between permeable membranes 122. Permeable membranes may be disposable or reusable. Attachment means may be included within capsule 100 for securing a reusable membrane 122. In the case of a single use membrane 122, enhancement component 116 may be replaced with a new membrane 122 housing a new enhancement component 116 depending upon the desired beverage being prepared. Thus, for example, membrane 122 could be a disposable membrane housing a single serving portion of a brewable enhancement component 116, such as tea or coffee. Alternatively, membrane 122 may be removed, washed and sanitized and reused upon recharging with a new enhancement component 116. The flow of liquid 130 through capsule 100 in external flow path 106 is in some ways similar to the description provided for FIG. 12B, however, in FIG. 12C, liquid 130 passing through liquid flow path into chamber 132 also passes through membrane 122 and percolates through enhancement component 116. Liquid 130 is combined with or affected by enhancement component 116 and passes through the lower membrane 122 past gate 140 and through outlet 126 of capsule 100. Liquid 130 passing through external liquid flow path 106 combines with the enhancement component 116 and liquid 130 being dispensed from capsule 100 at mixing point 110 to provide a final beverage 118. As with other flow-through configurations presented and discussed herein, the concentration of beverage 118 may be controlled by controlling or varying the volumetric flow of liquid 130 passing through capsule 100 versus the volumetric flow of liquid 130 passing through external liquid flow path 106. For example, in the case where a strong concentrated beverage 118 is desired, the majority of liquid flow 130 may be passed through capsule 100, whereas if a weaker concentrated beverage 118 is desired a majority of liquid flow 130 may be passed through the external liquid flow path 106. Thus by controlling the volumetric flow of liquid 130 through capsule 100 and external flow path 106, the concentration of beverage 118 may be controlled. In the case where a beverage 118 is desired that requires a different flow configuration, capsule 100 may be reconfigured from the flow-through configuration 102 to a parallel flow configuration 104 such as illustrated in FIG. 12B. This can be accomplished by swapping out or reconfiguring membrane 122 within capsule 100, such as where a permeable membrane is swapped out for a non-permeable type membrane that is flexible and allows deformation for dispensing enhancement component 116. Like the parallel flow configuration 104 illustrated in FIG. 12B, the flow-through configuration illustrated in FIG. 12C may also include an air gap setup within chamber 132 between the upper membrane 122 and inlet 124 to assist in preventing back contamination of the liquid dispensing system to which capsule 100 is attached or the liquid flow control and beverage preparation module or system to which capsule 100 is used in combination with. Liquid 130 passing through capsule 100 and liquid flow path 106 external to capsule 100 combine with each other at mixing point 110 in midair. The combination of two flow streams in midair helps minimize the potential of back contamination of the liquid dispensing system to which capsule 100 is attached or the liquid flow control and beverage preparation module or system in which capsule 100 is used in combination with. Seals may also be provided on the inlet and outlet of the liquid flow path external to capsule 100 to prevent the liquid flow path from becoming contaminated. The liquid flow path may be removed and rinsed as well as disinfected in the case where the capsule 100 is reusable. These present aspects contemplate that capsule 100 and liquid flow path 106 external to capsule 100 may be opened by being pierced with some mechanical geometry or by using the pressure of liquid 130 passing through liquid flow path 106 in capsule 100 and external to capsule 100.

Liquid Flow Control and Beverage Preparation Pouches

Figure 13C:
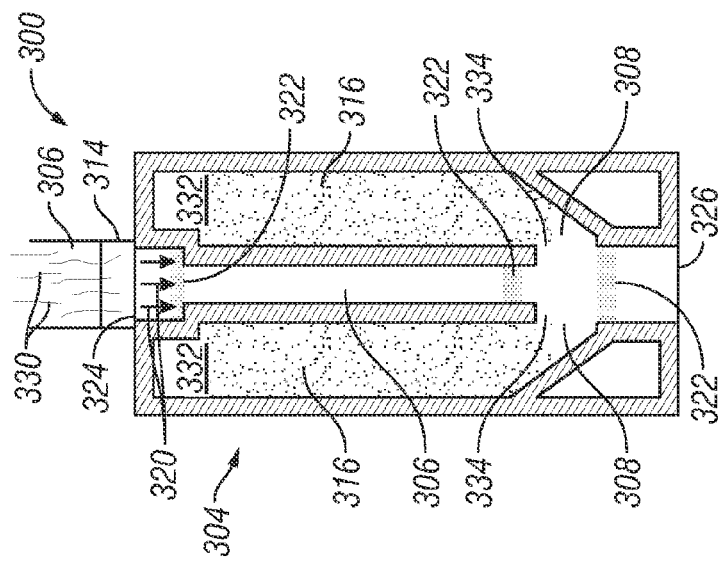
FIG. 13C is sectional view of another embodiment of a liquid flow control and beverage preparation pouch configured to a parallel flow mode according to an exemplary aspect of the present invention.
Figure 13B:
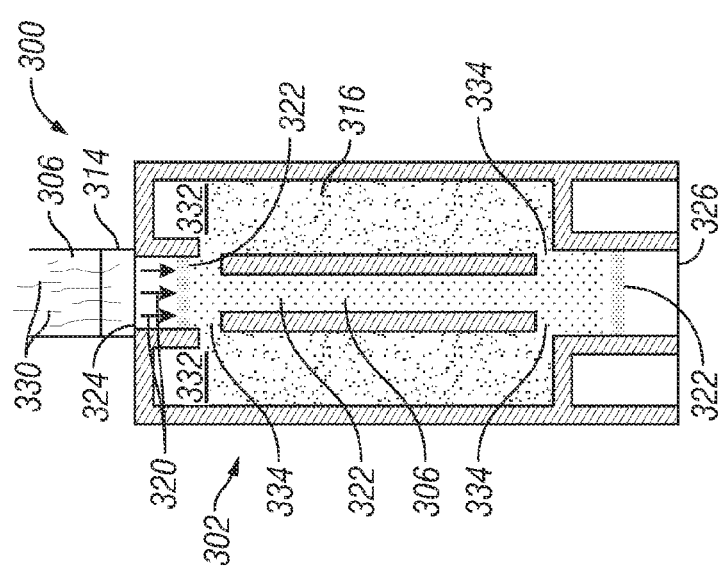
FIG. 13B is sectional view of another embodiment of a liquid flow control and beverage preparation pouch configured to a flow-through mode according to an exemplary aspect of the present invention.
Figure 13A:
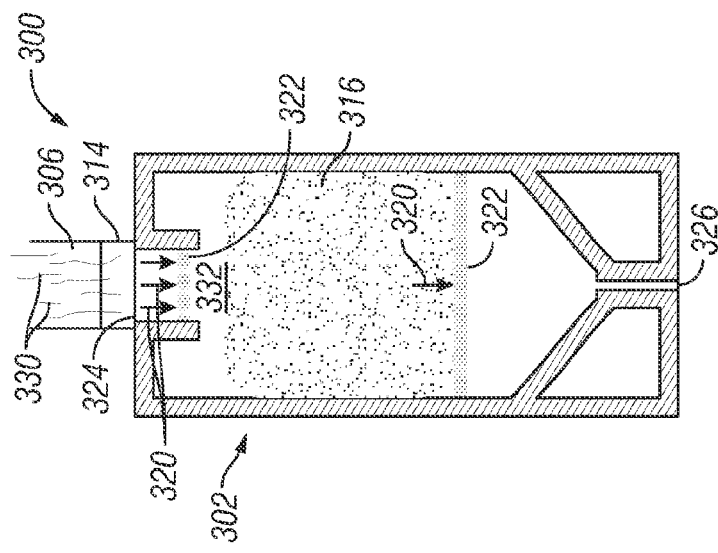
FIG. 13A is a sectional view of one embodiment of a liquid flow control and beverage preparation pouch configured to a flow-through configuration according to an exemplary aspect of the present invention.

FIGS. 13A-13C illustrate liquid flow control and beverage preparation pouches 300 according to an exemplary aspect of the present invention. Flow-through configurations 302 of liquid flow control and beverage preparation pouch 300 are illustrated in FIGS. 13A-13B and parallel configuration 304 is illustrated in FIG. 13C. Pouch 300 illustrated in FIGS. 13A-13C include an inlet 324. Inlet 324 may include an attachment interface 314 for attaching about the liquid dispensing outlet or dispensing interface of the liquid dispensing apparatus or for being secured within one of the liquid flow control and beverage preparation modules and/or systems of the present invention. Attachment mechanism 314 may be configured to secure directly to a liquid dispensing outlet or dispensing interface of the liquid dispenser. Attachment interface 314 could include any one of those discussed in the present application, those illustrated, and those contemplated or within the skill of those knowing the art. The body of pouch 300 could be rigid or supple, as implied by the use of the term "pouch." As illustrated in FIG. 13A, pouch 300 includes a compartment 332 for housing enhancement component 316. Compartment 332 is separated from inlet 324 and outlet 326 by membranes 322. Membranes 322 are preferably configured to open upon application of pressure or force 320. Those skilled in the art can appreciate that membranes 322 could be opened mechanically as well as by using pressure/force 320 resulting from passing liquid 330 through liquid flow path 306. The upper and lower membranes 322 could also be a thermoweld. Upper and lower membranes 322 could be configured with a type of material and thickness to control the point at which membranes 322 open or rupture depending upon the pressure or force exerted on membrane 322. Membranes 322 could be configured to open or rupture simultaneously or consecutively depending upon the desired dispensing protocol. Those skilled in the art can appreciate that in addition to those presented, pouch 300 may include one or more geometries, aqueducts, configurations or channels for directing, controlling and guiding liquid 330 through pouch 300 from inlet 324 to outlet 326 to be affected by or combined with enhancement component 316 to provide a beverage.

According to an exemplary method of operation, as illustrated by the flow-through configuration 302 shown in FIG. 13A, liquid 330 from a liquid dispensing apparatus, such as those illustrated in FIGS. 1A-4B, passes through inlet 324 of pouch 300 to start the beverage preparation process. Pressure or force 320 resulting from the weight or force/pressure associated with liquid 330 causes membrane 322 to open or rupture whereby liquid 330 passes into compartment 332 to combine with or be affected by enhancement component 316. Upper membrane 322 is not required to be opened or ruptured by pressure or force 322 of liquid 330. Membrane 322 could be opened mechanically by piercing or manually removed. For example, connection of pouch 300 at the liquid dispensing outlet/interface or within a liquid flow control and beverage preparation module or system of the present invention may mechanically pierce the upper membrane 322. Lower membrane 322 may be configured such that cavity 332 fills almost entirely with liquid 330 at which point lower membrane 322 opens or ruptures to prevent enhancement component and liquid from back contaminating the liquid dispensing system to which pouch 300 is being used in combination with. Alternatively, lower membrane 322 could be designed to rupture prematurely upon very little force or pressure 320 resulting from liquid 330 acting on membrane 322. Those skilled in the art can appreciate that membrane 322 could be a seal, gate, thermoweld, or any other openable or rupturable membrane or construct contemplated by those skilled in the art and illustrated in the various aspects of the present invention. By controlling the point at which lower membrane 322 opens or ruptures, the time with which liquid 330 fills, combines or is affected by enhancement component 316 may be increased or decreased. In the case where it is desired that liquid 330 remain or percolate with enhancement component 316 for a longer period of time, lower membrane 322 may be reinforced to absorb a higher pressure/force 320 thereby delaying the time before lower membrane 322 opens or ruptures allowing enhancement component 316 to dispense from pouch 300. Outlet 326 of pouch 300 may be configured to regulate the volumetric flow of enhancement component 316 from pouch 300. For example, outlet 326 may have a reduced diameter relative to the diameter of inlet 324 such that liquid 330 enters pouch 300 at a greater rate than enhancement component and liquid dispenses through outlet 326 of pouch 300 to thereby cause compartment 322 to fill up allowing enhancement component 316 to mix with liquid 330 for a greater amount of time. Further, by restricting the diameter of outlet 326 of pouch 300, liquid 330 and enhancement component 316 is dispensed from pouch at a higher pressure further aiding in the mixing and combining of enhancement component 316 with liquid 330. Like other aspects of the present invention, pouch 300 may include an air buffer established in compartment 332 between inlet 324 and enhancement component 316 to assist in preventing back contamination of the liquid dispensing system or the liquid flow control and beverage preparation module or system of the present invention which pouch 300 is used in combination with. In addition to the upper and lower membranes 322 used to seal enhancement component 316 within pouch 300, seals or plugs may be provided at the inlet 324 and outlet 326 of pouch 300 to help protect and preserve the hygienical integrity of internal components of pouch 300. Seals or plugs at the inlet 324 and/or outlet 326 of pouch 300 may be ruptured or opened by passing liquid 330 through liquid flow path 306 of pouch 300 as described in the embodiments illustrated in the present invention.

FIG. 13B illustrates another flow-through configuration 302 of liquid flow control and beverage preparation pouch 300 according to an exemplary aspect of the present invention. Like pouch 300 illustrated in FIG. 13A, pouch 300 shown in FIG. 13B includes attachment interface 314 for securing about or to a liquid dispensing outlet or interface of a liquid dispenser. Furthermore, attachment interface 314 may be used to secure pouch 300 within one or more of the liquid flow control and beverage preparation modules or systems shown and described in the present invention. For example, pouch 300 may include attachment interface 314 adapted for securing within liquid flow control and beverage preparation module 400 illustrated in FIG. 8A that provides a housing connection means for securing about or to liquid dispensing outlet or interface of a liquid dispensing apparatus. Pouch 300 includes an inlet 324 through which liquid 330 passes through from liquid flow path 306. Inlet 324 may include a seal in addition to upper membrane 322. The seal (not shown) may be mechanically or manually ruptured or opened. The seal may also be opened using force or pressure 320 as a result of passing liquid 330 through liquid flow path 306. Pouch 300 may also include one or more compartments 332. Compartments 332 are in fluid communication with liquid flow path 306 via ports 334. Compartments 332 are designed to house enhancement component 316. Liquid flow path 306 and ports 334 may include a membrane 322 providing liquid flow control, such as a weak thermoweld. Outlet 326 at or near the outlet 326 of pouch 300 may include a lower membrane 322. Outlet 326 may also include a seal like inlet 324 that is opened or ruptured upon opening or rupturing lower membrane 322 near outlet 326. Enhancement component 316 is held within cavity 332 using membrane 322.

According to an exemplary method of operation, liquid 330 passes through liquid flow path 306 into inlet 324 of pouch 300 to start the beverage preparation process. In the case where a seal is provided at inlet 324, the seal is ruptured or opened either mechanically or as a result of pressure/force 320 of liquid 320. As discussed with regard to the embodiment illustrated in FIG. 13A, upper membrane 322 may also be pierced mechanically upon insertion of pouch within the host dispensing system, such as liquid flow control and beverage preparation module 400 (shown in FIGS. 14A-14C) or liquid flow control and beverage preparation pouch 500 (shown in FIGS. 16A-16D). The pressure/force 320 of liquid 320 opens the weak thermowelding occupying ports 334 at the top of pouch 300. Liquid 330 passes into compartments 332 to combine with or be affected by enhancement component 316. A portion of liquid 330 continues to pass through liquid flow path 306 as the force/pressure 320 of liquid 330 continues to open up the thermowelding membrane 322 in liquid flow path 306. Depending upon the design of the thermowelding membrane 322 in liquid flow path 306, the volumetric flow of liquid 330 through liquid flow path 306 and compartments 332 may be controlled to thereby control the concentration of the beverage being dispensed from pouch 300. Liquid 330 continues to fill compartments 332 until at which point the pressure/force 320 acting on the thermowelding membrane gives way and allows liquid to rupture or open membrane 322 at or near outlet 326 of pouch 300. Controlling the strength of thermowelding membrane 322 in liquid flow path 306 also allows the dispensing protocol of pouch 300 to be defined. For example, in the case where a stronger thermowelding membrane 322 is used in liquid flow path 306, the majority of liquid 330 passes through chamber 332 and out outlet 326. Alternatively, in the case where a weaker thermowelding membrane 322 is used in liquid flow path 306, a proportion of liquid 330 flowing through pouch 300 flows directly through liquid flow path 306 and combines with enhancement component 316 at or near the lower ports 334. Furthermore, a stronger thermowelding membrane 322 could be used in ports 334 in the upper portion of pouch 300 to direct the majority of liquid 330 through liquid flow path 306 which would combine with enhancement component 316 passing through ports 334 in the lower portion of pouch 300 to provide a less concentrated beverage (in the case where pouch 300 is a multiple use pouch).

FIG. 13C illustrates a parallel flow configuration 304 of liquid flow control and beverage preparation pouch 300. Pouch 300 includes attachment interface 314 for connecting at a liquid dispensing outlet or interface of a liquid dispensing apparatus as previously described. Inlet 324 of pouch 300 may include a seal also as previously described. Inlet 324 may include membrane 322, such as a rupturable, openable membrane. The membrane may be a thermoweld or other membrane type as previously described and contemplated in the present invention. Liquid flow path 306 in pouch 300 may include multiple internal membranes 322. The membranes may be thermowelding for controlling the flow of liquid through liquid flow path 306. A membrane 322 is also included in the lower portion of pouch 300 at or near outlet 326. Compartments 332 are adapted for receipt of enhancement component 316. Membranes 322 in liquid flow path 306 and at outlet 326 of pouch 300 retain enhancement component 316 within chamber 332. Chamber 332 is in fluid communication with liquid flow path 306 via enhancement flow path 308 provided by ports 334.

According to an exemplary method of operation, liquid 330 passes through inlet 324, ruptures a seal at the inlet 324 (if provided) and ruptures membrane 322 to start the beverage preparation process. Pressure or force 320 of liquid 330 may be used to open or rupture a seal and/or membrane 322 at or near inlet 324. Liquid 330 continues through liquid flow path 306 and ruptures membrane 322 within liquid flow path and membrane 322 at or near outlet 326. As liquid 330 travels past enhancement flow path 308 in fluid communication with enhancement component 316 in chamber 332, enhancement component 316 is drawn or siphoned out of chamber 332 by Venturi effect or by a negative head pressure (vacuum) to cause enhancement component 316 to combine with liquid 330 passing through liquid flow path 306, which is then dispensed as a beverage. The present invention contemplates that the diameter of enhancement flow path 308 and liquid flow path 306 may be decreased or increased to control the velocity at which liquid 330 passes through liquid flow path 306 and enhancement component 316 is drawn from compartment 332 into liquid flow path 306. Further, by decreasing the diameter of liquid flow path 306 the velocity of liquid 330 travelling through liquid flow path 306 may be increased thereby increasing the vacuum or the drawing effect of enhancement component 316 from chamber 332 through enhancement flow path 308. The increased velocity of liquid 330 passing through liquid flow path 306 may also add to the subsequent continued mixing of liquid 330 with enhancement component 316 at a receiving point having the receptacle for collecting the beverage. Membranes 322 provided in pouch 300 may be designed to rupture or fail simultaneously or consecutively. For example, as liquid 330 is passed through liquid flow path 306 into inlet 324, pressure/force 320 acting on membrane 322 in liquid flow path may cause lower membranes 322 to rupture or open simultaneously to control the dispensing protocol of pouch 300.

Liquid Flow Control and Beverage Preparation Modules

FIGS. 14A-14D illustrate a liquid flow control and beverage preparation module 400 according to an exemplary aspect of the present invention. Liquid flow control and beverage preparation module, as illustrated in FIG. 14A, is adaptable for removable receipt at a liquid dispensing outlet or interface of a liquid dispensing apparatus, such as the indoor ice/water dispenser of a refrigerated appliance (illustrated in FIG. 14A). Liquid flow control and beverage preparation module 400 shown in FIG. 14B may be configured to a flow-through configuration 402 as illustrated in FIG. 14C or a parallel flow configuration 404 as illustrated in FIG. 14D. Liquid flow control and beverage preparation module 400 illustrated in FIG. 14B may also be configured between flow-through and parallel flow configurations without swapping out or changing any of the components. Liquid flow control and beverage preparation module 400 includes a housing 436 for holding the liquid flow control and beverage preparation components. Housing 436 is adapted to be removably secured to attachment interface 24 of a liquid dispensing apparatus 10. Housing 436 may include one or more attachment points, such as attachment interface 414 for securing housing 436 to liquid dispensing apparatus 10. Attachment interface 414 may also provide the necessary sealing interfaces needed to seal the interface between the liquid dispenser and module 400. The different types of connection and sealing interfaces are well-known to those skilled in the art. Attachment interfaces 414 may include any of the attachment interfaces previously discussed and contemplated in the present invention. For example, the sealing interface may include a grommet, O-ring, sealing membrane, gasket, or any like sealing component. These components are all within the realm of those skilled in the art. Valve 412 is configured to be in fluid communication with outlet 18 of liquid flow path 12 when housing 436 is attached to liquid dispensing apparatus 10. Liquid 30 flowing through liquid flow path 12 in liquid dispensing apparatus 10 is communicated through outlet 18 into valve 412. Valve 412 may be operated manually or receive an instruction from an actuator upon direction from a user to thereby control the flow of liquid through liquid flow path 406. Valve 412 may also be simply an on/off switch to allow or not allow liquid 30 to pass into housing 436. In the case where a valve is simply an on/off switch for allowing passage of liquid into housing 436, a flow divider 440 may also be provided for splitting the flow of liquid through port 434 or liquid flow path 406 passing through housing 436. Flow divider 440 may include the necessary structure to allow the flow of liquid to be diverted through the required flow configuration needed for the beverage being prepared. For example, flow divider may be manually instructed or actuated by an automatic actuator receiving input from the user to control or divert the majority of the flow through port 434 into compartment 432 or through liquid flow path 406 passing external to housing 436. In either case, whether alone or combination with each other, valve 412 and flow divider 440 may be used to control or divert liquid flow through any one of the liquid flow paths 406 or ports 434 within housing 432 in accordance with the requirements of the specific beverage preparation process or the desired concentration of the beverage. Compartment 432 may also include one or more connection points for securing the liquid flow control and beverage preparation capsules, pods, cartridges, or pouches illustrated and discussed in the present invention. For example, liquid flow control and beverage preparation pod illustrated in FIG. 6C may be inserted into compartment 432.

And, depending upon the desired concentration of the beverage, flow divider 440 or valve 412 may be regulated to control or divert the required amount of liquid into compartment to pass through liquid flow path 206 of liquid flow control and beverage preparation pod 200 to dispense a beverage at outlet 426 of housing 436. If, in the case of using pod 200 illustrated in FIG. 6C, a user desires a less concentrated beverage, flow divider 440 or valve 412 may be used to divert a portion of the flow through liquid flow path 406 passing external to housing 436 to dilute the beverage exiting outlet 426 of housing 436. Thus, the beverage exiting outlet 426 combines with liquid passing through liquid flow path 406 in midair or at the receiving point, such as in a receptacle to provide a less concentrated beverage. The present invention contemplates that any of the liquid flow control and beverage preparation capsules, pouches, pods or cartridges may be used in combination with liquid flow control and beverage preparation module 400. As discussed with regard to liquid flow control and beverage preparation capsule illustrated in FIG. 12B, a liquid flow path passing external to capsule 100 is used. And, in the case where capsule 100 shown in FIG. 12B is used in combination with module 400, liquid flow path 406 passing through housing 436 acts as the external liquid flow path needed for the capsule disclosed in FIG. 12B. Those skilled in the art can appreciate that the use of liquid flow divider 440 and valve 412 may be used to divert a portion of liquid passing through module 400 to control the strength of the beverage being prepared, such is the case where only a portion of the liquid passing through module 400 is passed through the enhancement component removably received within compartment 432 of module 400. It is not required that flow divider or valve 412 be used to prepare a beverage. Each of the liquid flow control and beverage preparation capsules, pouches, pods or cartridges of the present invention have been described and illustrated as possessing the ability to control the concentration of beverage regardless of whether or not module 400 has a valve 412 or flow divider 440 for partitioning or diverting portions of the liquid stream. For example, the liquid flow control and beverage preparation capsules, pouches, pods and cartridges of the present invention may include indicia or other notices provided to the user to instruct the user of the different flow ratios and to provide some indication to the user to allow them to select the right one for the beverage that they desire. Further, although module 400 is shown removably attached at a liquid dispensing interface of an indoor dispenser of a refrigerated appliance (see FIG. 14A), the present invention contemplates that module 400 could be removably attached at any liquid dispensing apparatus, such as, but not limited by those illustrated by way of example in FIGS. 1A-4B. The module is not limited to application or combination with the liquid dispensing apparatuses shown or illustrated in the present invention, but use module 400 contemplated with any type of liquid dispensing apparatus as previous discussed and described. Additionally, module 400 may be configured specifically to a flow-through configuration 400 as shown in FIG. 14C or a parallel flow configuration 404 as shown in FIG. 14D. For example, FIGS. 14B-14D illustrates the flexibility and robustness of module 400. The ability to reconfigure module 400 according to the necessary flow requirements for the beverage being prepared is provided by module 400. For example, in the case where the user selects a flow-through type module used to prepare a beverage requiring a flow-through configuration, the user may select a separate module specifically adapted for flow-through beverage preparation scenarios, such as flow-through configuration 402 of liquid flow control and beverage preparation module 400 illustrated in FIG. 14C. Much like module 400 illustrated in FIG. 14B, module 400 shown in FIG. 14C may be removably attached to liquid dispensing apparatus 10 by way of attachment interface 414 as previously discussed and described. Housing 436 of module 400 includes a compartment 432 in fluid communication with liquid flow path 406 receiving liquid 30 from outlet 18 of liquid dispensing apparatus 10. The user may select a flow-through configured pod, capsule, pouch or cartridge of the present invention and insert within compartment 432. Supports or attachment points may be included within compartment 432 for securing any one of the liquid flow control and beverage preparation devices of the present invention. Those skilled in the art can appreciate the numerous types of supports and/or connective features that could be included within compartment 432 for securing any one of the devices of the present invention within compartment 432. Liquid passing through liquid flow path 406 in compartment 432 passes through the selected device and dispenses from outlet 426 of module 400 as a beverage. After each use, module 400 may be removed from liquid dispensing apparatus disassembled, washed and sanitized in preparation for the next use. The cartridge, pouch, capsule or pod used in the beverage preparation process, in the case where the pouch, cartridge, capsule, or pod is a single use device, may be discarded and a new one inserted. FIG. 14D illustrates the parallel flow configuration 404 for a liquid flow control and beverage preparation module 400. Like the previous modules 400, module 400 shown in FIG. 14D includes a housing 436 that is removably attachable to liquid dispensing apparatus 10 using attachment interface 414 as previously discussed and described. Liquid passing through liquid flow path 12 exits outlet 18 and is passed into compartment 432. A port 434 is provided between chamber 432 and liquid flow path 406 extending through housing 436 and terminating in an outlet 426. To control distribution of liquid flow through chamber 432 or fluid flow path 406 passing externally to housing 436, the diameter of port 434 may be altered to either allow more liquid to pass external to chamber 432 or more liquid to pass through chamber 432. As previously discussed and described, the altering of the diameter of port 434 may be used to control the concentration of the beverage being produced. Like previously described, the user selects a liquid flow control and beverage preparation capsule, pouch, cartridge or pod of the present invention and inserts it into compartment 432 of module 400. Furthermore, as previously indicated, the user may select a specific liquid flow control and beverage preparation capsule, pouch, cartridge or pod that is best suited for the desired concentration of the beverage the user is wanting rather than altering the components of module 400 to control the distribution of liquid. In the case where the user desires a less concentrated beverage, a portion of the liquid passing into housing 436 may diverted through port 434 thereby allowing liquid to flow through liquid flow path 406 passing external to compartment 432. The liquid passing through liquid flow path 406 exits through outlet 426 and recombines with the beverage to weaken the concentration of the beverage according to the desire of the user. Liquid flow indicators may be included in the case where valve or flow dividers are used to thereby alert the user or allow the user to decide how much liquid is diverted away from compartment 432. Like the other modules 400, module 400 illustrated in FIG. 14D may be detached from liquid dispensing apparatus, washed and sanitized and reused. Furthermore, modules 400 illustrated in FIGS. 14C-14D may be reconfigured to provide the necessary flow configurations for any one of the liquid flow control and beverage preparation capsules, pouches, cartridges or pods illustrated and described in the present invention. Modules 400 may also be designed such that an air buffer is set up in the beverage preparation process between the inlet of the beverage preparation device being inserted into compartment 432 and the outlet 18 of liquid flow path 12 of liquid dispensing apparatus 10 to thereby assist in preventing back contamination of liquid 30 in liquid dispensing apparatus 10.

Liquid Flow Control and Beverage Preparation Systems

FIGS. 15A-15F illustrate a liquid flow control and beverage preparation system 500 according to an exemplary aspect of the present invention. Like liquid flow control and beverage preparation module 400 shown in FIG. 14A, liquid flow control and beverage preparation system 500 illustrated in FIG. 15A may be integrated at the dispensing interface of a water/ice dispenser of a refrigerated appliance. The present invention should not be construed as being limited to application only in refrigerated appliances. The present invention contemplates use of the apparatuses, methods and systems for liquid flow control and beverage preparation in any type of liquid dispensing appliance or liquid dispenser. The liquid dispensing appliance ort dispenser includes those shown and illustrated in the appliance, those discussed and contemplated in the written text, and any that the present invention could be used in combination with to provide a beverage. Liquid flow control and beverage preparation system 500 may be manufactured as part of liquid dispensing apparatus or attached in the liquid dispenser after manufacturing and distribution of the liquid dispenser into the commercial market. For example, in the case where system 500 is added after the liquid dispensing apparatus is commercially available, inlet 524 of system 500 may be configured with attachment means for securing to liquid dispensing interface or dispensing outlet of the liquid dispensing apparatus. For the purposes of describing, the left and right constructs of system 500 illustrated in FIGS. 15A-15F will be referred to as flow-through and parallel flow constructs. The left side of system 500 being referred to as the parallel flow construct and the right side of system 500 being referred to as the flow-through construct. These terms are used merely for the purpose of describing which components of system 500 are being described in the preceding written description. As best illustrated in FIG. 15B, liquid flow control and beverage preparation system 500 includes an inlet 524 in fluid communication with liquid flow path 506 through which liquid is communicated into compartment 532 within housing 536. Housing 536 is adapted to receive any one of the liquid flow control and beverage preparation capsules, modules, pouches or pods of the present invention. Housing 536 may also include a liquid flow path downstream of compartment 532 terminating in an outlet 526. Liquid flow control and beverage preparation system 500 also includes an enhancement component 516 in communication with a pump 538 via enhancement flow path 508. Pump 538 includes an enhancement flow path 508 terminating in an outlet 526. As illustrated in FIG. 15A, liquid flow path 506 is in fluid communication with liquid flow path 12 of liquid dispensing apparatus 10. Thus, liquid from a liquid source is communicated through liquid flow path 12 into compartment 532 of housing 536. As illustrated in FIG. 15B, liquid flow control and beverage preparation system 500 is capable of operating in varying flow modes, and as such is capable of providing varying flow stream configurations to provide a myriad of beverages, ranging from cold, hot or carbonated flavored or enhanced beverages. Liquid flow control and beverage preparation system 500 may also be labeled as an integrated double dispensing system because liquid flow control and beverage preparation system 500 may operate an either flow-through and/or parallel flow configurations as best illustrated in FIG. 15B. It should be noted that the parallel flow construct in liquid flow control and beverage preparation system 500 is distinct in separate from the flow-through construct, however, both the flow-through and the parallel flow constructs complement each other and cooperate together as one system thereby providing the necessary flow configuration or regimes needed for the various types of beverage preparation processes. The system 500 is capable of operating in varying flow modes, and as such is capable of providing varying flow stream configurations to provide a myriad of enhanced beverages. Each of the different flow configurations are illustrated in FIGS. 15C-15F and will be discussed and described in the preceding paragraphs.

FIG. 15C illustrates one flow configuration for a liquid flow control and beverage preparation system 500 according to an exemplary aspect of the present invention. In FIG. 15C, liquid dispensed through liquid flow path 506 passes through compartment 532 of housing 536 through outlet 526 to receiving point where liquid stream is collected in a cup or other receptacle. Because compartment 532 is left open or without a liquid flow control and beverage preparation capsule, pod, pouch or cartridge of the present invention, liquid passing through housing 536 dispenses at outlet 526 without being further affected by an enhancement component that may be included within compartment 532 in other embodiments of the present invention. Thus, using the flow scenarios illustrated in FIG. 15C, a user could dispense water from a liquid dispenser just as the liquid would be presented if system 500 were not included as part of the liquid dispensing apparatus. For example, in the case of the floor standing or table top dispenser illustrated in FIGS. 1B-1C, liquid from the liquid source would be provided at the outlet of the liquid dispensing devices at the receiving point in the same condition that the liquid would be in if system 500 were not included as part of the liquid dispensing apparatus. Thus, if the user desires cold water from the liquid dispenser cold water may be dispensed through system 500 and remain unaffected given compartment 532 is without any one of the liquid flow control and beverage preparation capsules, pouches, cartridges or pods which would provide some enhancement to the liquid. Similarly, if the user desired heated liquid, which ordinarily may be dispensed from liquid dispensing apparatuses illustrated in FIG. 1B-1C, the heated liquid would pass through system 500 unaffected and be dispensed at outlet 18 of liquid dispenser to receiving point 20 just as it would be if system 500 were not part of or included in liquid dispensing apparatus.

FIG. 15D illustrates a parallel flow configuration 504 of liquid flow control and beverage preparation system 500 according to an exemplary aspect of the present invention. In FIG. 15D, liquid passes through compartment 532 of housing 536 and remains unchanged from the state or condition at which liquid enters housing 536 and is dispensed at outlet 526 via liquid flow path 506. An enhancement component 516, which may include any dispensable type component used to enhance, condition or change the chemical or physical state or nature of liquid may be dispensed through enhancement flow path 508 using pump 538. Enhancement component 516 passes through pump 538 and is dispensed at outlet 526 of enhancement flow path 508. Enhancement component 516 combines with liquid 530 at mixing point 510 to provide beverage 518. Beverage 518 may be collected in a cup or other type of receptacle at the receiving area of liquid dispensing apparatus in which system 500 is used. The enhancement flow path 508 and liquid flow path 506 join in midair at mixing point 510. Thus, the enhancement component being used, combines with liquid 530 at mixing point 510 to provide beverage 518. Those skilled in the art can appreciate that liquid dispensing apparatuses have the ability to dispense various conditioned liquid types, such as for example heated, chilled or carbonated liquid. Thus, depending upon the desired beverage 518, the user may direct the liquid dispensing apparatus to dispense a conditioned liquid stream, such as a heated, chilled or carbonated liquid, which enhancement component 516 is used to combine with or affect to create beverage 518. The present invention contemplates that system 500 may be configured so that pump 538 is not needed. In one exemplary aspect, enhancement component 516 could be included in a pre-pressurized chamber whereby a valve in enhancement flow path 508 allows enhancement component 516 to be dispensed through enhancement flow path 508 upon opening of the valve. The pressure within the chamber housing enhancement component 516 would dispense enhancement component 516 upon opening of the valve. Alternatively, the chamber housing enhancement component 516 could be a single use chamber where upon insertion of the chamber into the system the outlet is opened or mechanically pierced whereby enhancement component 516 is evacuated from the chamber (the chamber being pre-pressurized to cause evacuation of the enhancement component). In another aspect, the present invention contemplates that the chamber in which enhancement component 516 may be stored may be a deformable bladder whereby an actuator applies force to the deformable bladder to dispense enhancement component 516 through enhancement flow path 508. The actuator may be manually or automatically controlled depending upon the desired quantity of enhancement component. Enhancement flow path 508 may be configured with a one-way valve whereby pressure applied to the bladder causes enhancement component 516 to pass through enhancement flow path 508 until the desired amount of enhancement component 516 is dispensed, at which point the one-way valve closes and the pressure is removed from the bladder housing enhancement component 516.

FIG. 15E illustrates another exemplary aspect of the liquid flow control and beverage preparation system 500 of the present invention. As illustrated in FIG. 15E, a liquid flow control and beverage preparation capsule, pouch, pod or cartridge of the present invention may be inserted within compartment 532 of housing 536. The beverage preparation device inserted within housing 536 may be supported and secured within housing within compartment 532 using means known to those skilled in the art. Liquid passing through inlet 524 and liquid flow path 506 passes into chamber 532. The liquid 530 combines with or is affected by enhancement component 516, such as the case where heated liquid percolates through coffee or tea grounds dispensing at outlet 526 of housing 536 to provide beverage 518. Those skilled in the art can appreciate that system 500 illustrated in FIGS. 15C-15F may include one or more removable assemblies or component parts whereby the parts may be removed from use to be washed and sanitized to assist in preventing back contamination of the liquid dispensing apparatus to which system 500 operates in cooperation with. Furthermore, housing 536 may be designed so that when a liquid flow control and beverage preparation capsule, pod, pouch or cartridge of the present invention is inserted within compartment 532 an air buffer is established between enhancement component 516 and inlet 524 of system 500 to assist in preventing back contamination of liquid within the liquid dispensing apparatus. The flow-through configuration 502 of liquid flow control and beverage preparation system 500 shown in FIG. 15E is not limited to beverage preparation applications where heated liquid is passed through grounds, such as coffee or tea, for preparing beverage 518. Any number of the liquid flow control and beverage preparation capsules, pods, cartridges or pouches of the present invention may be inserted into housing 536 and may include any number of enhancement components 516 to prepare a myriad of beverage types. For example, the enhancement component 516 may be a liquid concentrate, which includes a vitamin supplement or other nutraceuticals. Thus, liquid 530 passing through compartment 532 combines with or is affected by enhancement component 516 to dispense at outlet 526 as a combination of liquid 530 and enhancement component 516. As previously discussed and described in the present invention, the device inserted into compartment 532 of housing 536 could also be a device used to provide further conditioning of liquid 530 passing through housing 536. For example, a device for further filtration of liquid 530 could be inserted within housing 536, a device for further oxygenation of liquid 530 could be inserted within housing 536, a device for irradiating liquid 530 could be inserted within housing 536, a device for checking the quality or presence of certain chemicals or other elements within liquid 530 could be inserted within housing 536, or any other like device within the contemplation of the present invention could be inserted within housing 536 for conditioning, enhancing or altering liquid 530. Unlike the flow configuration illustrated in FIG. 15F, the parallel flow construct remains idle in this flow scenario meaning the final beverage 518 is not created by combining enhancement component 516 with beverage 518 by dispensing through enhancement flow path 508 at outlet 526. Thus, depending upon the desire of the user, the parallel flow construct may sit idle while the flow-through construct operates. Conversely, the parallel flow construct may be active while the flow-through construct sits idle. All configurations and possibilities are within the contemplation of the present invention.

FIG. 15F illustrates a parallel flow configuration 504 of liquid flow control and beverage preparation system 500. Like flow-through configuration 502 illustrated in FIG. 15E, an enhancement component 516 may be included in compartment 532 of housing 536 whereby liquid passing into housing 530 combines with or is affected by enhancement component 516 and dispenses from housing 536 at outlet 526 as one stage of the beverage preparation process. The parallel flow construct of system 500 provides further preparation of beverage 518 by communicating another enhancement component 516 through enhancement flow path 508 by use of pump 538 (or those means previously described) to dispense at outlet 526 of enhancement flow path 508 and combined with the beverage prepared by the flow-through construct of system 500 to provide a finished beverage. The enhancement component 516 dispensed from the parallel flow construct combines with the beverage prepared by the flow-through construct in midair at mixing point 510 to provide a completed beverage 518. For example, a user may select a liquid flow control and beverage preparation capsule, pouch, pod or cartridge of the present invention having the desired enhancement component and flow control configuration for use in the flow-through construct illustrated in FIG. 15F. This may include for example, passing a heated liquid stream 530 through housing 536 that is percolated through coffee or tea grounds to provide one stage of the beverage which is in-turn combined with enhancement component 516, such as a syrup concentrate dispensed from the parallel flow construct and combined at mixing point 510 with the beverage prepared from the flow-through construct to provide the finished beverage. Another example contemplated by the present invention may include enhancement component 516 in housing 536 being a enhancement component for providing a carbonated liquid stream whereby the carbonated liquid stream is dispensed at the outlet 526 of housing 536 and combined with a syrup concentrate 516 (provided by the parallel flow construct) at mixing point 510 to provide a flavored concentrated beverage, such as flavored soda. As with the other systems 500 described in FIGS. 15C-15F, an air buffer may be established between the inlet 524 and enhancement component 516 within compartment 532 of housing 536 to assist in preventing back contamination of the liquid dispensing system from which liquid is provided to system 500. Furthermore, by combining the enhancement flow path and liquid flow path from the parallel dispensing construct and the flow-through dispensing construct of the system at a point in midair helps prevent the potential for back contamination of system 500 or the liquid dispensing apparatus to which system 500 is used in combination with.

FIGS. 16A-16E illustrate a liquid flow control and beverage preparation system 500 according to another exemplary aspect of the present invention. Like liquid flow control and beverage system preparation 500 illustrated in FIGS. 15A-15F, system 500 illustrated in FIGS. 16A-16E may be included at a dispensing interface of any one of the liquid dispensing apparatuses as described and contemplated in the present invention. Similarly, liquid flow control and beverage preparation system 500 may be integrated during manufacturing or after liquid dispensing apparatus is commercially available. In the case where system 500 is combined with commercially available liquid dispensing apparatuses, attachment means may be included for securing system 500 about the liquid dispensing interface and/or outlet of any one of the liquid dispensing apparatuses as shown or contemplated by the present invention. For example, liquid flow control and beverage preparation system 500 may be removably attached to the liquid dispensing apparatus as shown in FIG. 14B and described in the application. In the case where system 500 is built into the liquid dispensing apparatus during manufacturing or even where a kit may be provided whereby system 500 may be added to an existing liquid dispensing apparatus, system 500 is designed so that housing 536 is accessible for removable receipt at the liquid dispensing interface of the liquid dispensing apparatus. In combination with liquid dispensing apparatus 10, as is illustrated in FIG. 16A, system 500 is tied into the liquid flow path 12, such that liquid from inlet 14 is communicated through liquid flow path 12, liquid flow control and beverage preparation system 500 and dispensed at receiving point 20 of liquid dispensing apparatus 10. Preferably, liquid dispensing apparatus 10 includes an attachment interface 24 adapted for securing system 500 within, about or to liquid dispensing apparatus 10(see FIG. 16B). Liquid flow control and beverage preparation system 500 includes an inlet 524 in fluid communication with liquid flow path 12 of liquid dispensing system 10 illustrated in FIG. 16A. Liquid passing through inlet 524 is communicated through liquid flow path 506 in communication with valve 512. Valve 512 is in communication with housing 536 via liquid flow path 506 between valve 512 and housing 536. Valve 512 is also in fluid communication with flow divider 540 via liquid flow path connecting valve 512 and flow divider 540. Two liquid flow paths 506, one extending external to housing 536 and another in communication with housing 536 distribute liquid passing through flow divider 540 according to the desired flow configuration and beverage preparation protocol for the beverage being prepared. Housing 536 may be secured to attachment interface 24 of liquid dispensing apparatus 10 via attachment interfaces 514. Attachment interfaces 514 may include attachment means known by those skilled in the art, including those previously discussed, described and contemplated in the present invention. Housing 536 may be a two-piece component whereby an upper portion is rigidly fixed to attachment interface 24 of liquid dispensing apparatus 10 using attachment interfaces 514. The two-piece construction of housing 536 allows one piece of housing 536 to be attached to liquid dispensing apparatus and another piece to be removably attached, whereby a user may gain access to compartment 532 of housing 536. The two-part construction of housing 536 may be accomplished by providing a lower portion that is mateably received to an upper portion rigidly attached to liquid dispensing apparatus 10. The lower portion may include outlet 526 and may be attached to the upper portion of housing 536 using any attachment means known to those skilled in the art including those illustrated, described and contemplated by the present invention. For example, the lower portion of housing 536 could be threadably mated to the upper portion of housing 536 whereby any one of the liquid flow control and beverage preparation capsules, pods, cartridges, or pouches of the present invention may be inserted within compartment 532 of housing 536 as illustrated in FIGS. 16D-16E. Designing housing 536 as a two-part component also allows one or more parts of housing 536 to be disassembled for washing and sanitizing after each use to assist in preventing back contamination of the liquid dispenser. System 500 as illustrated in FIG. 16B provides a robust combination of flow-through and parallel flow configurations to facilitate preparation of a myriad of beverages that require different flow configurations. FIGS. 16C-16E illustrate the various types of flow configurations.

FIG. 16C illustrates one flow dispensing scenario for liquid flow control and beverage preparation system 500 according to an exemplary aspect of the present invention. In FIG. 16C, liquid from liquid dispensing apparatus passes into system 500 through inlet 524 and is communicated through liquid flow path 506 to valve 512. Liquid 530, depending upon the valve 512 or flow divider 540 settings, may be diverted totally through liquid flow path 506 in fluid communication with housing 536. As previously described, valve 512 may be manually actuated or automatically actuated depending upon the flow configuration corresponding to the desired beverage. For example, an actuator may upon given an instruction, actuate valve 512 to control the flow of liquid 530 through system 500. The user could also manually actuate valve 512 or system 500 could be configured to automatically actuate valve 512 based upon the type of enhancement component or liquid flow control and beverage preparation capsule, pouch, pod or cartridge inserted into housing 536. As previously indicated, in discussion of valve 412 illustrated in FIG. 14B, valve 512 may have on/off type functionality whereby flow of liquid 530 through system 500 is either permitted or not permitted. Similarly, valve 512 may be configured to control the volumetric flow of liquid 530 through system 500 and even control the distribution of liquid 530 through the various liquid flow paths 506 in system 500. Flow considerations would likely be based upon the type of beverage being prepared. In the embodiment illustrated in FIG. 16C, compartment 532 of housing 536 is left vacant or empty, void of any liquid flow control and beverage preparation pod, capsule, pouch or cartridge, such that liquid 530 flowing through housing 536 remains unchanged and is dispensed from housing 536 at outlet 526 in the same state as the liquid entered system 500. So, for example, in the case where the user simply desires a glass of water, water is communicated through the system unchanged and presented to the user at outlet 526 of system 500 for collection within a cup or other receptacle. In this instance, all the liquid 530 passing through system 500 is diverted through liquid flow path 506 in communication with housing 536 and outlet 526. Flow divider 540 and liquid flow paths 506 extending there from are left idle in the liquid flow scenario illustrated in FIG. 16C.

FIG. 16D illustrates a parallel flow configuration 504 of liquid flow control and beverage preparation system 500. Whereas, FIGS. 16C and 16E illustrate flow-through configurations 502 of liquid flow control and beverage preparation system 500. Thus, using the same system 500, but by changing the flow configuration manually or automatically, system 500 may be reconfigured from a flow-through system to a parallel flow system or from a parallel flow system to a flow-through type system depending upon the type of beverage being prepared. With the embodiment illustrated in FIG. 16D, an enhancement component 516 is inserted within compartment 532 of housing 536. As previously described, any one of the liquid flow control and beverage preparation capsules, pouches, pods or cartridges of the present invention may be inserted within compartment 532 of housing 536. This can be accomplished as previously described, where a lower portion of housing 536 is threadably detached from the upper portion and enhancement component 516 inserted within compartment 532 of housing 536 and secured within compartment 532 by reattaching the lower portion. According to an exemplary method of operation, liquid 530 from liquid dispensing apparatus is communicated through inlet 524 and liquid flow path 506 in communication with valve 512 to begin the beverage preparation process. Depending upon the type of beverage, or the type of enhancement component 516 inserted within system 500, valve 512 may be manually selected or automatically actuated and adjusted to control the flow of liquid 530 through system 500. As shown in FIG. 16D, liquid 530 is directed through liquid flow path 506 in communication with flow divider 540. Flow divider 540 is in fluid communication with a pair of liquid flow paths 506, one liquid flow path in communication with housing 536 and the other liquid flow path 506 passing external to housing 536. Like valve 512, flow divider 540 may be dialed to the desired liquid flow distribution configuration whereby the volumetric flow of liquid directed through the two liquid flow paths is controlled to control the concentration of the prepared beverage 518. Similarly, flow divider 540 may have a fixed flow configuration whereby the volumetric flow of liquid passing through flow divider 540 is controlled by the difference in diameter between the two liquid flow paths 506. For example, liquid flow path 506 between flow divider 540 and housing 536 may have a smaller diameter than liquid flow path 506 passing external to housing 536 whereby the volumetric flow of liquid 530 is greater in the flow path 506 passing external to housing 536 than the flow path 506 connecting flow divider 540 and housing 536. Thus, liquid 530 passing through liquid flow path 506 between flow divider 540 and housing 536 enters chamber 532 and is combined with or affected by enhancement component 516 to provide a beverage having liquid 530 in combination with or affected by enhancement component 516 which is dispensed at outlet 526 of housing 536. A portion of the liquid 530 passing through system 500 also passes through liquid flow path 506, passing external to housing 536, and combines at a mixing point 510 to prepare the final beverage 518. One example of the flow scenario illustrated in FIG. 16D may include the instance where the user desires a brewed beverage such as coffee or tea. In this case, a liquid flow control and beverage preparation capsule, pod, cartridge or pouch is selected having the desired enhancement component 516, such as tea grounds or coffee grounds. The enhancement component 516 is inserted into housing 536 as previously described. System 500 calls for heated liquid which is presented at inlet 524 from liquid dispensing apparatus 10. The heated liquid 530 travels through valve 512 and flow divider 540. A portion of the heated liquid 530 travels into housing 536 and percolates through enhancement component 516 dispensing at outlet 526 of housing 536 as a brewed beverage. The other portion of heated liquid passes external to housing 536 through liquid flow path 506 and dispenses at outlet 526. The liquid from the external flow path 506 combines with the brewed beverage 518 to provide the final brewed product. Thus, in the case where the user desires a less concentrated final beverage 518, the flow divider may be selected so that the majority of the liquid flow passes through the flow path 506 flowing external to housing 536. Alternatively, in the case where the user desires a strong concentrated final beverage 518, a majority of a heated liquid 530 may be diverted through liquid flow path 506 between flow divider 540 and housing 536 whereby a majority of the beverage is prepared and dispensed at outlet 526 of housing 536 and combined with what little liquid flow is passed external to housing 536 through liquid flow path 506.

FIG. 16E illustrates a flow-through configuration 502 of liquid flow control and beverage preparation system 500 of the present invention. Like the flow-through scenario illustrated in FIG. 16C, the flow-through scenario illustrated in FIG. 16E includes the addition of enhancement component 516 within chamber 532 of housing 536. Thus, for example, the user may select a powder concentrate as the enhancement component, whether alone or in combination with any one of the liquid flow control and beverage preparation capsules, pouches, pods, or cartridges of the present invention, which is then inserted within housing 536 through which liquid 530 passes through to combine with or be affected by the powder concentrate which is subsequently dispensed from housing 536 at outlet 526 as the combination of liquid 530 and enhancement component 516 to provide the final beverage 518. According to an exemplary method of the present invention, liquid provided from the liquid dispensing apparatus enters system 500 through inlet 524 and passes through liquid flow path 506 into valve 512. Valve 512 is configured manually or automatically depending upon the type of beverage being prepared, to direct liquid 530 through liquid flow path 506 in communication with housing 536. Liquid 530 passes through liquid flow path 506 into housing 536 liquid 530 combines with or is affected by enhancement component 516 within chamber 532. A beverage 518 is dispensed at outlet 526 of housing 536 which may be collected at the receiving point of a liquid dispensing apparatus. In this instance, the parallel flow construct (flow divider 540 with liquid flow paths 506) remains idle. If a different beverage is desired, enhancement component 516 may be removed from housing 536 and another enhancement component selected and inserted whereby the process of the beverage preparation process starts over again. After each use, the components of housing 536 may be disassembled, washed, sanitized, and reassembled for subsequent use. The ability of system 500 illustrated in FIGS. 16C-16E to be reconfigured between parallel and flow-through configurations allows system 500 to provide a myriad of dispensing scenarios corresponding with the requisite dispensing configuration depending upon the desired beverage being prepared.

Multi-Body Liquid Flow Control and Beverage Preparation Systems

FIGS. 17A-17D illustrate a multi-body liquid flow control and beverage preparation system 600 according to exemplary embodiment of the present invention. Like previous systems discussed, system 600 may be integrated into liquid dispensing apparatus 10 during manufacturing or after apparatus 10 is commercially available. System 600 may be integrated within the dispensing interface of any one of the liquid dispensing apparatuses illustrated in the present invention, including those contemplated but not shown or discussed. Multi-body liquid flow control and beverage preparation system 600 is in fluid communication with liquid flow path 12 of liquid dispensing apparatus 10. Liquid flow path 12 is in fluid communication with inlet 14 of the liquid dispensing apparatus 10. System 600 provides a beverage at receiving point 20 at liquid dispensing apparatus 10.

As shown in FIG. 17B, system 600 includes an inlet 624 adapted for fluid communication with liquid flow path 12 of liquid dispensing apparatus 10. Inlet 624 is in fluid communication with liquid flow path 606 and valve 612. Separate liquid flow paths 606 are provided downstream of valve 612, one liquid flow path 606 in fluid communication with one chamber 632 and the other liquid flow path 606 in fluid communication with another chamber 632. Both left and right chambers 632 are provided within housing 636. Chambers 632 have an inlet in the liquid flow path 606 adapted for fluid communication with a source of liquid provided by a liquid dispensing apparatus 10 and an outlet (the open end of chambers 632) adapted for communication with liquid flow control and beverage preparation capsule 646. System 600 may include housing 636 and does not necessary have to include liquid flow control and beverage preparation capsule 646 (meaning system 600 is fully operable with or without capsule 646). For example, liquid may be dispensed through either one or chambers 632 and provided at a receiving point for capturing with a receptacle such as a cup without being altered using liquid flow control and beverage preparation capsule 646. A sealing interface 644 is provided between mating surfaces of chamber 632 and liquid flow control and beverage preparation capsule 646. In the case where system 600 is integrally formed in liquid dispensing apparatus, sealing interface 644 is provided on attachment interface 24 of liquid dispensing apparatus 10. Sealing interface 644 may entail any type of sealing component known by those skilled in the art, including those previously described and discussed. Liquid flow control and beverage preparation capsule 646 is removably attached at the mouth of each chamber 632 of housing 636 via attachment interface 614. Attachment interface 614 may include attachment interfaces previously discussed or contemplated, including those known and within the contemplation of the present invention. For example, attachment interface 614 may include the holding device illustrated in FIG. 4A. Attachment interface 614 may also be integrally formed with liquid dispensing apparatus 10 such that liquid flow control and beverage preparation capsule 646 snaps into and out of attachment interface 614. Additionally, sealing interface 644 may double as an attachment interface whereby liquid flow control and beverage preparation capsule 646 is removably secured about the mouth of chamber 632. For example, liquid flow control and beverage preparation capsule 646 could be threadably attached at sealing interface 644 similar to what is discussed and shown in FIGS. 3A-3C. Although system 600 in FIG. 17B is shown with liquid flow control and beverage preparation capsule 646, the present invention contemplates that any liquid flow control and beverage preparation capsule, pouch, pod or cartridge of the present invention may be removably attached at the mouth of chamber 632 in housing 636 (as illustrated by way of example by liquid flow control and beverage preparation capsule 646). Each liquid flow control and beverage preparation capsule 646 may include an enhancement component 616 and an outlet 626 through which liquid passing through capsule 646 is dispensed. It should be understood that capsule 646 need not have an enhancement component 616 but may be empty whereby liquid passing through capsule 646 remains unaffected and is dispensed having the same physical and chemical nature as it did when it entered and passed through system 600. According to an exemplary method of operation, liquid from liquid dispensing apparatus enters inlet 624 of system 600 and passes through liquid flow path 606 to valve 612. Like many of the valves previously described, valve 612 may be manually or automatically operated depending upon the type of beverage being prepared to thereby control the flow of liquid through liquid flow path 606 and into one or more of chambers 632 in housing 636. For example, in the case where system 600 is used to prepare a beverage requiring multiple flavors, an instruction may be issued to valve 612 from a controller of system 600 whereby valve 612 is positioned to pass liquid through both liquid flow paths 606 into both chambers 632. Each chamber 632 is designed so that an air buffer is set up between the outlet of liquid flow path 606 passing into chamber 632 of housing 636 and the inlet of liquid flow control and beverage preparation capsule 646 thereby assisting in preventing back contamination of the liquid dispensing apparatus. Furthermore, in the embodiments illustrated in FIGS. 17C-17D, housing 636 may be removed from attachment interface 24 of liquid dispensing apparatus 10, washed, sanitized, and prepared for reuse to assist in preventing back contamination of liquid dispensing system to which system 600 may be removably attached. Liquid passing through each chambers 632 and housing 636 enters liquid flow control and beverage preparation capsule 646 and is combined with or affected by enhancement component 616 to dispense as a beverage at outlet 626 of each capsule 646. Thus, in the case where a beverage is desired that requires the combination of two enhanced liquid streams, liquid may be passed through chambers 632 and combined with different enhancement components 616 in the two liquid flow control and beverage preparation capsules 646. The two separate and distinct beverages dispensed from the two liquid flow control and beverage preparation capsules 646 is captured at the receiving point 20 of liquid dispensing apparatus 10 in a receptacle, such as a cup, where the two enhanced liquid streams combine to form a final beverage. The present invention contemplates that multi-body liquid flow control and beverage preparation system 600 may have multiple inlets 624 receiving liquid separately from liquid dispensing apparatus to provide separate liquid flow paths into each chamber 632 of housing 636. Thus, for example, in the case where a carbonated beverage with syrup is desired, liquid may be directed into one chamber 632 having an enhancement component 616 for carbonating the liquid stream and into the other chamber 632 having the enhancement component 616 for providing the flavoring liquid stream. The carbonated and flavored streams would combine at the receiving point 20 of liquid dispensing apparatus 10 in a receptacle, such as a cup, to provide a flavored carbonated beverage. System 600 could also be used for preparation of hot or cold beverages where a first beverage preparation process is performed and then combined with a second beverage preparation process that is performed separately from the first, such as in the case of many of the modern coffees, lattes, espressos, or other beverages prepared from multiple beverage preparation steps or procedures which require different flow-through configurations.

FIG. 17B illustrates an embodiment of system 600 which may be integrally formed within liquid dispensing apparatus 10. FIG. 17C illustrates another aspect of system 600 which may be removably attached at a liquid dispensing interface of liquid dispensing apparatus 10. Housing 636 may also include an attachment interface for securing to attachment interface 24 of liquid dispensing apparatus 10. Liquid flow paths 606 may be attached to valve 612 upon connection of housing 632 to liquid dispensing apparatus 10 by slip joints or any other means known by those skilled in the art, including those contemplated and described in the present invention. In the embodiment illustrated in FIG. 17C, housing 636 may be disassembled or removed from liquid dispensing apparatus 10 for washing and sanitizing after each use. FIG. 17D illustrates another embodiment of system 600.

In FIGS. 17B-17C, liquid flow through chamber 632 is controlled by valve 612. Thus, upon manual or automated operation of valve 612 liquid is passed through liquid flow path 606 in communication with both chambers 632. System 600 illustrated in FIG. 17D illustrates a version of system 600 wherein valve 612 includes a plunger 642 in communication with the outlet of chamber 632, where plunger 642 is adapted to control operation of valve 612. Plunger 642 extends through chamber 632 and is activated by placement of liquid flow control and beverage preparation capsule 646 at the outlet of chamber 632. When a liquid flow control and beverage preparation capsule 646 is attached at the outlet of chamber 632, plunger 642 is moved to the open position as illustrated in the image shown in FIG. 17D. If capsule 646 is removed from housing 636, plunger 642 descends closing valve 612 by bringing sealing interface 644 of valve into the closing position as illustrated in the diagram at the far right in FIG. 17D. Thus, valve 612 is actuated by plunger 642 when capsule 646 is removably attached at the outlet of chamber 632 of housing 636. The present invention contemplates that plunger 642 may be manually activated as well. The present invention further contemplates that any of the liquid flow control and beverage preparation capsules, pouches, pods, or cartridges when connected at the mouth or outlet of chamber 632 activate plunger 642 thereby opening valve 612 so that liquid flow descends through liquid flow path 606 into chamber 632 and into liquid flow control and beverage preparation capsule 646. The plunger design incorporated into system 600, as shown in FIG. 17D, prevents liquid dispension through chamber 632 of housing 636 when capsule 646 is absent.

As illustrated in FIG. 18, capsule 646 may include at the inlet 624 an attachment 614 and/or sealing interface 644 and adapted for securing to a corresponding capsule 646 as illustrated. The sealing interface 644 may be included at the inlet 624 and/or outlet 626 of capsule 646. The attachment interface 614 may include any attachment means known in the art, including those described and illustrated in the present invention. For example, inlet 624 of capsule 646 may be attached to outlet 626 of another capsule 646 by threading the inlet 624 to the outlet 626 of the opposing capsule 646. Similarly, outlet 626 of one capsule 646 may be secured to inlet 624 of another capsule 646 using an interference fit, slip joint, snap fitting, compression or tension fit, a detent received in a groove, or any other connection means known to those skilled in the art, including those contemplated and illustrated in the present invention. The attachment interface 614 may also include the sealing interface or the sealing interface 644 may be separate from the attachment interface 614. Sealing interface 644 may include sealing means known to those skilled in the art, including those discussed and illustrated in the present invention. For example, sealing interface may include any type of gasket, grommet, seal, flange, O-ring or any other type of sealing member whereby liquid passing between the two connected capsules 646 is prevented from leaking out of the mating interfaces of the two capsules 646. Using the attachment interface 614 and sealing interface 644 illustrated in FIG. 18, any one of the liquid flow control and beverage preparation capsules, pouches, pods or cartridges may be enabled to connect together with one another as illustrated in FIG. 18. Furthermore, using the concept illustrated in FIG. 18, a beverage may be provided where multiple enhancement components are needed, such as for example where a first beverage preparation step is provided by passing liquid through the uppermost or first capsule 646 and the beverage provided from the first capsule is then affected or combined with an enhancement component in the second capsule 646 to provide a finished beverage. Those skilled in the art can appreciate the many applications of the concept illustrated in FIG. 18. Thus, any number of cartridges 646 may be connected together in series to provide a finished beverage. This may include one cartridge that filters the liquid, another cartridge that adds a specific enhancement component to the liquid and a final cartridge that filters out one of added components to thereby provide a beverage that is contemplated by the illustrations and descriptions provided in the present invention, including those contemplated and known in the art. Attachment interface 614 and sealing interface 644 illustrated in FIG. 18 may be used to secure any one of the liquid flow control and beverage preparation capsules, pods, pouches, or cartridges of the present invention to any type of liquid dispensing apparatus. Furthermore, attachment interface 614 and/or sealing interface 644 may also be used to secure any one of the liquid flow control and beverage preparation capsules, pods, pouches, or cartridges of the present invention for use in combination with any one of the liquid flow control and beverage preparation modules and/or systems as shown or illustrated.

The embodiments of the present invention have been set forth in the drawings and specification and although specific terms are employed, these are used in the generically descriptive sense only and are not used for the purposes of limitation. Changes in the form and proportion of parts as well as in the substitution of equivalents are contemplated as circumstances may suggest or are rendered expedient without departing from the spirit and scope of the invention as further defined in the following claims.

What is claimed is:

1. A capsule for enhancing a liquid to provide a beverage, comprising:
   a liquid flow path having an inlet in communication with a liquid source and an outlet in communication with a beverage receiving point;
   an enhancement flow path having an inlet in communication with a chamber adapted for housing an enhancement component and an outlet in communication with the beverage receiving point;
   configurable to:
   i. a first configuration wherein the liquid flow path is separated from the enhancement flow path by an impermeable chamber; or
   ii. a second configuration wherein the liquid flow path is in communication with the enhancement flow path through a permeable chamber.

2. The capsule of claim 1 wherein the impermeable chamber has at least one wall comprising a deformable barrier.

3. The capsule of claim 2 wherein at least a portion of the enhancement component is displaced when the deformable barrier is moved from a neutral position to a collapsed position.

4. The capsule of claim 3 wherein the enhancement flow path outlet is:
   a. is in a closed position when the deformable barrier is in the neutral position; or
   b. in an open position when the deformable barrier is in the collapsed position.

5. The capsule of claim 1 in the first configuration comprises a second liquid flow path having an inlet in communication with the liquid source and an outlet in communication with the beverage receiving point.

6. The capsule of claim 5 wherein the second liquid flow path is in communication with the enhancement flow path outlet.

7. The capsule of claim 1 wherein the permeable chamber has at least one wall comprising a porous barrier.

8. The capsule of claim 1 further comprising a liquid chamber having an inlet in communication with the liquid source and a space for reservoiring liquid from the liquid source in communication with the enhancement component chamber.

9. The capsule of claim 1 further comprising a first section housing the liquid flow path and a second section housing the chamber with the enhancement component.

10. The capsule of claim 9 wherein the second section is a consumable.

11. The capsule of claim 1 wherein the permeable chamber has at least one wall comprising a porous barrier.

12. A capsule for enhancing a liquid to provide a beverage, comprising:
   a first section having liquid flow path with an inlet in communication with a liquid source and an outlet in communication with a beverage receiving point;
   a second section having an enhancement flow path with an inlet in communication with a chamber adapted for housing an enhancement component and an outlet in communication with the beverage receiving point;
   the second section configurable to:
   i. a first configuration wherein the liquid flow path is separated from the enhancement flow path by an impermeable chamber; or
   ii. a second configuration wherein the liquid flow path is in communication with the enhancement flow path through a permeable chamber.

13. The capsule of claim 12 wherein the second section is a consumable.

14. The capsule of claim 12 wherein the impermeable chamber has at least one wall with a deformable barrier.

15. The capsule of claim 14 wherein at least a portion of the enhancement component is displaced from the chamber when the deformable barrier is moved from a neutral position to a collapsed position.

16. The capsule of claim 15 wherein the enhancement flow path outlet is
   a. is in a closed position when the deformable barrier is in the neutral position; or
   b. in an open position when the deformable barrier is in the collapsed position.

17. The capsule of claim 12 wherein the impermeable chamber has at least one wall with a frangible barrier.

18. A capsule for enhancing a liquid to provide a beverage, comprising:
   a liquid flow path having an inlet in communication with a liquid source and an outlet in communication with a beverage receiving point;
   the liquid flow path configurable to:
   a. a first configuration having an enhancement flow path with an inlet in communication with an impermeable chamber adapted for housing an enhancement component and an outlet in communication with the beverage receiving point; or
   b. a second configuration having an enhancement flow path with an inlet in communication with a permeable chamber adapted for housing an enhancement component and an outlet in communication with the beverage receiving point.

19. The capsule of claim 18 wherein the liquid flow path is separated from the enhancement flow path by the impermeable chamber in the first configuration.

20. The capsule of claim 18 wherein the liquid flow path is in communication with the enhancement flow path through the permeable chamber in the second configuration.

* * * * *